(12) United States Patent
Yuasa et al.

(10) Patent No.: US 8,490,140 B2
(45) Date of Patent: Jul. 16, 2013

(54) ELECTRONIC DEVICE AND METHOD, RECORDING MEDIUM, AND PROGRAM

(75) Inventors: Naoki Yuasa, Chiba (JP); Shuichi Otsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1240 days.

(21) Appl. No.: 11/404,089

(22) Filed: Apr. 14, 2006

(65) Prior Publication Data

US 2006/0236232 A1 Oct. 19, 2006

(30) Foreign Application Priority Data

Apr. 18, 2005 (JP) ................................. 2005-119919
May 18, 2005 (JP) ................................. 2005-145014

(51) Int. Cl.
*H04N 7/18* (2006.01)

(52) U.S. Cl.
USPC .................. 725/80; 725/37; 725/52; 725/74; 725/81; 725/135; 725/139; 725/141

(58) Field of Classification Search
USPC ................. 725/38, 39, 44, 45, 46, 47, 49, 58, 725/60, 61, 37, 52, 74, 80–81, 135, 139, 725/141
See application file for complete search history.

(56) References Cited

U.S. PATENT DOCUMENTS

| | | | | |
|---|---|---|---|---|
| 4,751,581 A | * | 6/1988 | Ishiguro et al. | 348/734 |
| 6,636,953 B2 | * | 10/2003 | Yuasa et al. | 711/161 |
| 7,493,024 B2 | * | 2/2009 | Maetz et al. | 386/248 |
| 2004/0073915 A1 | * | 4/2004 | Dureau | 725/9 |
| 2005/0028208 A1 | * | 2/2005 | Ellis et al. | 725/58 |
| 2005/0155052 A1 | * | 7/2005 | Ostrowska et al. | 725/25 |
| 2005/0203992 A1 | * | 9/2005 | Tanaka et al. | 709/203 |
| 2005/0251827 A1 | * | 11/2005 | Ellis et al. | 725/47 |
| 2005/0251829 A1 | * | 11/2005 | Kondo et al. | 725/55 |
| 2006/0095942 A1 | * | 5/2006 | van Beek | 725/81 |

FOREIGN PATENT DOCUMENTS

| | | |
|---|---|---|
| JP | 2004-127186 | 4/2004 |
| JP | 2005-4916 | 1/2005 |
| JP | 2005-31795 | 2/2005 |
| JP | 2005-31804 | 2/2005 |

* cited by examiner

*Primary Examiner* — Pankaj Kumar
*Assistant Examiner* — Alazar Tilahun
(74) *Attorney, Agent, or Firm* — Oblon, Spivak, McClelland, Maier & Neustadt, L.L.P.

(57) ABSTRACT

An electronic device includes a setting unit configured to set an order of priority for attributes of a reproducing device, for each content attribute, based on user instructions, a first obtaining unit configured to obtain attributes of the reproducing device, a second obtaining unit configured to obtain attributes of the content selected by the user, and a determining unit configured to determine an order of priority for the reproducing device regarding which attributes have been obtained by the first obtaining unit, based on the set order of priority, obtained attributes of the reproducing device, and obtained attributes of the content.

20 Claims, 41 Drawing Sheets

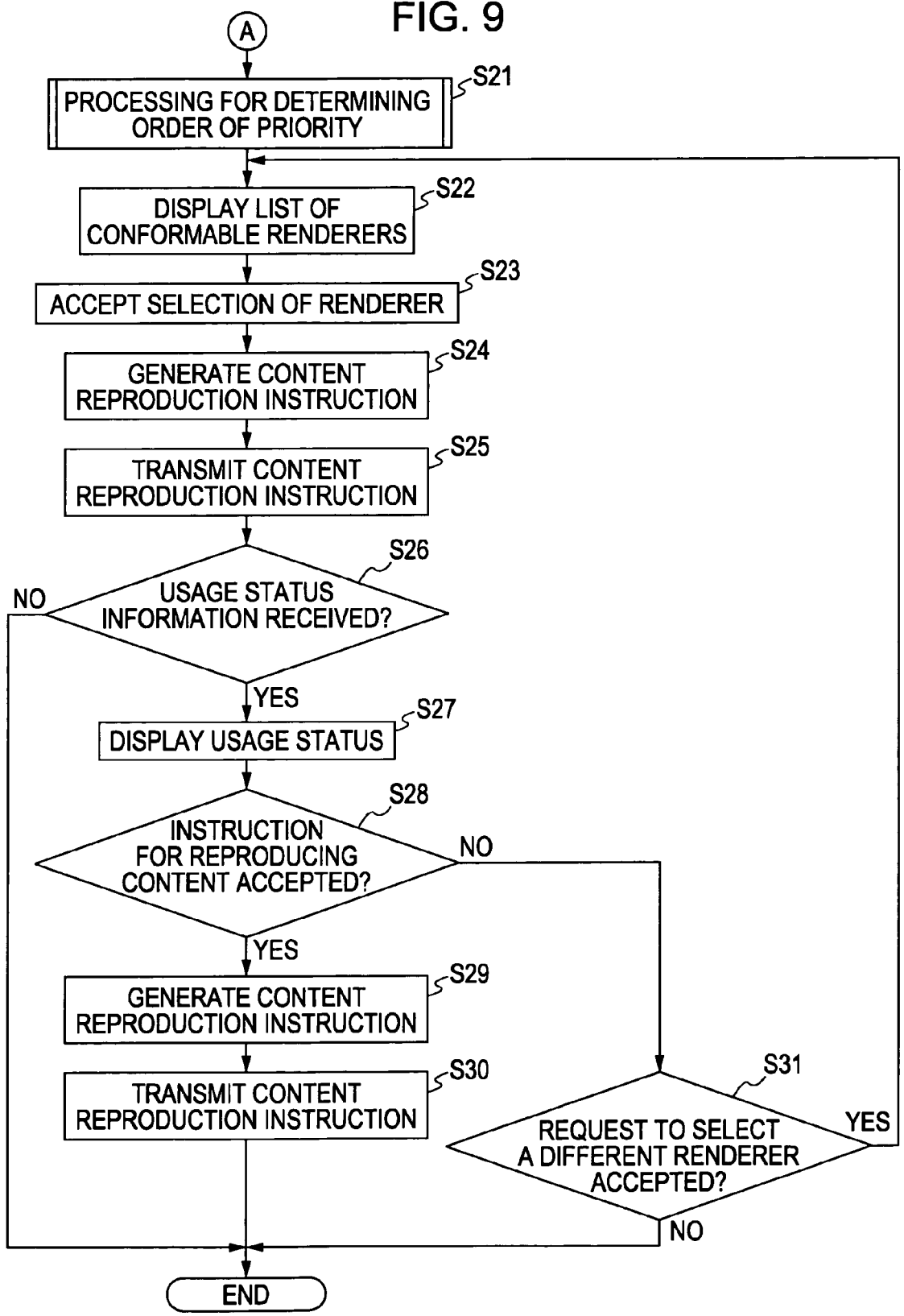

FIG. 10

RENDERER SELECTION CONDITIONS

| CONTENT ATTRIBUTES | PARAMETERS TO BE DETERMINED (JUDGED BASED ON WHETHER CORRESPONDING TO THE FOLLOWING ITEMS FOR EACH RENDERER) | CAN USER SET PARAMETERS? | NOTES |
|---|---|---|---|
| COMPATIBLE CODEC METHOD | EXAMPLES: MPEG2, MPEG4, WMV, LPCM, MP3, ATRAC3, JPEG | NO | ONLY COMPATIBLE RENDERERS |
| COMPATIBLE CONTENT TYPE | EXAMPLES: PHOTOS, MUSIC, VIDEO, TV, GAMES, AND COMBINATIONS OF THESE | NO | ONLY COMPATIBLE RENDERERS |
| COMPATIBLE IMAGE RESOLUTION | NUMBER OF HORIZONTAL DOTS BY VERTICAL DOTS, OR RESOLUTION DESCRIPTION INFORMATION SUCH AS "VGA" | NO | ONLY COMPATIBLE RENDERERS |
| VIEWER-RESTRICTED CONTENT | USAGE PERMITTED/NOT-PERMITTED | YES | SPECIFY RENDERER CAPABLE OF USING VIEWER-RESTRICTED CONTENT |
| PAY CONTENT | USAGE PERMITTED/NOT-PERMITTED | YES | SPECIFY RENDERER CAPABLE OF USING PAY CONTENT |
| LOCATION WHERE CONTENT PROVIDING DEVICE IS INSTALLED | LOCATION WHERE COMPATIBLE CONTENT PROVIDING DEVICE IS INSTALLED EXAMPLES: LIVING ROOM, BEDROOM, STUDY | YES | SPECIFY USABLE RENDERER ACCORDING TO LOCATION WHERE CONTENT PROVIDING DEVICE IS INSTALLED |
| OWNER OF CONTENT | EXAMPLES: FATHER, SISTER | YES | SPECIFY USABLE RENDERER ACCORDING TO OWNER OF CONTENT |
| ORDER OF PRIORITY OF RENDERER FOR EACH COMPATIBLE CONTENT TYPE | EXAMPLES: PHOTOS, MUSIC, VIDEO, TV, GAMES, AND COMBINATIONS OF THESE | YES SPECIFY ORDER OF PRIORITY OF RENDERER | SPECIFY RENDERER TO BE USED FOR EACH TYPE WITH ORDER OF PRIORITY |

FIG. 14

COMPATIBLE CONTENT TYPE AND ORDER OF
PRIORITY FOR DISPLAY SELECTION

| NAME OF RENDERER | PHOTO | MUSIC | VIDEO | TV | GAME |
|---|---|---|---|---|---|
| TV IN LIVING ROOM | 1 | 5 | 2 | 1 | 1 |
| TV IN STUDY | 3 | 4 | 1 | 3 | 2 |
| TV IN BEDROOM | | | 3 | 2 | |
| AMPLIFIER IN LIVING ROOM | | 2 | | | |
| STEREO IN BEDROOM | | 1 | | | |
| PC IN LIVING ROOM | 2 | 3 | 4 | 4 | 3 |

FIG. 16

TABLE OF RENDERERS CAPABLE OF
USING VIEWER-RESTRICTED CONTENT

| NAME OF RENDERER | CAPABLE OF USING? |
|---|---|
| TV IN LIVING ROOM | YES |
| TV IN STUDY | YES |
| TV IN BEDROOM | YES |
| AMPLIFIER IN LIVING ROOM | YES |
| STEREO IN BEDROOM | |
| PC IN LIVING ROOM | |

FIG. 17

TABLE OF RENDERERS CAPABLE
OF USING PAY CONTENT

| NAME OF RENDERER | CAPABLE OF USING? |
|---|---|
| TV IN LIVING ROOM | YES |
| TV IN STUDY | |
| TV IN BEDROOM | |
| AMPLIFIER IN LIVING ROOM | YES |
| STEREO IN BEDROOM | |
| PC IN LIVING ROOM | |

FIG. 20

RENDERERS CAPABLE OF USE ACCORDING
TO LOCATION OF CONTENT PROVIDING DEVICE

| NAME OF RENDERER | LIVING ROOM | STUDY | BEDROOM |
|---|---|---|---|
| TV IN LIVING ROOM | YES | YES | YES |
| TV IN STUDY | YES | YES | |
| TV IN BEDROOM | | | YES |
| AMPLIFIER IN LIVING ROOM | YES | YES | YES |
| STEREO IN BEDROOM | | | YES |
| PC IN LIVING ROOM | YES | YES | YES |

FIG. 23

RENDERERS CAPABLE OF USE ACCORDING
TO OWNER OF CONTENT

| NAME OF RENDERER | FATHER | MOTHER | SISTER |
|---|---|---|---|
| TV IN LIVING ROOM | YES | YES | |
| TV IN STUDY | YES | | |
| TV IN BEDROOM | | YES | |
| AMPLIFIER IN LIVING ROOM | YES | YES | |
| STEREO IN BEDROOM | | | YES |
| PC IN LIVING ROOM | YES | YES | |

FIG. 24

COMPATIBLE CODECS

| NAME OF RENDERER | MPEG2 | MPEG4 | WMV | LPCM | MP3 | ATRAC3 | JPEG |
|---|---|---|---|---|---|---|---|
| TV IN LIVING ROOM | YES | YES | | YES | | | YES |
| TV IN STUDY | YES | YES | YES | YES | | | YES |
| TV IN BEDROOM | YES | | | | | | |
| AMPLIFIER IN LIVING ROOM | | | | YES | YES | YES | |
| STEREO IN BEDROOM | | | | YES | | | |
| PC IN LIVING ROOM | YES | YES | YES | YES | YES | YES | YES |

FIG. 25

COMPATIBLE CONTENT TYPES

| NAME OF RENDERER | PHOTO | MUSIC | VIDEO | TV | GAME |
|---|---|---|---|---|---|
| TV IN LIVING ROOM | YES | YES | YES | YES | YES |
| TV IN STUDY | YES | YES | YES | YES | YES |
| TV IN BEDROOM | | | YES | YES | |
| AMPLIFIER IN LIVING ROOM | | YES | | | |
| STEREO IN BEDROOM | | YES | | | |
| PC IN LIVING ROOM | YES | YES | YES | YES | YES |

FIG. 26
COMPATIBLE IMAGE RESOLUTIONS

| NAME OF RENDERER | MAXIMUM IMAGE RESOLUTION |
|---|---|
| TV IN LIVING ROOM | 1920×1080 |
| TV IN STUDY | 1280×768 |
| TV IN BEDROOM | 1024×768 |
| AMPLIFIER IN LIVING ROOM | 0 |
| STEREO IN BEDROOM | 0 |
| PC IN LIVING ROOM | 1280×1024 |

FIG. 27
CONTENT ATTRIBUTE INFORMATION

| ATTRIBUTE | VALUE |
|---|---|
| CODEC METHOD | MPEG2 |
| IMAGE RESOLUTION | 720×480 |
| VIEWER RESTRICTED | YES |
| PAY CONTENT | NO |
| LOCATION OF CONTENT PROVIDING DEVICE | LIVING ROOM |
| OWNER | FATHER |
| CONTENT TYPE | VIDEO |

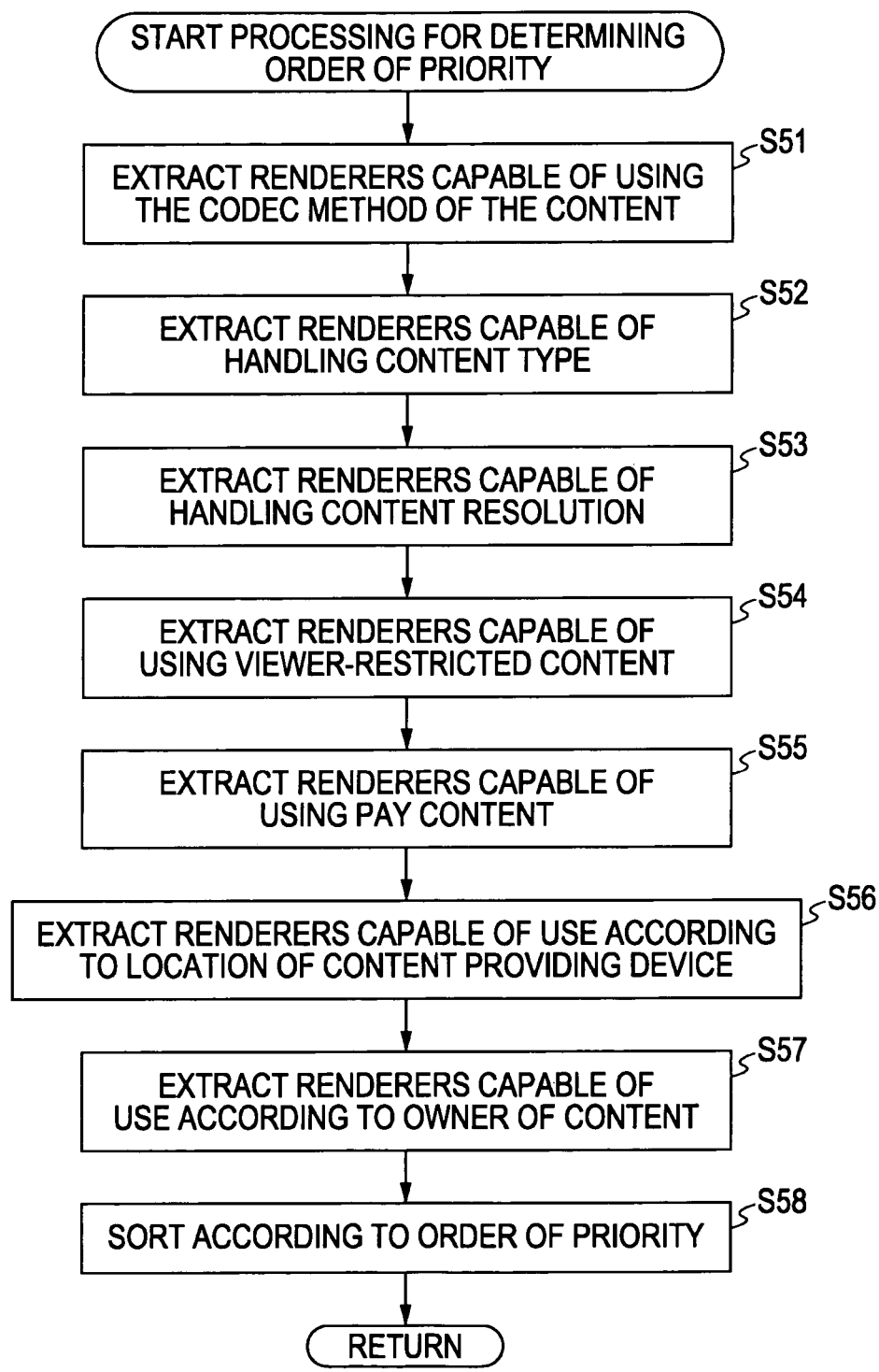

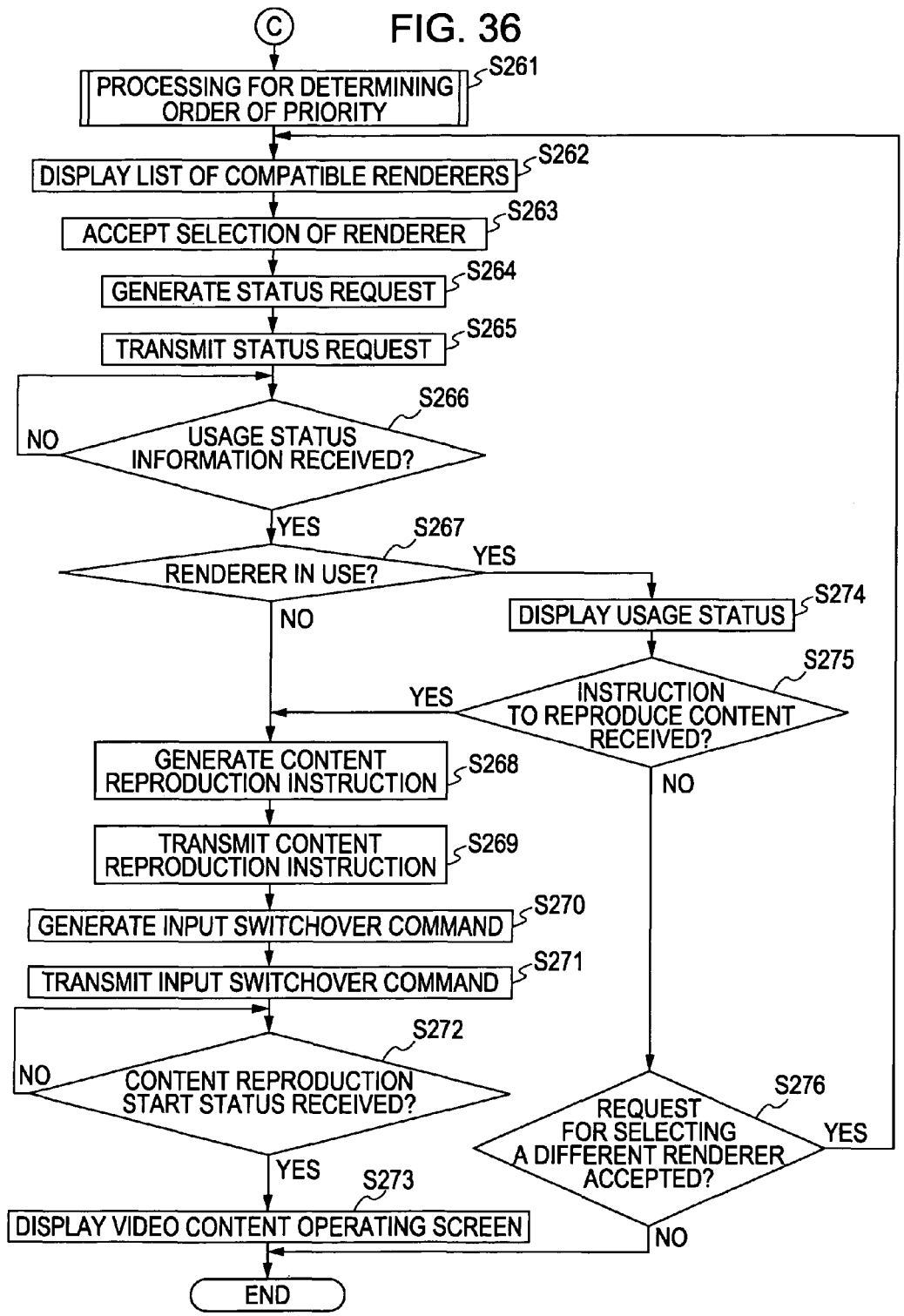

ELECTRONIC DEVICE AND METHOD, RECORDING MEDIUM, AND PROGRAM

CROSS REFERENCES TO RELATED APPLICATIONS

The present invention contains subject matter related to Japanese Patent Application JP 2005-119919 filed in the Japanese Patent Office on Apr. 18, 2005, and Japanese Patent Application JP 2005-145014 filed in the Japanese Patent Office on May 18, 2005, the entire contents of which are incorporated herein by reference.

BACKGROUND OF THE INVENTION

1. Field of the Invention

The present invention relates to an electronic device and method, recording medium, and program, and particularly relates to an electronic device and method, recording medium, and program, enabling reproduction of contents in a sure manner.

2. Description of the Related Art

In recent years, as devices capable of connecting to networks have become commonplace, devices such as television receivers and PCs (Personal Computers) capable of receiving contents via a network and displaying or reproducing the received contents (hereafter, such devices will be referred to as "renderers") have also become commonplace.

Also, Japanese Unexamined Patent Application Publication No. 2005-31804 discloses a content management terminal for controlling transfer of content at a device which has stored content, so as to obtain a content list of contents stored on another device, display the obtained content list, select content to be used by a user from the displayed content list, display a user interface for displaying the content based on the attribute of the selected content, accepting input regarding usage of the content through the user interface, and transferring the selected content to a device which will use the content, based on the input.

SUMMARY OF THE INVENTION

However, there has been a problem with reproducing content at a renderer, in that the renderer may not be able to reproduce the content due to the state of the renderer not being known, leading to a situation wherein the user might not be able to view/listen to the content. For example, in the event of reproducing a content at a renderer with a controller, a renderer to reproduce the content is specified, but the user may not know whether the renderer is capable of reproducing the content, and may find out that the renderer is not capable of reproducing the content from an error occurring to that effect.

Also, in a case wherein the content can be reproduced only with a particular renderer, but that renderer cannot be selected, the content may not be able to be reproduced within that situation.

Also, some users may configure a content reproduction environment including some devices which are not capable of being connected to the network. For example, with a content which includes audio and video, a user may want to listen to the audio portion of the content using an amplifier which is not connected to the network. In this case, there may be a situation wherein the video portion of the content needs to be controlled with one controller and the audio portion to be controlled with another controller, which can be troublesome for the user.

Accordingly, there is a need to enable reproduction of content in a sure manner.

An electronic device according to an embodiment of the present invention includes setting means configured to set an order of priority for attributes of a reproducing device, for each content attribute, based on user instructions, first obtaining means configured to obtain attributes of the reproducing device, second obtaining means configured to obtain attributes of the content selected by the user, and determining means configured to determine an order of priority for the reproducing device regarding which attributes have been obtained by the first obtaining means, based on the set order of priority, obtained attributes of the reproducing device, and obtained attributes of the content.

The electronic device may further include display means configured to display a list from which the user selects the reproducing device for reproducing the content, based on determined the order of priority.

The electronic device may further include selecting means configured to select the reproducing device for reproducing the content, based on determined the order of priority.

The electronic device may further include transmitting means configured to transmit a command instructing reproducing of the content to the reproducing device selected based on the order of priority. The transmitting means may transmit a command instructing reproducing of the content via a network.

The electronic device may further include transmitting means configured to transmit, via a network, a command for controlling another reproducing device, connected to the reproducing device selected based on the order of priority, so as to reproduce a part of the content. The transmitting means may transmit commands for controlling the other reproducing device to a device configured to convert commands for controlling the other reproducing device which are transmitted via the network into commands carried by an infrared medium.

The setting means may set an order of priority as to an attribute of the reproducing device in which the attribute is a name of the reproducing device, for each attribute of the content in which the attribute is a type of the content. The setting means may further set conditions indicating whether usage of the reproducing device corresponding to the content attribute or the reproducing device attribute is permissible or not permissible, with the determining means selecting the reproducing devices which can be used, based on the conditions, the obtained reproducing device attributes, and the obtained content attributes, and determining an order of priority for the selected reproducing devices.

The determining means may select the reproducing devices capable of handling the content, based on obtained the reproducing device attributes and obtained the content attributes, and determining an order of priority for the selected reproducing devices.

The content attribute may be encoding method, content type, or resolution.

An information processing method according to an embodiment of the present invention includes the steps of setting an order of priority for attributes of a reproducing device, for each content attribute, based on user instructions, first obtaining of attributes of the reproducing device, second obtaining of attributes of the content selected by the user, and determining of an order of priority for the reproducing device regarding which attributes have been obtained by the first obtaining means, based on the set order of priority, obtained attributes of the reproducing device, and obtained attributes of the content.

A program, according to an embodiment of the present invention, for causing a computer to execute an information processing method, includes code for setting an order of priority for attributes of a reproducing device, for each content attribute, based on user instructions, code for first obtaining of attributes of the reproducing device, code for second obtaining of attributes of the content selected by the user, and code for determining of an order of priority for the reproducing device regarding which attributes have been obtained by the first obtaining means, based on the set order of priority, obtained attributes of the reproducing device, and obtained attributes of the content.

A recording medium according to an embodiment of the present invention stores the program.

Further, an electronic device according to an embodiment of the present invention includes a setting unit configured to set an order of priority for attributes of a reproducing device, for each content attribute, based on user instructions, a first obtaining unit configured to obtain attributes of the reproducing device, a second obtaining unit configured to obtain attributes of the content selected by the user, and a determining unit configured to determine an order of priority for the reproducing device regarding which attributes have been obtained by the first obtaining unit, based on the set order of priority, obtained attributes of the reproducing device, and obtained attributes of the content.

With electronic device, information processing method, recording medium, and program, according to the present invention, order of priority is set as to reproduction device attributes for each content attribute, based on user instructions, the reproduction device attributes are obtained, and the order of priority of reproduction devices regarding which attributes have been obtained are determined, based on the set order of priority, obtained reproduction device attributes, and obtained content attributes. This enables content to be reproduced in a sure manner.

BRIEF DESCRIPTION OF THE DRAWINGS

FIG. 9 is a flowchart for describing content reproduction processing with the controller;

FIG. 10 is a diagram illustrating an example of renderer selection conditions;

FIG. 14 is a diagram illustrating an example of compatible content types and order of priority for selection for display;

FIG. 16 is a diagram illustrating an example of renderers capable of using viewer-restricted content;

FIG. 17 is a diagram illustrating an example of renderers capable of using pay content;

FIG. 20 is a diagram illustrating an example of renderers capable of use according to location of content providing device;

FIG. 23 is a diagram illustrating an example of renderers capable of use according to location of content providing device;

FIG. 24 is a diagram illustrating examples of compatible codecs;

FIG. 25 is a diagram illustrating examples of compatible content types;

FIG. 26 is a diagram illustrating examples of compatible image resolutions;

FIG. 27 is a diagram illustrating an example of content attribute information;

FIG. 28 us a flowchart describing processing for determining order of priority;

FIG. 36 is a flowchart for describing the processing for content reproduction with a controller;

DESCRIPTION OF THE PREFERRED EMBODIMENTS

Figure 1:
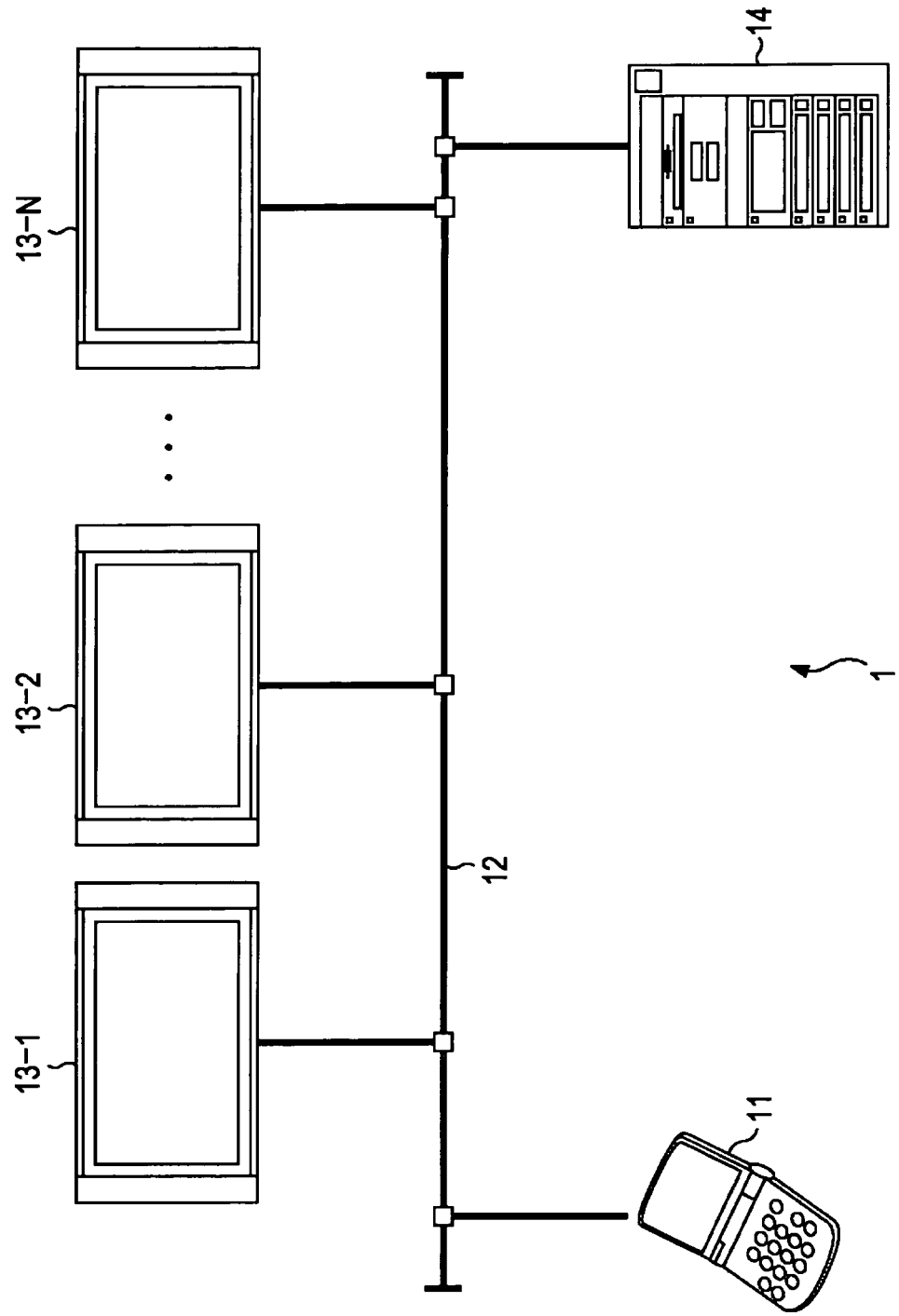
FIG. 1 is a block diagram illustrating the configuration of an embodiment of a content reproducing system to which the present invention has been applied.

Before describing a preferred embodiment of the present invention, the correspondence between the features of the claims and the specific elements disclosed in embodiments of the present invention is discussed below. Thus, even if an element in the following embodiments is not described as relating to a certain feature of the present invention, that does not necessarily mean that the element does not relate to that features of the claims. Conversely even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention in that further may be claimed by a divisional application, or that may be additionally claimed through amendments.

According to the present invention, an electronic device is provided. This electronic device (e.g., controller 11 shown in FIG. 1) includes setting means (e.g., renderer selection condition setting unit 201 shown in FIG. 5) configured to set an order of priority for attributes of a reproducing device (e.g., renderer 13 shown in FIG. 1), for each content attribute, based on user instructions, first obtaining means (e.g., profile information obtaining unit 203 shown in FIG. 5) configured to obtain attributes of the reproducing device, second obtaining means (e.g., content attribute obtaining unit 206 shown in FIG. 5) configured to obtain attributes of the content selected by the user, and determining means (e.g., priority order determining unit 207 shown in FIG. 5) configured to determine an order of priority for the reproducing device regarding which attributes have been obtained by the first obtaining means, based on the set order of priority, obtained attributes of the reproducing device, and obtained attributes of the content.

The electronic device may further include display means (e.g., LCD 39 shown in FIG. 2) configured to display a list from which the user selects the reproducing device for reproducing the content, based on determined the order of priority.

The electronic device may further include selecting means (e.g., renderer selecting unit 208 shown in FIG. 5) configured to select the reproducing device for reproducing the content, based on determined the order of priority.

The electronic device may further include transmitting means (e.g., transmitting unit 221 shown in FIG. 5) configured to transmit a command instructing reproducing of the content to the reproducing device selected based on the order of priority.

Figure 40:
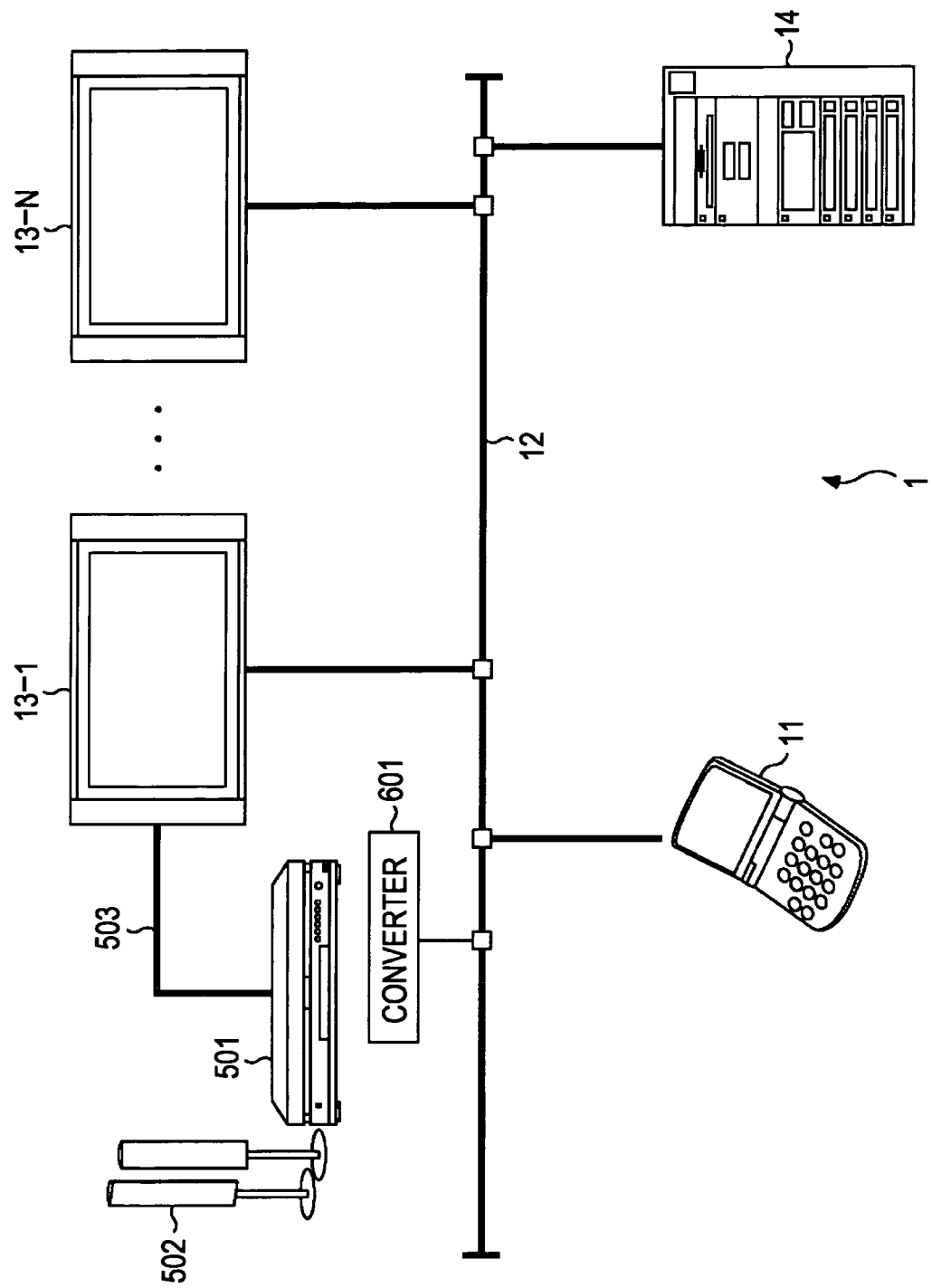
FIG. 40 is a block diagram illustrating another configuration of a reproducing system according to an embodiment of the present invention.

The transmitting means may transmit a command instructing reproducing of the content via a network (e.g., network 12 shown in FIG. 40).

The electronic device may further include transmitting means (e.g., transmitting unit 221 shown in FIG. 5) configured to transmit, via a network (e.g., network 12 shown in FIG. 40), a command for controlling another reproducing device (e.g., amplifier 501 shown in FIG. 40), connected to the reproducing device selected based on the order of priority, so as to reproduce a part of the content.

The transmitting means may transmit commands for controlling the other reproducing device to a device configured to convert commands (e.g., converter 601 shown in FIG. 40) for controlling the other reproducing device which are transmitted via the network into commands carried by an infrared medium.

The setting means may set an order of priority as to an attribute of the reproducing device in which the attribute is a name of the reproducing device, for each attribute of the content in which the attribute is a type of the content.

The setting means may further set conditions indicating whether usage of the reproducing device corresponding to the content attribute or the reproducing device attribute is permissible or not permissible, with the determining means selecting the reproducing devices which can be used, based on the conditions, the obtained reproducing device attributes, and the obtained content attributes, and determining an order of priority for the selected reproducing devices.

The determining means may select the reproducing devices capable of handling the content, based on obtained the reproducing device attributes and obtained the content attributes, and determining an order of priority for the selected reproducing devices.

The content attribute may be encoding method, content type, or resolution.

According to the present invention, an information processing method is provided. This information processing method includes the steps of setting an order of priority for attributes of a reproducing device, for each content attribute, based on user instructions (e.g., the processing in step S11 in FIG. 8), first obtaining of attributes of the reproducing device (e.g., the processing in step S14 in FIG. 8), second obtaining of attributes of the content selected by the user (e.g., the processing in step S20 in FIG. 8), and determining of an order of priority for the reproducing device regarding which attributes have been obtained in the first obtaining, based on the set order of priority, obtained attributes of the reproducing device, and obtained attributes of the content (e.g., the processing in step S21 in FIG. 9).

A program, according to an embodiment of the present invention, for causing a computer to execute an information processing method, includes code for setting an order of priority for attributes of a reproducing device, for each content attribute, based on user instructions (e.g., the processing in step S11 in FIG. 8), code for first obtaining of attributes of the reproducing device (e.g., the processing in step S14 in FIG. 8), code for second obtaining of attributes of the content selected by the user (e.g., the processing in step S20 in FIG. 8), and code for determining of an order of priority for the reproducing device regarding which attributes have been obtained in the first obtaining, based on the set order of priority, obtained attributes of the reproducing device, and obtained attributes of the content (e.g., the processing in step S21 in FIG. 9).

Figure 2:
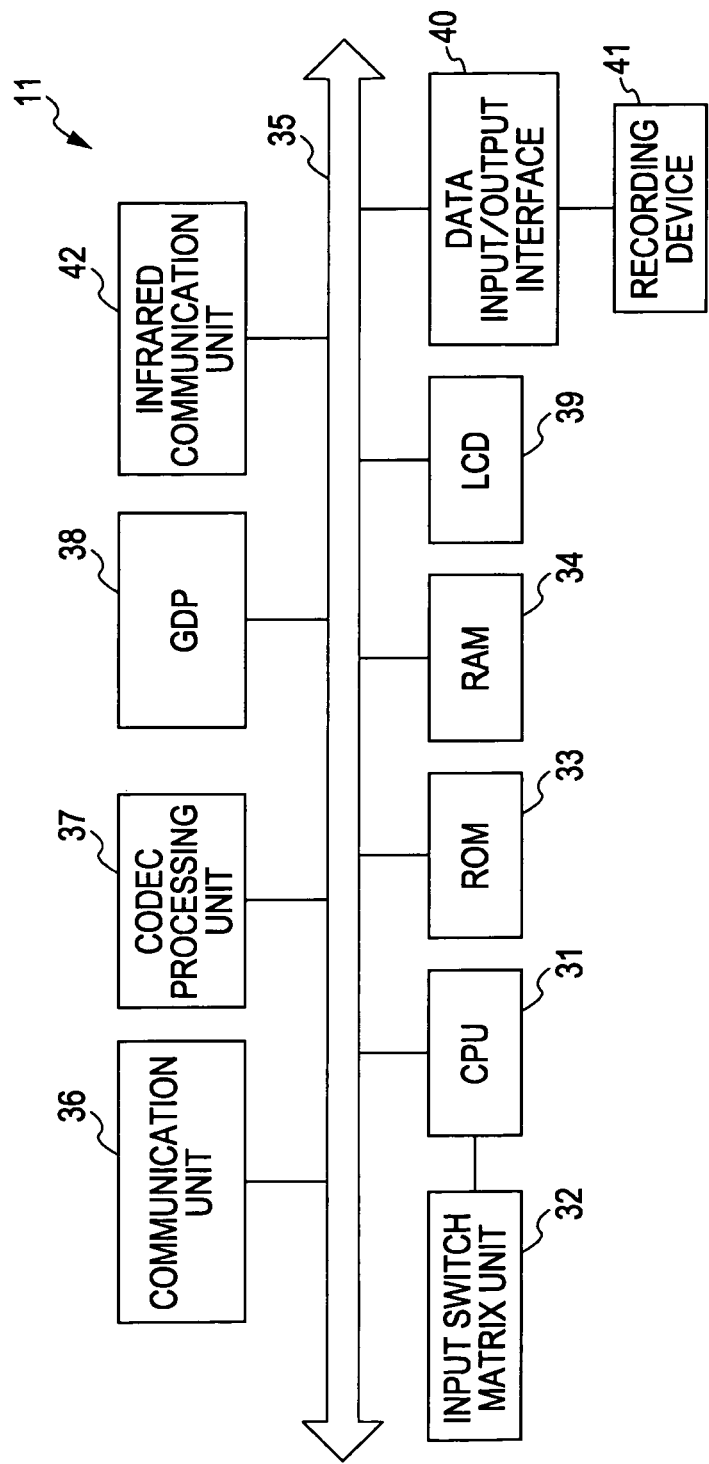
FIG. 2 is a block diagram illustrating an example of the configuration of a controller.

This program may be recorded in a recording medium (e.g., recording device 41 shown in FIG. 2).

Embodiments of the present invention will be described now with reference to the drawings. FIG. 1 is a block diagram illustrating he the configuration of an embodiment of a content reproduction system 1 to which the present invention has been applied.

Connected to the content reproduction system 1 are a network 12, controller 11, renderers 13-1 through 13-N, and a server 14.

The controller 11 is a dedicated terminal or a multi-purpose terminal such as a PDA (Personal Digital Assistant) or game device doubling as the terminal, for example, and is capable of connecting to the network 12. This is one example of an electronic device according to the present invention.

The controller 11 transmits renderer search requests to each of the renderers 13-1 through 13-N via the network 12. The controller 11 also receives profile information transmitted from each of the renderers 13-1 through 13-N via the network 12, in response to the renderer search requests.

While described later in detail, a renderer search request is a request for notification of the status at each of the renderers 13-1 through 13-N. For example, a renderer search request is a request for searching for renderers 13 which are connected to the network 12 and are capable of responding.

Also, while described later in detail, profile information is information indicating the characteristics (features) or status of each of the renderers 13-1 through 13-N in response to the renderer search request described above. For example, profile information includes compatible codec methods indicating compatible codecs, compatible content type indicating content which can be handled, compatible image resolution indicating image resolution which can be handled, and so forth, for each of the renderers 13-1 through 13-N.

Also, the controller 11 transmits a content list obtaining request to the server 14 via the network 12. For example, the controller 11 transmits a content list obtaining request to the server 14 in the event of receiving profile information from any one of the renderers 13-1 through 13-N, thereby obtaining a content list from the server 14.

Now, a content list obtaining request is a request for list information of contents which the server 14 is capable of providing. Also, a content list is information relating to contents which the server 14 is capable of providing.

Further, the controller 11 transmits a content reproduction instruction to one of the renderers 13-1 through 13-N via the network 12. Now, a content reproduction instruction is a request from a user for reproducing (displaying) a desired content.

The network 12 is configured of a wireless LAN (Local Area Network) compliant to IEEE (The Institute of Electrical and Electronic Engineers, Inc.) 802.11, a cable LAN compliant to the Ethernet (a Registered Trademark) standard, or the like, for example. Connected to the network 12 are the controller 11, renderers 13-1 through 13-N, server 14, and so forth.

Note that the network 12 is not restricted to a wireless LAN compliant to IEEE 802.11 or a cable LAN compliant to the Ethernet standard, and may be configured using various types of dedicated or public line networks, such as for example, the Internet, telephone lines, ISDN (Integrated Services Digital Network) and like PSTNs (Public Switched Telephone Network), FDDI (Fiber Distributed Data Interface) and like optical fiber networks, satellite communication networks, WANs (Wide Area Network), LANs, and so forth.

Each of the renderers 13-1 through 13-N are devices such as television receivers (TV sets) or PCs or the like, for example, that are capable of being connected to a network 12.

Each of the renderers 13-1 through 13-N receive renderer search requests transmitted from the controller 11 via the network 12, and each of the renderers 13-1 through 13-N transmit profile information to the controller 11 via the network 12, in accordance with the renderer search requests transmitted from the controller 11.

Also, each of the renderers 13-1 through 13-N receive content reproduction instructions transmitted from the controller 11 via the network 12, and, upon receiving a content reproduction instruction, each of the renderers 13-1 through 13-N transmits usage status information to the controller 11 via the network 12 in the event that the renderer itself is being used, and on the other hand, in the event that the renderer itself is not being used, transmits a content reproduction request to the server 14 via the network 12.

Now, usage state information is information indicating whether or not each renderer 13-1 through 13-N is being used itself. Also, a content reproduction request is transmitted from each of the renderers 13-1 through 13-N to the server, and is a request made to the server 14 for providing of predetermined content.

Further, each of the renderers 13-1 through 13-N receive and reproduce content being transmitted from the server 14 via the network 12, in response to the content reproduction request.

The server 14 is a device such as a dedicated server or PC or the like, capable of being connected to a network 12.

The server 14 transmits a content list to the controller 11 via the network 12, in response to the content list obtaining request transmitted from the controller 11.

Also, the server 14 transmits (distributes) contents encoded with MPEG2 (Moving Picture Experts Group phase 2) or MPEG4 (Moving Picture Experts Group phase 4) for example, to the renderers 13-1 through 13-N via the network 12, in response to content reproduction requests being transmitted from any of the renderers 13-1 through 13-N.

Note that in the following description, the renderers 13-1 through 13-N will be collectively referred to as "renderer 13", unless there is a particular need to refer to renderers individually. Also, while FIG. 1 shows an example of the content reproducing system 1 with only one controller 11 and server 14 each, to facilitate understanding, but in reality, multiple controllers 11 may be connected to the network 12, and in the same way, multiple servers 14 may also be provided.

FIG. 2 is a block diagram illustrating an example of the configuration of the controller 11.

The controller 11 includes a CPU (Central Processing Unit) 31, input switch matrix unit 32, ROM (Read Only Memory) 33, RAM (Random Access Memory) 34, a bus 35, a communication unit 36, a codec processing unit 37, a GDP (Graphic Display Processor) 38, an LCD (Liquid Crystal Display) 39, a data input/output interface 40, a recording device 41, and an infrared communication unit 42. The CPU 31, ROM 33, RAM 34, communication unit 36, codec processing unit 37, GDP 38, LCD 39, data input/output interface 40, and infrared communication unit 42, are connected to each other by the bus 35.

The CPU 31 controls each component of the controller 11. The CPU 31 executes various types of processing following programs stored in the ROM 33. The RAM 34 stores programs for the CPU 31 to execute, data, and so forth.

The input switch matrix unit 32 is configured to include a key operating unit, such as a numeric keypad, audio adjusting keys, image quality adjusting keys, channel keys, or the like, for example, and supplies predetermined operating signals to the CPU 31 under user operations.

The communication unit 36 is configured of a an interface for a wireless LAN compliant to IEEE 802.11, a cable LAN compliant to the Ethernet (a Registered Trademark) standard, or the like, for example, and communicates with other devices such as the renderers 13 either wirelessly or via cable.

The codec processing unit 37 performs encoding processing or decoding processing. For example, the codec processing unit 37 subjects to encoding processing terrestrial or satellite airwaves or the like received from an unshown antenna and supplied from the communication unit 36 or a tuner (not shown), and supplies the audio or image data obtained by the encoding processing to a recording device 41 via the data input/output interface. Also, for example, the codec processing unit 37 subjects to decoding processing the audio or image data supplied from the recording device 41 via the data input/output interface 40, and supplies the image data obtained by the decoding processing to the GDP 38, while supplying the audio data to an unshown speaker or the like.

The GDP 38 drives and controls the LCD 39 to display images on the LCD 39. For example, the GDP 38 displays images of the image data decoded by the codec processing unit 37 on the LCD 39.

The data input/output interface 40 is configured of a predetermined interface corresponding to the recording device 41, such as a USB (Universal Serial Bus) or memory card interface. For example, in the event that the recording device 41 is a hard disk drive, the data input/output interface 40 in the is configured of a predetermined interface corresponding to the interface of the hard disk drive.

The recording device 41 is configured of, for example, a hard disk, memory card, recordable DVD (Digital Versatile Disc) or CD (Compact Disc), BD (Blu-Ray Disc), MD (Minidisk) (Registered Trademark) or the like, and is connected to the data input/output interface 40. For example, the recording device 41 records encoded audio or image data supplied from the data input/output interface 40, or supplies the encoded audio or image data recorded within itself to the codec processing unit 37.

The infrared communication unit 42 generates infrared commands compliant to SIRCS (Serial Infrared Remote Control System) for example, under control of the CPU 31, and transmits the generated infrared commands to other devices. Also, the infrared communication unit 42 receives infrared commands transmitted from other devices, such as SIRCS-compliant infrared commands, for example.

Figure 3:
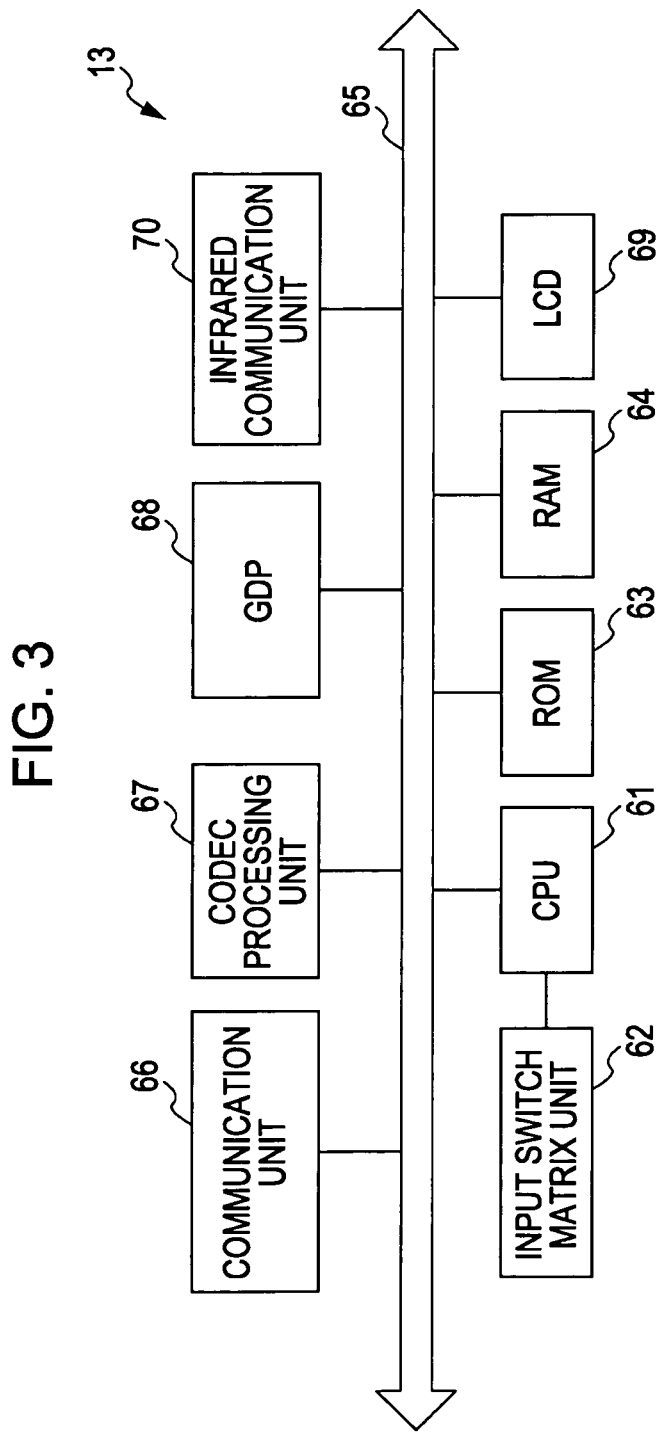
FIG. 3 is a block diagram illustrating an example of the configuration of a renderer.

FIG. 3 is a block diagram illustrating an example of the configuration of a renderer 13.

The renderer 13 includes a CPU 61, input switch matrix unit 62, ROM 63, RAM 64, a bus 65, communication unit 66, codec processing unit 67, GDP 68, LCD 69, and infrared communication unit 70. The CPU 61, ROM 63, RAM 64, communication unit 66, codec processing unit 67, GDP 68, LCD 69, and infrared communication unit 70, are connected to each other by the bus 65.

The CPU 61 controls each component of the renderer 13. The CPU 61 executes various types of processing following programs stored in the ROM 63. The RAM 64 stores programs for the CPU 61 to execute, data, and so forth.

The input switch matrix unit 62 is configured to include a key operating unit, such as a numeric keypad, audio adjusting keys, image quality adjusting keys, channel keys, or the like, for example, and supplies predetermined operating signals to the CPU 61 under user operations.

The communication unit 66 is configured of a an interface for a wireless LAN compliant to IEEE 802.11, a cable LAN compliant to the Ethernet (Registered Trademark) standard, or the like, for example, and communicates with other devices such as the controller 11 either wirelessly or via cable.

The codec processing unit 67 performs encoding processing or decoding processing. For example, the codec processing unit 67 subjects to encoding processing, picture signals obtained by decoding broadcast corresponding to terrestrial or satellite airwaves or the like received from an unshown antenna and supplied from the communication unit 66 or a tuner (not shown), and supplies the audio or image data obtained by the encoding processing to a recording device. Also, for example, the codec processing unit 67 subjects to decoding processing the audio or image data supplied from the recording device 71 via the data input/output interface 70, and supplies the image data obtained by the decoding processing to the GDP 68, while supplying the audio data to an unshown speaker or the like.

The GDP 68 drives and controls the LCD 69 to display images on the LCD 69. For example, the GDP 68 displays images of the image data decoded by the codec processing unit 67 on the LCD 69.

The infrared communication unit 70 generates infrared commands compliant to SIRCS (Serial Infrared Remote Control System) for example, under control of the CPU 61, and transmits the generated infrared commands to other devices. Also, the infrared communication unit 72 receives infrared commands transmitted from other devices, such as SIRCS-compliant infrared commands, for example. Note that the renderer 13 may be of the same configuration as that shown in FIG. 2.

Figure 4:
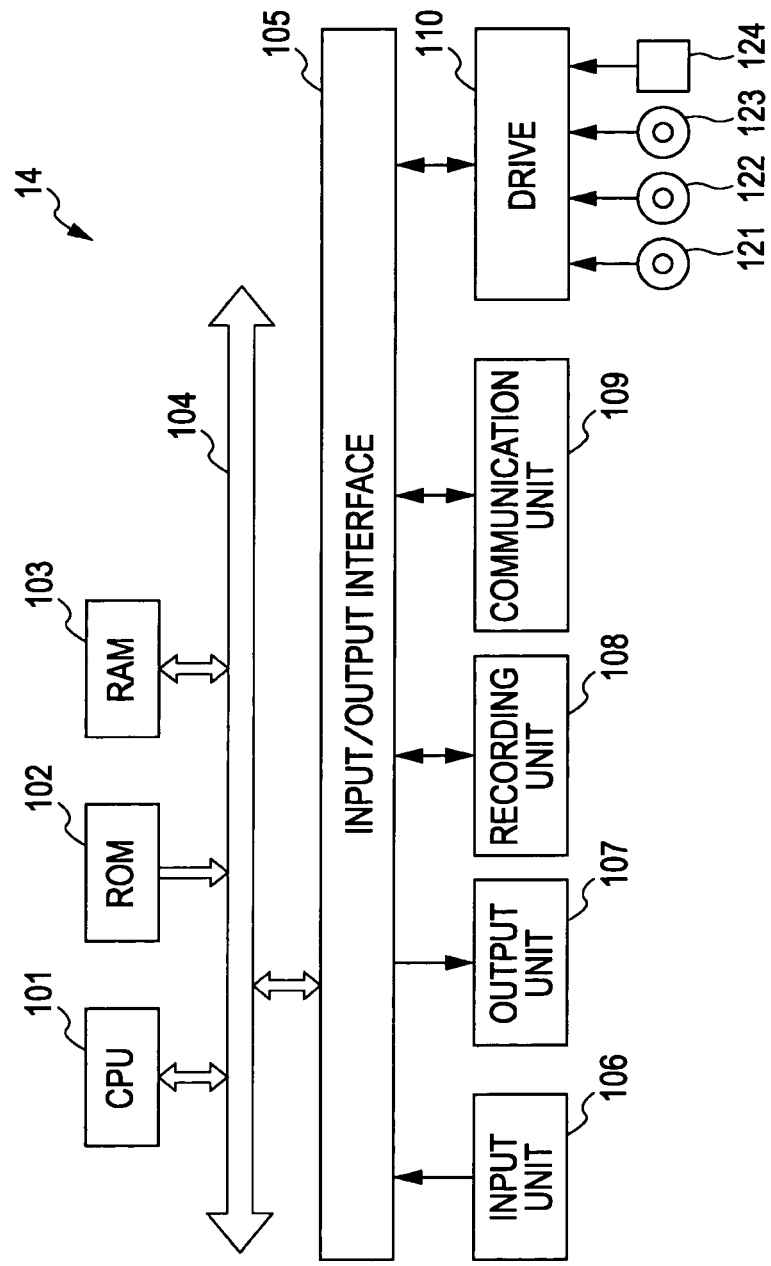
FIG. 4 is a block diagram illustrating an example of the configuration of a server.

FIG. 4 is a block diagram illustrating an example of the configuration of the server 14.

A CPU 101 executes various types of processing following programs stored in ROM 102, and programs stored in a recording unit 108. RAM 103 stores programs for the CPU 101 to execute, data, and so forth. The CPU 101, ROM 102, and RAM 103 are connected with each other via a bus 104.

An input/output interface 105 is also connected to the CPU 101 via the bus 104. Connected to the input/output interface 105 are an input unit 106 made up of a keyboard, mouse, or the like, and an output unit 107 made up of a display or the like. The CPU 101 executes various types of processing in respond to instructions input form the input unit 106. The CPU 101 then outputs images and audio and the like obtained as the result of processing to the output unit 107.

The recording unit 108 connected to the input/output interface 105 is configured of a hard disk or the like for example, and records programs to be executed by the CPU 101 and various types of data. A communication unit 109 communicates with external device via the network 12, the Internet, other networks, or communication media. Or, programs may be obtained via the communication unit 109, and stored in the recording unit 108.

A drive 110 is connected to the input/output interface 105. Upon media such as a magnetic disk 121, optical disk 122, magneto-optical disk 123, or semiconductor memory 124 of the like being mounted thereto, the drive 110 drives the media so as to obtain the programs and data and the like recorded therein. The obtained programs and data are transferred to the recording unit 108 as necessary, and stored.

Figure 5:
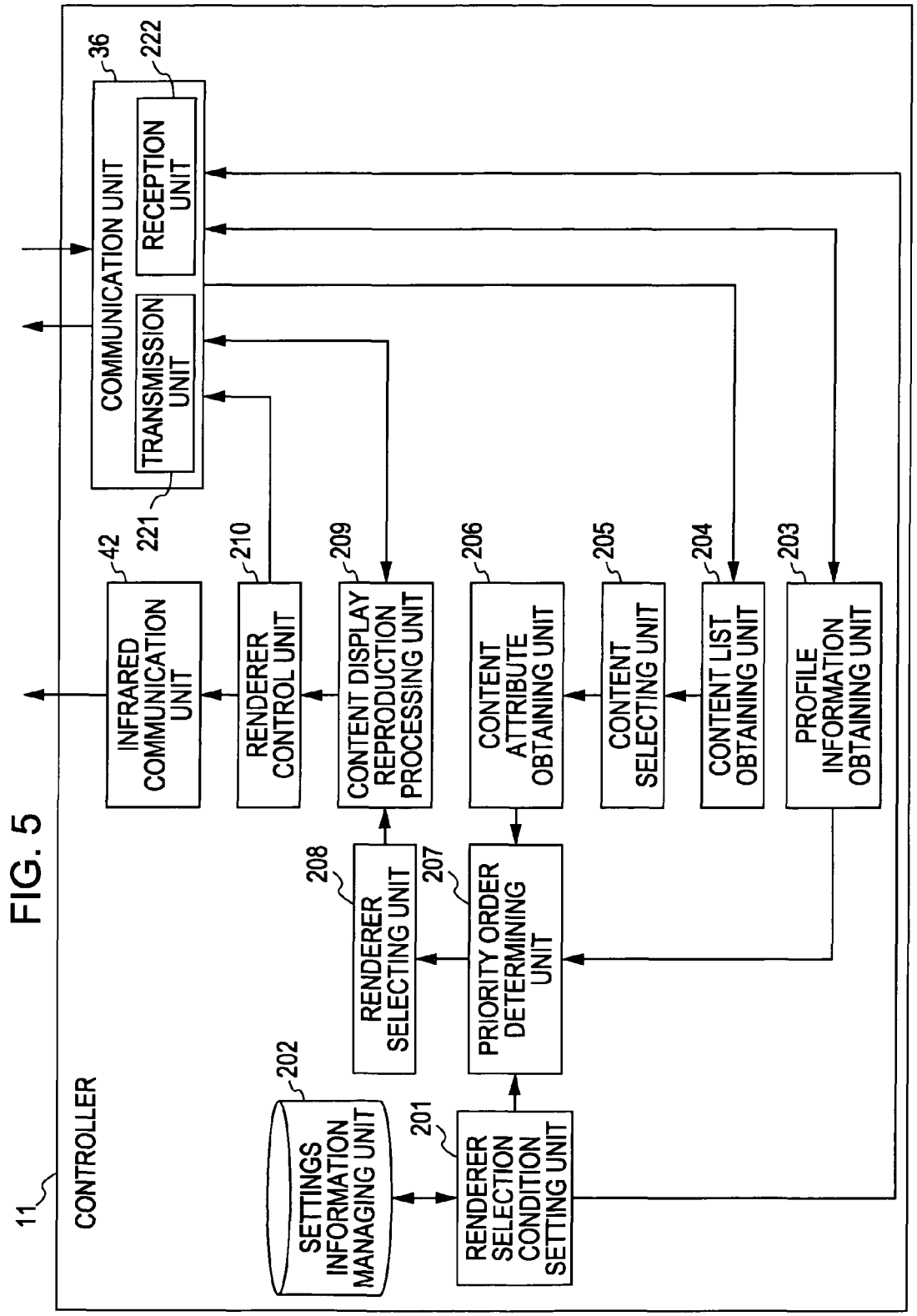
FIG. 5 is a block diagram illustrating an example of the configuration of controller functions.

FIG. 5 is a block diagram illustrating a configuration example of the functions of the controller 11.

The controller 11 is configured including a communication unit 36, an infrared communication unit 42, a renderer selection condition setting unit 201, a settings information managing unit 202, a profile information obtaining unit 203, a content list obtaining unit 204, a content selecting unit 205, a content attribute obtaining unit 206, a priority order determining unit 207, a renderer selecting unit 208, a content display reproduction processing unit 209, and a renderer control unit 210.

The renderer selection condition setting unit 201 sets renderer selection conditions. For example, the renderer selection condition setting unit 201 sets renderer selection conditions by recording in the settings information managing unit 202 information relating to the renderer 13 set by the user (hereafter referred to as "settings information"), in response to operations of the input switch matrix unit 32 by the user.

Also, the renderer selection condition setting unit 201 supplies the settings information to the priority order determining unit 207.

Further, the renderer selection condition setting unit 201 generates renderer search request for searching for renderers 13 which are connected to the network 12 and which are capable of responding. The renderer selection condition setting unit 201 supplies the generated renderer search requests to the communication unit 36.

The communication unit 36 is equivalent to the communication unit 36 shown in FIG. 2, and communicates with renderers 13 and the server 14 via the network 12, for example.

The communication unit 36 is configured including a transmission unit 221 which transmits various types of data, and a reception unit 222 which receives various types of data. The transmission unit 221 transmits renderer search requests supplied from the renderer selection condition setting unit 201 to the renderers 13 via the network 12. The reception unit 222 supplies profile information received from the renderers 13 to the profile information obtaining unit 203 via the network 12.

The profile information obtaining unit 203 supplies the profile information supplied from the communication unit 36 to the priority order determining unit 207. Also, the profile information obtaining unit 203 generates content list obtaining requests for requesting a list of contents which the server 14 can provide. The profile information obtaining unit 203 supplies the generated content list obtaining requests to the communication unit 36.

The transmitting unit 221 transmits the content list obtaining requests supplied from the profile information obtaining unit 203 to the server 14 via the network 12. The reception unit 222 supplies the content list received from the server 14 to the content list obtaining unit 204 via the network 12.

The content list obtaining unit 204 obtains the content list supplied from the communication unit 36, and supplies the obtained content list to the GDP 38, thereby displaying the content list on the screen of the LCD 39.

The content selecting unit 205 accepts selection of a content from the content list displayed on the screen of the LCD 39, in response to operation of the input switch matrix unit 32 by the user. Also, the content selecting unit 205 obtains content attribute information relating to the selected content from the content list obtaining unit 204, and supplies the obtained content attribute information to the content attribute obtaining unit 206.

The content attribute obtaining unit 206 obtains the content attribute information supplied from the content selecting unit 205. The content attribute obtaining unit 206 then supplies the obtained content attribute information to the priority order determining unit 207.

The priority order determining unit 207 performs priority order determining processing based on the settings information supplied from the renderer selection condition setting unit 201, the profile information supplied from the profile information obtaining unit 203, and the content attributes supplied from the content attribute obtaining unit 206. The priority order determining unit 207 supplies the processing results of the priority order determining processing to the renderer selecting unit 208.

The renderer selecting unit 208 supplies a list of compatible renderers 13 to the GDP 38 based on the processing results of the priority order determining processing supplied from the priority order determining unit 207, thereby displaying the list of renderers 13 on the screen of the LCD 39. Also, the renderer selecting unit 208 accepts selection of a renderer 13 from the list of renderers 13 displayed on the screen of the LCD 39, in response to operation of the input switch matrix unit 32 by the user. The renderer selecting unit 208 supplies information indicating the selected renderer 13 to the content display reproduction processing unit 209.

The content display reproduction processing unit 209 generates a content reproduction instruction, which is a request instructing reproducing of the content, based on the information indicating the content to reproduce and information indicating the selected renderer 13, supplied from the renderer selecting unit 208. The content display reproduction processing unit 209 then supplies the generated content reproduction instruction to the communication unit 36.

The transmission unit 221 transmits the content reproduction instruction supplied from the content display reproduction processing unit 209 to the renderer 13 via the network 12. The reception unit 222 supplies the usage status information received from the renderer 13 to the content display reproduction processing unit 209 via the network 12.

The content display reproduction processing unit 209 supplies usage status information to the GDP 38 based on the usage status information supplied from the communication unit 39, thereby displaying the usage status information on the screen of the LCD 39.

The renderer control unit 210 generates an input switchover command, which is a command for switching input of audio to a later-described amplifier 501, following instructions from the content display reproduction processing unit 209, and supplies the generated input switchover command to the infrared communication unit 42. Also, in the event that the later-described amplifier 501 is connected to the network 12, the renderer control unit 210 supplies the generated input switchover command to the communication unit 36.

The infrared communication unit 42 is equivalent to the infrared communication unit 42 shown in FIG. 2, and transmits the input switchover commands supplied from the renderer control unit 210 to the later-described amplifier 501, as SIRCS compliant infrared commands, for example.

Figure 6:
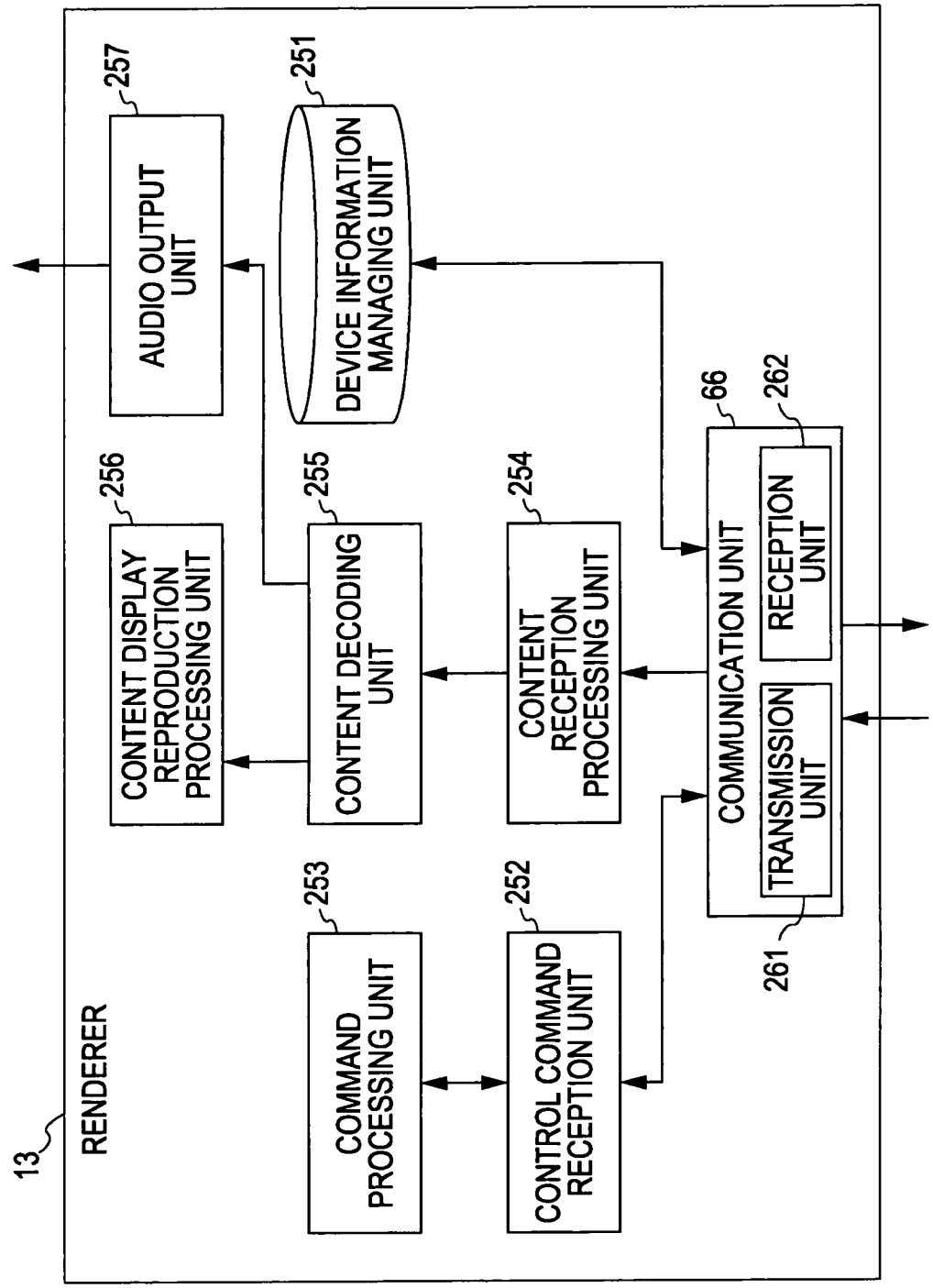
FIG. 6 is a block diagram illustrating an example of the configuration of renderer functions.

FIG. 6 is a bock diagram illustrating a functional configuration example of a renderer 13.

The renderer 13 is configured including a communication unit 66, a device information managing unit 251, a control command reception unit 252, a command processing unit 253, a content reception processing unit 254, a content decoding unit 255, a content display reproduction processing unit 256, and an audio output unit 257.

The communication unit 66 is equivalent to the communication unit 66 shown in FIG. 3, and communications with the controller 11 and server 14 via the network 12, for example.

The communication unit 66 is configured including a transmission unit 261 which transmits various types of data, and a reception unit 262 which receives various types of data. The reception unit 262 supplies renderer search requests information received from the controller 11 to the device information managing unit 251 via the network 12.

The device information managing unit 251 generates profile information based on the device information which it has stored in itself. The device information managing unit 251 then supplies the generated profile information to the communication unit 66.

The transmission unit 261 transmits profile information supplied from the device information managing unit 251 to the controller 11 via the network 12. The reception unit 262 supplies the content reproduction instruction received from the controller 11 to the control command reception unit 252 via the network 12.

The control command reception unit 252 determines whether or not a content reproduction instruction has been received, based on the content reproduction instruction received from the controller 11 which is a content reproduction instruction supplied from the communication unit 66.

In the event that determination has been made that a content reproduction instruction has been received, the command processing unit 253 determines whether it itself (i.e., the renderer 13) is being used. In the event that determination is made that the renderer 13 itself is not in use, this means that the renderer 13 itself can be used to reproduce the content, so the command processing unit 253 generates a content reproduction request for requesting providing of the predetermined content as to the server 14, and supplies the generated content reproducing request to the communication unit 66 via the control command reception unit 252. The transmission unit 261 transmits the content reproduction request supplied from the control command reception unit 252 to the server 14 via the network 12.

Also, in the event that determination is made that the renderer 13 itself is in use, the command processing unit 253 generates usage status information indicating that it is in use. The command processing unit 253 supplies the generated usage status information to the communication unit 66 via the control command reception unit 252.

The transmitting unit 261 transmits the usage status information supplied from the control command reception unit 252 to the controller 11 via the network 12. The reception unit 262 supplies the content received from the server 14 to the content reception processing unit 254 via the network 12.

The content reception processing unit 254 determines whether or not a content has been received, based on the content received from the server 14 which is the content supplied from the communication unit 66.

The content decoding unit 255 subjects the content supplied from the content reception processing unit 254 to predetermined decoding processing corresponding to the later-described content encoding unit 303, and supplies the content obtained by the decoding processing to the content display reproduction processing unit 256.

Also, in the event that displaying of the images of the content and output of the audio of the content are to be handled by two separate renderers 13, the content decoding unit 255 subjects the content supplied from the content reception processing unit 254 to predetermined decoding processing corresponding to the content encoding unit 303, and supplies the image data of the decoded content data obtained by the decoding processing to the content display reproduction processing unit 256, and the audio data thereof to the audio output unit 257.

The content display reproduction processing unit 256 supplies the content to the GDP 38, thereby displaying the content on the screen of the LCD 69, and content reproduction is started. The audio output unit 257 supplies the audio data of the content supplied from the content decoding unit 255 to a later-described amplifier 501 via a later-described able 503.

Figure 7:
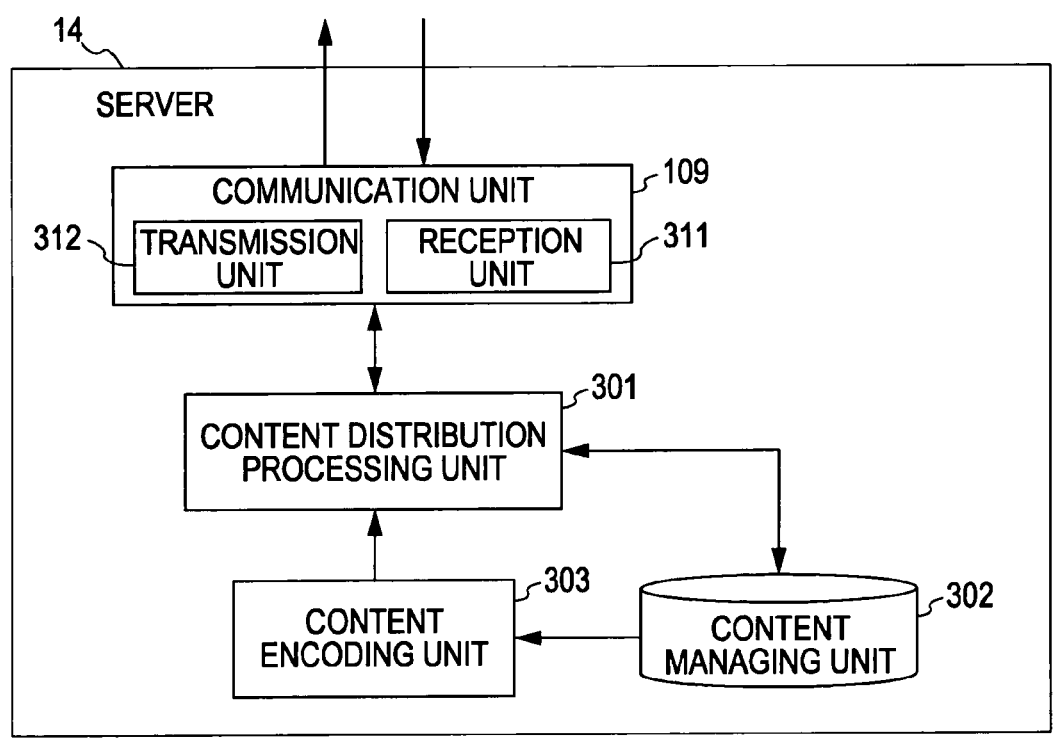
FIG. 7 is a block diagram illustrating an example of the configuration of server functions.

FIG. 7 is a block diagram illustrating a functional configuration example of the server 14.

The server 14 is configured including a communication unit 109, a content distribution processing unit 301, content managing unit 302, and content encoding unit 303.

The communication unit 109 is equivalent to the communication unit 109 shown in FIG. 4, and communicates with the controller 11 and renderers 13 via the network 12, for example.

The communication unit 109 is configured including a transmission unit 312 which transmits various types of data, and a reception unit 311 which receives various types of data. The reception unit 311 supplies content list obtaining requests received from the controller 11 to the content distribution processing unit 301 via the network 12.

The content distribution processing unit 301 reads out information related to the content stored in the content managing unit 302 in response to the content list obtaining request supplied from the communication unit 109, and thereby generates a content list. The content distribution processing unit 301 supplies the generated content list to the communication unit 109.

The transmission unit 312 transmits the content list supplied from the content distribution processing unit 301 to the controller 11 via the network 12. The reception unit 311 supplies the content reproduction request received from the renderer 13 to the content distribution processing unit 301 via the network 12. The content distribution processing unit 301 supplies the content reproduction request supplied from the communication unit 109 to the content managing unit 302.

The content managing unit 302 supplies the content to the content encoding unit 303 in response to the content reproduction request supplied from the content distribution processing unit 301. The content encoding unit 303 obtains the content from the content managing unit 302, and subjects the obtained content to predetermined encoding processing, thereby supplying the content obtained by encoding to the content distribution processing unit 301.

The content distribution processing unit 301 obtains the content supplied from the content encoding unit 303, and supplies the obtained content to the communication unit 109. The transmission unit 312 transmits the content supplied from the content distribution processing unit 301 to the renderer 13 via the network 12.

Next, processing wherein renderers 13 capable of reproducing (displaying) a content selected by a user are displayed as a list according to a predetermined order of priority, the user selects a renderer 13 from the list, and the content is reproduced (displayed) on the selected renderer 13, will be described as an example of processing with the content reproduction system 1 according to the present invention, with reference to FIGS. 8 through 30.

In describing the content reproduction processing with reference to FIGS. 8 through 30, first, content reproduction processing performed by the controller 11 will be described with reference to FIGS. 8 through 28, next, content reproduction processing performed by the renderer 13 will be described with reference to FIG. 29, and finally, content reproduction processing performed by the server 14 will be described with reference to FIG. 30.

Figure 8:
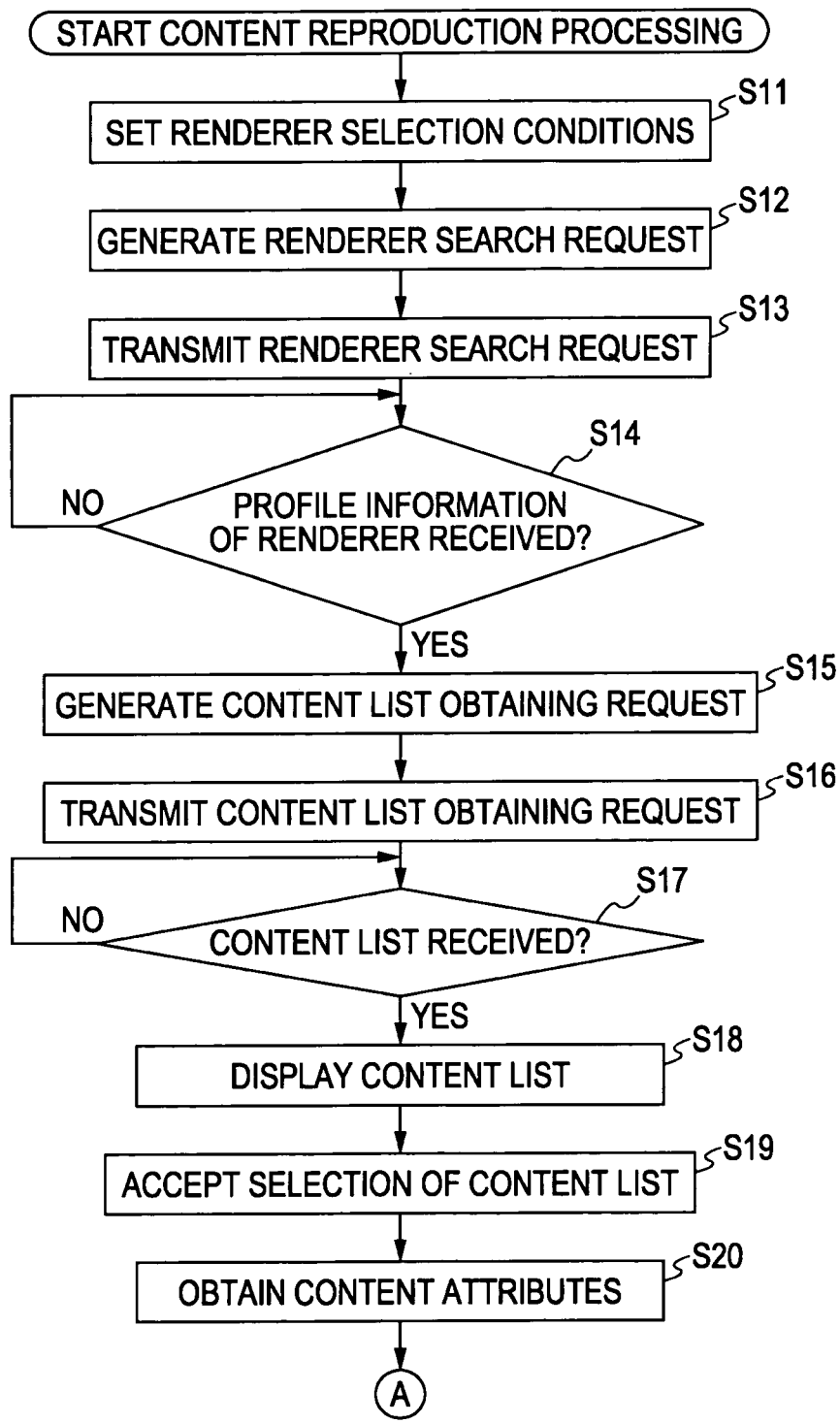
FIG. 8 is a flowchart for describing content reproduction processing with the controller.

FIG. 8 is a flowchart for describing the content reproduction processing with the controller 11.

In step S11, the renderer selection condition setting unit 201 stores in the settings information managing unit 202 settings information which is information of the renderer selection conditions relating to the renderer 13 set by the user, in response to operations made by the user at the input switch matrix unit 32, thereby setting the renderer section conditions. The renderer selection condition setting unit 201 also supplies the settings information to the priority order determining unit 207.

While described later in detail, the renderer selection conditions are conditions made up of settings information and profile information, for selecting the renderer 13 with which to reproduce the content.

FIG. 10 is a diagram illustrating an example of renderer selection conditions.

In the renderer selection conditions example shown in FIG. 10, the first column shows "content attributes" which is an item relating to the properties of each of the contents, the second column shows "parameters" which are values of the attributes corresponding to the attributes of the contents, the third column is "can user set parameters?" which indicates whether the user can set the parameters in the second column, and the fourth column is "notes" serving as supplementary explanation on each of the items of content attributes shown in the first column.

The first row is headings, and the second row on show data of each of the attributes of the contents. For the conditions data from the second row through the ninth row, the attributes of the second row through the fourth row are profile information obtained from the renderer 13, and the attributes in the fifth row through the ninth row are settings information set by the user.

In the example of renderer selection conditions shown in FIG. 10, parameters of the attribute "compatible codec methods" in the space second from the top at the far left are listed as being, for example, "MPEG2", "MPEG4", "WMV (Windows Media Video) (Registered Trademark)", "LPCM (Linear Pulse Code Modulation)", "MP3 (MPEG Audio Layer-3)", "ATRAC3 (Adaptive TRansform Acoustic Coding 3) (Registered Trademark)", and "JPEG (Joint Photographic Experts Group)", as codecs compatible with the renderer 13.

Any renderer 13 which cannot decode data according to the codec method set as the attribute of the content according to "compatible codec methods" cannot reproduce the content, so only renderers 13 capable of handling the codec method at issue are selected as candidates, based on the profile information. Note that the user cannot set the parameters for attributes of the content with "compatible codec methods".

Also, "photo", "music", "video", "TV", "games", or combinations of these, for example, are listed as being parameters for the attribute "compatible content types" for the renderers 13 in the space third from the top at the far left.

Any renderer 13 which cannot handle the content type set as the attribute of the content according to "compatible content types" cannot reproduce the content, so only renderers 13 capable of handling the content type at issue are selected as candidates, based on the profile information. Note that the user cannot set the parameters for attributes of the content with "compatible content types".

Further, "number of horizontal dots by vertical dots", or resolution description information such as "VGA (Video Graphics Array)", for example, are listed as being parameters for the attribute "compatible image resolutions" for the renderers 13 in the space fourth from the top at the far left.

Any renderer 13 which cannot handle the resolution which is the attribute of the content according to "compatible image resolutions" cannot reproduce the content, so only renderers 13 capable of handling the resolution at issue are selected as candidates, based on the profile information. Note that the user cannot set the parameters for attributes of the content with "compatible image resolutions".

Also, renderers 13 capable of using viewer-restricted content, such as information indicating whether or not the content can be used, for example, are specified by the parameters of the attribute "viewer-restricted content" in the space fifth from the top at the far left. These parameters are settings information, and are set by the user.

Also, renderers 13 capable of using pay content, such as information indicating whether or not pay content can be used, for example, are specified by the parameters of the attribute "pay content" in the space sixth from the top at the far left. These parameters are settings information, and are set by the user.

Also, renderers 13 capable of using the content according to the location where content providing device (e.g., server 14) is installed, are specified by the parameters of the attribute "location where content providing device is installed", such as "living room", "bedroom", or "study", for example, in the space seventh from the top at the far left. These parameters are settings information, and are set by the user.

Also, renderers 13 capable of using the content according to the owner of the content are specified by the parameters of the attribute "owner of content", such as "father" and "sister", for example, in the space eighth from the top at the far left. These parameters are settings information, and are set by the user.

Also, the attribute "order of priority of renderer for each compatible content type" in the space ninth from the top at the far left indicates specifying the order of priority of the renderer 13 to be used for each type such as "photo", "music", "video", "TV", "games", or combinations of these. Specifically, if we say that we have as renderers 13 for displaying "photos", the "TV in living room", the "PC in living room", and "TV in study", each of these are assigned an order of priority, such as "1", "2", and "3", respectively, so that at the time of displaying photos, "TV in living room" is displayed first according to the order of priority, and in the event that the photos cannot be displayed on the "TV in living room", the "PC in living room", and "TV in study" are displayed in that order.

Now, as described above, of the "content attributes" of the renderer selection conditions shown in FIG. 10, the renderer selection conditions which can be set by the user are the attributes where "can user set parameters?" indicates user-set attributes, i.e., viewer-restricted content, pay content, location where content providing device is installed, content owner, and order of priority of renderer for each compatible content type.

Accordingly, in the following, description will be made regarding operations for setting the viewer-restricted content, pay content, location where content providing device is installed, content owner, and order of priority of renderer for each compatible content type, as specific examples of operations performed by the user for setting renderer selection conditions, with reference to FIGS. 11 through 23.

First, the order of priority of the renderers for each type of compatible content will be described with reference to FIGS. 11 through 14.

Figure 11:
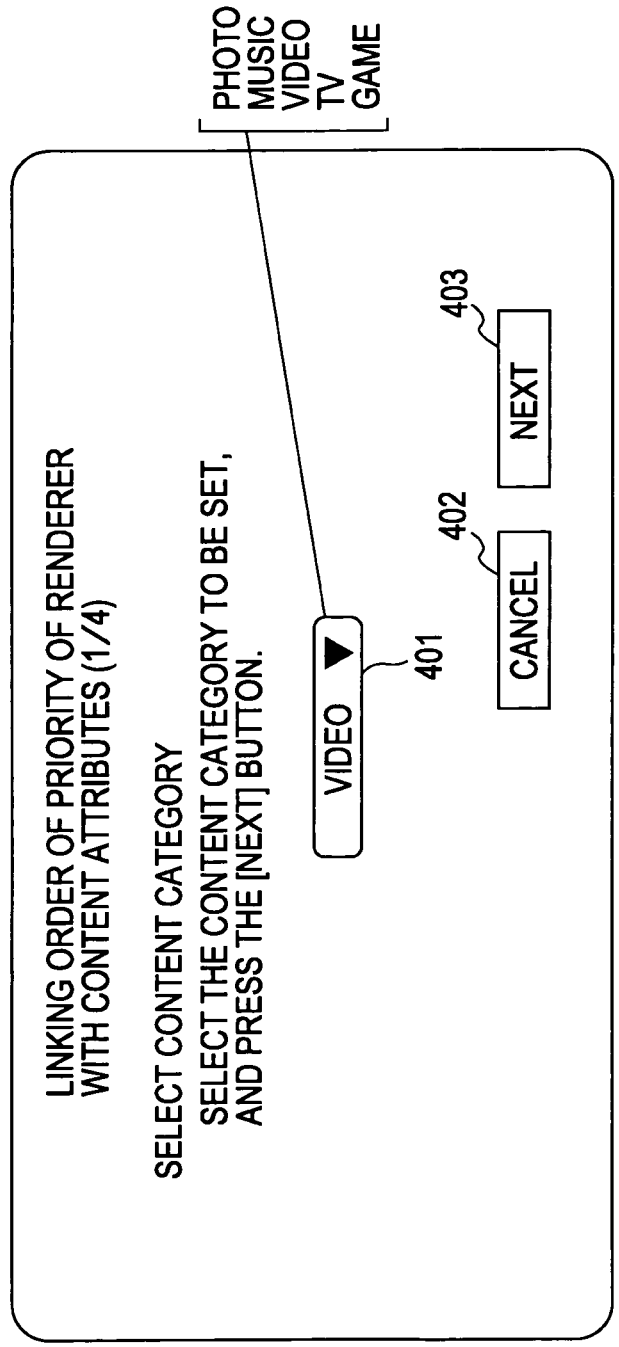
FIG. 11 is a diagram illustrating an example of the screen of an LCD displaying an order of priority setting screen (1/4)

FIG. 11 is a diagram illustrating an example of a screen displayed on the LCD 39, showing a screen for setting the order of priority of renderers 13 for each type of compatible content, hereafter referred to as "order of priority setting screen".

The order of priority setting screen (1/4) shown in FIG. 11 is an example of a screen for providing the user with a selection of compatible content types, and displayed in this screen are a pull-down menu 401 for selecting the compatible content types, a button 402 for canceling selection of the compatible content types, and a button 403 for going to the next operation in setting the order of priority of renders according to the compatible content type selected here.

Note that the title "linking order of priority of renderer with content attributes (1/4)" at the top of the order of priority setting screen (1/4) indicates that the operation for setting the order of priority of the renderers 13 for each type of compatible content in the order of priority setting screens is an operation for linking the order of priority of the renderers 13 with the attributes of the content. Also, the "1/4" in the aforementioned order of priority setting screen (1/4) indicates that this is the first screen of four order of priority setting screens, and the second screen will be called the order of priority setting screen (2/4), the third screen the order of priority setting screen (3/4), and the fourth screen the order of priority setting screen (4/4), in the subsequent description.

Upon operation by the user, the pull-down menu 401 displays the parameters of compatible content types, e.g., "photo", "music", "video", "TV", and "games". For example, in the event that the content type which the user wants to set is "video", the parameter "video" is selected from these parameters. The user then presses the button 403, thereby bringing up the later-described order of priority setting screen (2/4) shown in FIG. 12 on the screen of the LCD 39.

Figure 12:
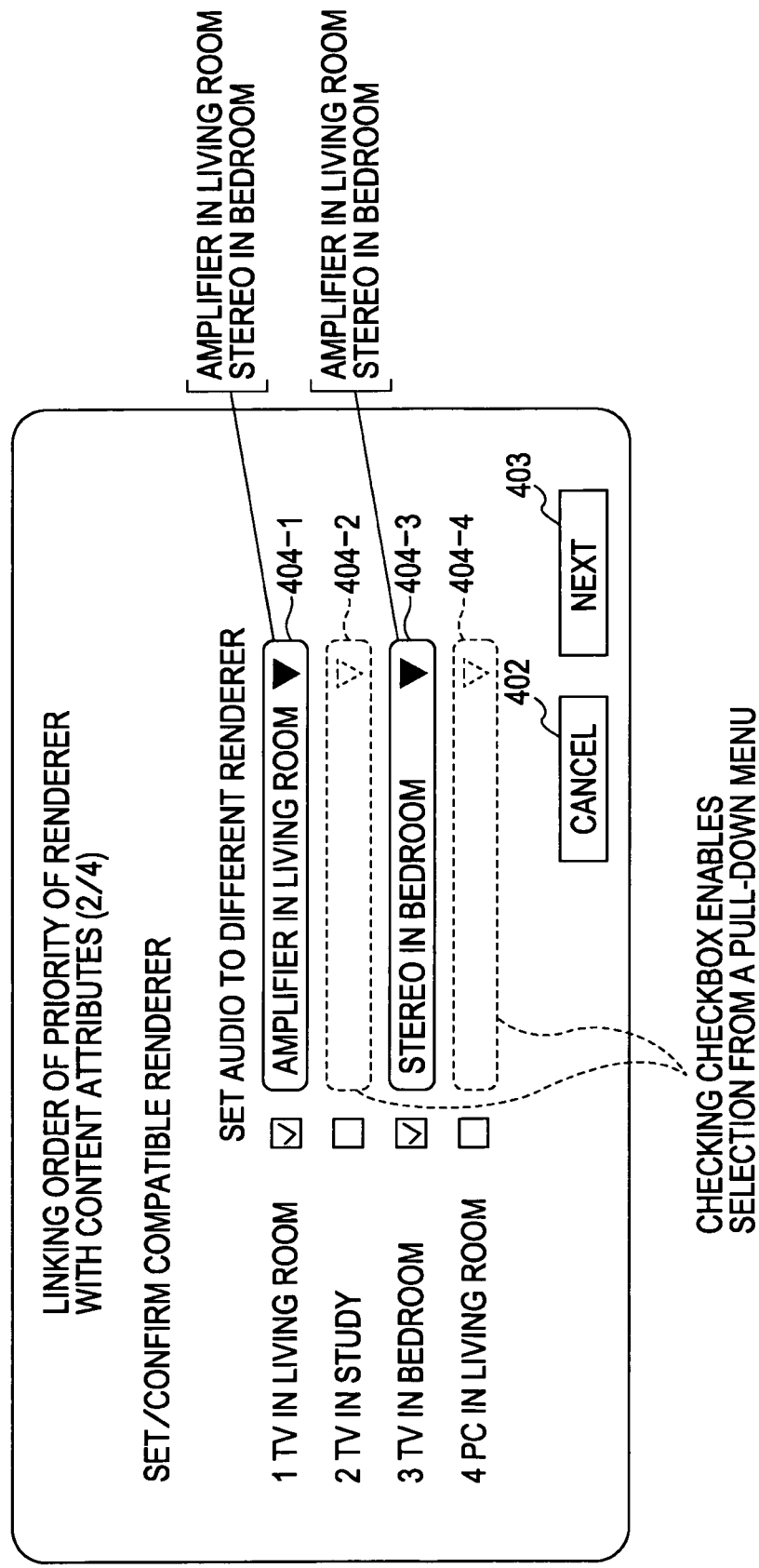
FIG. 12 is a diagram illustrating an example of the screen of an LCD displaying an order of priority setting screen (2/4)

FIG. 12 is a diagram illustrating an example of a screen displayed on the LCD 39 showing the order of priority setting screen (2/4). Portions which are the same as with FIG. 11 are denoted with the same reference numerals, and description thereof will be omitted as appropriate.

The example of the order of priority setting screen (2/4) shown in FIG. 12 is a screen used in a case wherein, for example, the user desires to output the audio of video (video content) selected in the order of priority setting screen (1/4) from a different renderer 13, for selecting the device (renderer 13) from which to output the audio.

The order of priority setting screen (2/4) displays "TV in living room", "TV in study", "TV in bedroom", and "PC in living room" as renderers 13. Each renderer 13 has a checkbox shown to the right; checking this checkbox brings up pull-down menu to the right of the checkbox from which selection can be made.

For example, in the event that the checkbox to the right side of "TV in living room" is checked, a pull-down menu 404-1 is displayed to the right side of the checkbox. In the event that the user operates the pull-down menu 404-1, the parameters "amplifier in living room" and "stereo in bedroom" are displayed as renderers 13 for outputting audio. For example, in the event that the renderer 13 from which the user wishes to output the audio is the "amplifier in living room", the parameter "amplifier in living room" is selected from the parameters. The user then presses the button 403, thereby bringing up the later-described order of priority setting screen (3/4) shown in FIG. 13 on the screen of the LCD 39.

That is to say, while details will be describe later, this allows displaying of images and output of audio to be performed at separate renderers 13. For example, an arraignment may be made wherein the "TV in living room" outputs the images by itself, and outputs the audio from the "amplifier in living room".

Note that while description has been made in the example above regarding operations for selecting a renderer 13 for outputting the audio for the "TV in living room" from the "TV in living room", "TV in study", "TV in bedroom", and "PC in living room", renderers 13 for outputting the audio can be selected for the remaining "TV in study", "TV in bedroom", and "PC in living room", as well, with a pull-down menu 404-2, pull-down menu 404-3, and pull-down menu 404-4, respectively. Also, in the event that there is no need to output audio from another renderer 13, such as cases of outputting the audio itself, all that is necessary is to not check the checkbox.

Figure 13:
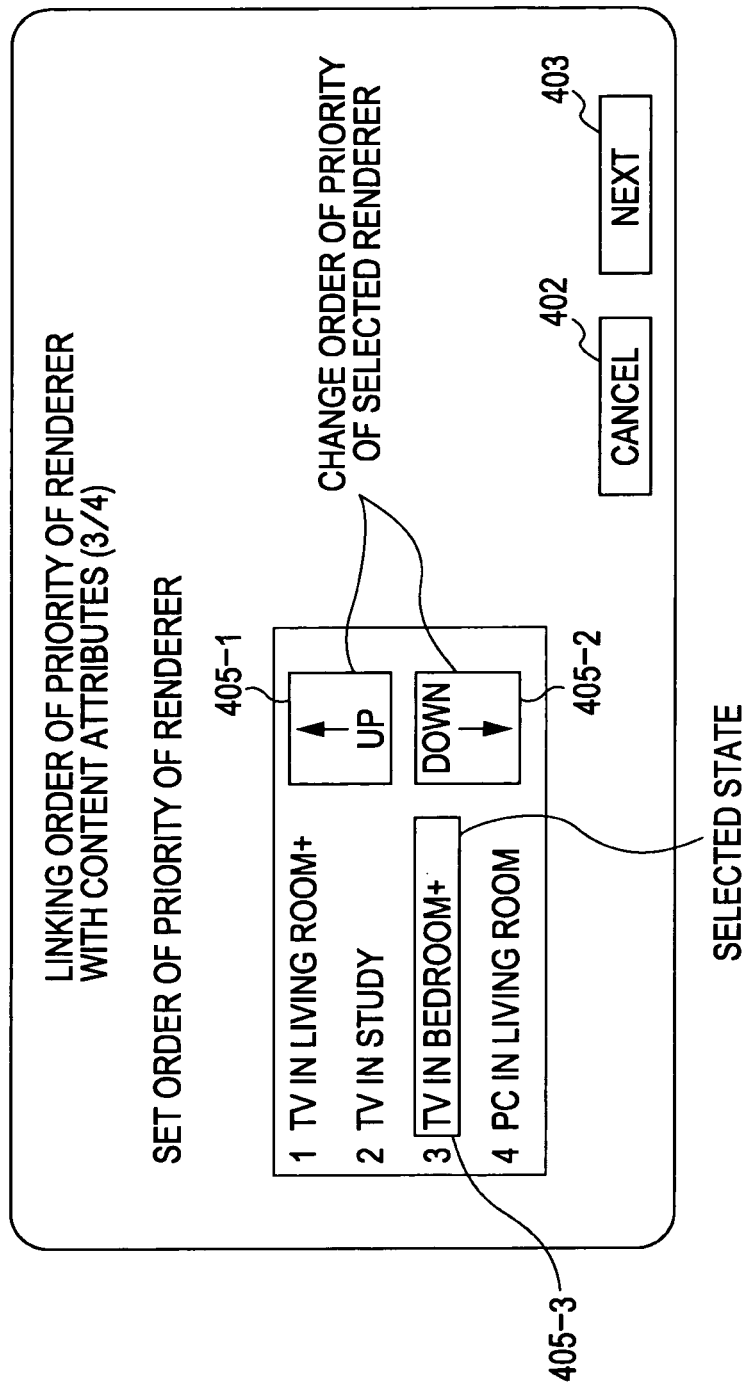
FIG. 13 is a diagram illustrating an example of the screen of an LCD displaying an order of priority setting screen (3/4)

FIG. 13 is a diagram illustrating an example of a screen displayed on the LCD 39 showing the order of priority setting screen (3/4). Portions which are the same as with FIG. 11 are denoted with the same reference numerals, and description thereof will be omitted as appropriate.

The example in the order of priority setting screen (3/4) shown in FIG. 13 is a screen for setting the order of priority of the renderers 13 for reproducing the video (video content) selected in the order of priority setting screen (1/4), for example.

The "TV in living room", "TV in study", "TV in bedroom", and "PC in living room" are displayed in the order of priority setting screen (3/4) as renderers 13. To the right of the renderers 13 are a button 405-1 for raising the order of priority of the renderer 13 selected by the cursor 405-3, and a button 405-2 for lowering the order of priority of the renderer 13 selected by the cursor 405-3.

For example, in the event that the user desires to raise the order of priority of the "TV in bedroom" of the renderers 13 for reproducing "video", the user selects the "TV in bedroom" from the "TV in living room", "TV in study", "TV in bedroom", and "PC in living room" using the cursor 405-3, and presses the button 405-1, thereby raising the order of priority of the "TV in bedroom" from "3" to "2" (which also lowers the order of priority of the "TV in study" from "2" to "3"). Conversely, in the event that the user desires to lower the order of priority of the "TV in bedroom", the user presses the button 405-2, thereby lowering the order of priority of the "TV in bedroom" from "3" to "4" (which also raises the order of priority of the "PC in living room" from "4" to "3"). The user then presses the button 403, thereby bringing up the later-described order of priority setting screen (4/4) shown in FIG. 15 on the screen of the LCD 39.

Note that the "+" shown to the right of "TV in living room" and "TV in bedroom" indicates that the audio is to be output from another renderer 13.

Thus, the order of priority of the renderers 13 is set for each compatible content type by the order of priority setting screen (3/4) in FIG. 13.

FIG. 14 is a diagram illustrating an example of compatible content types and order of priority for display selection.

In the example shown in FIG. 14, the first column shows the names of the renderers, and the second column on show the order of priority for each type of content. Also, the first row is the headings, and the second row on show the order of priority for each renderer name. The numbers in FIG. 14 indicate the order of priority, with "1" indicating the highest order of priority, and the greater the numbers grow, i.e., "2", "3", "4", and so on, the lower the order of priority is. In the event that the order of priority space is blank, this means that the renderer 13 is not compatible with that content type, i.e., cannot handle that content type.

In the example shown in FIG. 14, the second column from the left shows the order of priority for the renderers 13 which display "photo" contents. Here, "TV in living room", "PC in living room", and "TV in study" are each given orders of priority, i.e., "1", "2", and "3", as renderers 13 for displaying "photo", so in the event of displaying photographs, the "TV in living room" is displayed first according to the order of priority, and in the event that display cannot be made on the "TV in living room", display is made on the "PC in living room", and "TV in study" in that order of priority.

Also, in the same way, the third column from the left shows the order of priority for the renderers 13 which play "music" contents. Here, "stereo in bedroom", "amplifier in living room", "PC in living room", "TV in study", and "TV in living room" are each given orders of priority, i.e., "1", "2", "3", "4", and "5", as renderers 13 for playing "music", so in the event of playing music, the "stereo in bedroom" is played first according to the order of priority, and in the event that the music cannot be played on the "stereo in bedroom", the music is played on the "amplifier in living room", "PC in living room", "TV in study", and "TV in living room", in that order of priority.

Also, in the same way, the fourth column from the left shows the order of priority for the renderers 13 which reproduce (play) "video" contents. Here, "TV in study", "TV in living room", "TV in bedroom", and "PC in living room", are each given orders of priority, i.e., "1", "2", "3", and "4", as renderers 13 for reproducing (playing) "video", so in the event of playing video, the "TV in study" is displayed first according to the order of priority, and in the event that the video cannot be played on the "TV in study", the video is played on the "TV in living room", "TV in bedroom", and "PC in living room", in that order of priority.

Also, in the same way, the fifth column from the left shows the order of priority for the renderers 13 which display "TV" contents. Here, "TV in living room", "TV in bedroom", "TV in study", and "PC in living room", are each given orders of priority, i.e., "1", "2", "3", and "4", as renderers 13 for displaying "TV", so in the event of displaying TV, the "TV in living room" is displayed first according to the order of priority, and in the event that the TV cannot be displayed on the "TV in living room", the TV is displayed on the "TV in bedroom", "TV in study", and "PC in living room", in that order of priority.

Further, in the same way, the sixth column from the left shows the order of priority for the renderers 13 which display "game" contents. Here, "TV in living room", "TV in study", and "PC in living room", are each given orders of priority, i.e., "1", "2", and "3", as renderers 13 for displaying "games", so in the event of displaying games, the "TV in living room" is displayed first according to the order of priority, and in the event that the TV cannot be displayed on the "TV in living room", the TV is displayed on the "TV in study", and "PC in living room", in that order of priority.

Next, whether or not viewer-restricted contents and pay contents can be used, set for each renderer 13, will be described with reference to FIGS. 15 through 17.

Figure 15:
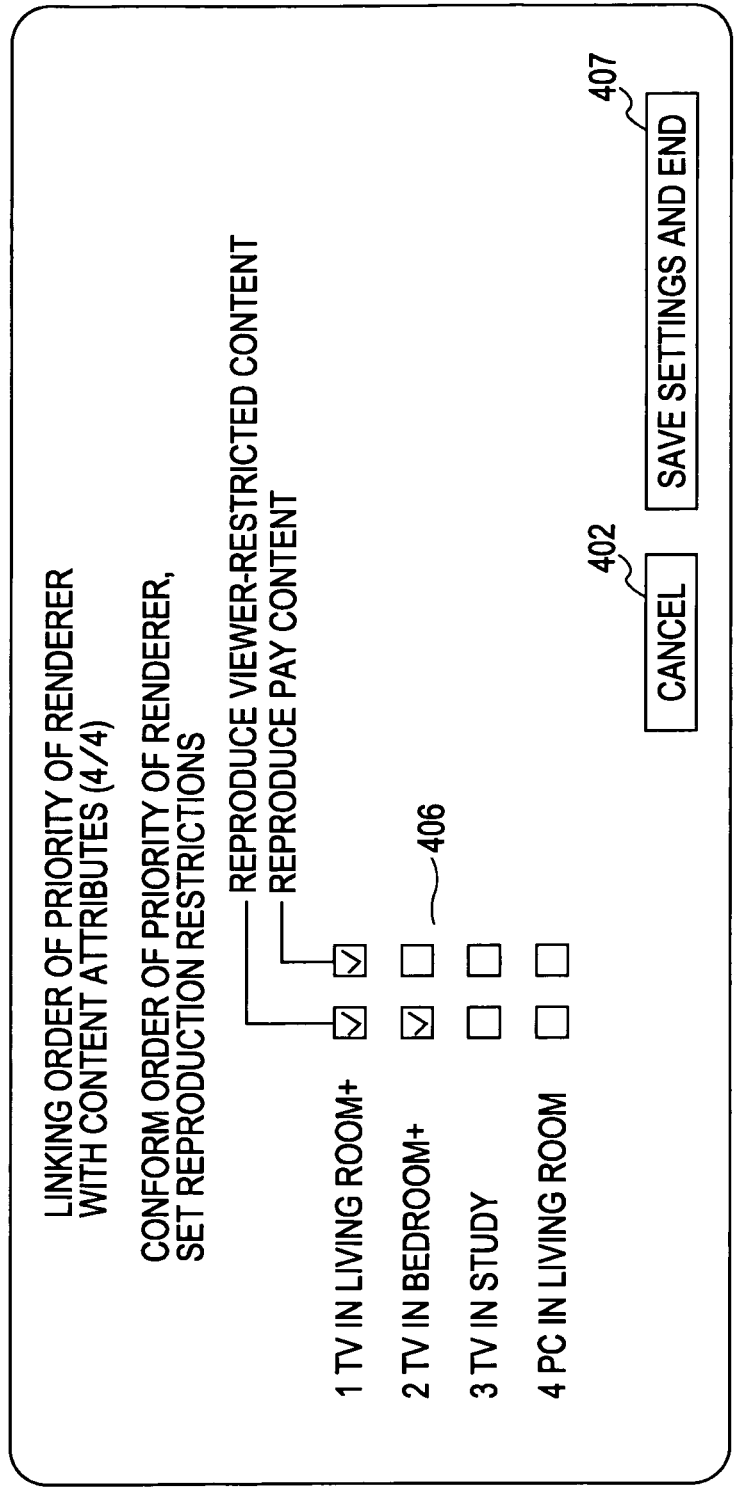
FIG. 15 is a diagram illustrating an example of the screen of an LCD displaying an order of priority setting screen (4/4)

FIG. 15 is a diagram illustrating an example of a screen displayed on the LCD 39 showing the order of priority setting screen (4/4). Portions which are the same as with FIG. 11 are denoted with the same reference numerals, and description thereof will be omitted as appropriate.

The example of the order of priority setting screen (4/4) shown in FIG. 15 is a screen allowing the user to set whether viewer-restricted content can be used, and whether pay content can be used, for each renderer 13.

The "TV in living room", "TV in study", "TV in bedroom", and "PC in living room" are displayed in the order of priority setting screen (4/4) as renderers 13. To the right of the renderers 13 are two checkboxes 406; checking the checkbox 406 to the left enables that renderer 13 to reproduce viewer-restricted contents, and checking the checkbox 406 to the right enables that renderer 13 to reproduce pay contents. A button 407 is also displayed to set and save the selected order of priority for the renderers for each compatible content type, viewer-restricted contents, and pay contents.

For example, in the event that the user wishes to be able to reproduce viewer-restricted content on the TV in the living room, of the checkboxes 406 next to "TV in living room", the user checks the checkbox 406 to the left. Also, in the event that the user wishes to be able to reproduce pay content on the TV in the living room, of the checkboxes 406 next to "TV in living room", the user checks the checkbox 406 to the right. Pressing the button 407 saves these settings.

Thus, viewer-restricted contents and pay contents are set for each renderer 13 with the order of priority setting screen (4/4) shown in FIG. 15.

FIG. 16 is a diagram illustrating an example of renderers capable of using viewer-restricted contents.

In the example shown in FIG. 16, the first column shows the names of the renderers, and the second column shows whether or not viewer-restricted content can be used. Also, the first row is headings, and spaces marked "Yes" in the second column indicate that the renderer 13 can use viewer-restricted content, and blank spaces indicate that the renderer 13 cannot use viewer-restricted content.

In the example shown in FIG. 16, the second row from the top shows that the renderer 13 which is the "TV in the living room" can use viewer-restricted content, the third row from the top shows that the "TV in the study" can use viewer-restricted content, the fourth row from the top shows that the "TV in the bedroom" can use viewer-restricted content, and the fifth row from the top shows that the "amplifier in the living room" can use viewer-restricted content.

On the other hand, the sixth row from the top shows that the "stereo in the bedroom" cannot use viewer-restricted content, and the seventh row from the top shows that the "PC in the living room" cannot use viewer-restricted content, either.

Next, FIG. 17 is a diagram illustrating an example of renderers capable of using pay contents.

In the example shown in FIG. 17, the first column shows the names of the renderers, and the second column shows whether or not pay content can be used. Also, the first row is headings, and spaces marked "Yes" in the second column indicate that the renderer 13 can use pay content, and blank spaces indicate that the renderer 13 cannot use pay content.

In the example shown in FIG. 17, the second row from the top shows that the renderer 13 which is the "TV in the living room" can use pay content, the third row from the top shows that the "TV in the study" cannot use pay content, the fourth row from the top shows that the "TV in the bedroom" cannot use pay content, and the fifth row from the top shows that the "amplifier in the living room" can use pay content.

Further, the sixth row from the top shows that the "stereo in the bedroom" cannot use pay content, and the seventh row from the top shows that the "PC in the living room" cannot use pay content, either.

Next, whether or not usage is permitted according to where the content providing device (e.g., server 14) is installed, an item which is set for each renderer 13, will be described with reference to FIGS. 18 through 20.

Figure 18:
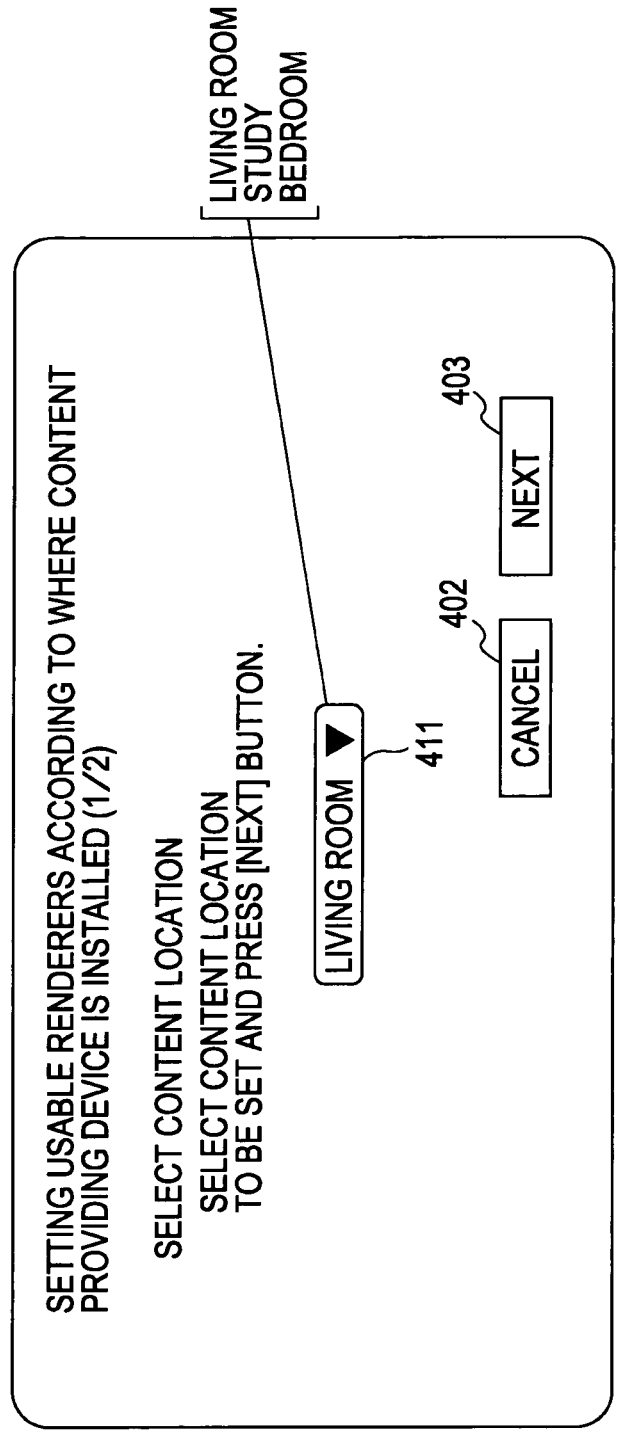
FIG. 18 is a diagram illustrating an example of the screen of an LCD displaying an installation location setting screen (1/2)

FIG. 18 is a diagram illustrating an example of a screen displayed on the LCD 39 showing a screen for setting whether or not usage is permitted according to where the content providing device is installed (hereinafter referred to as "location setting screen").

The example of the location setting screen (1/2) shown in FIG. 18 is an example of a screen for enabling the user to select whether or not to enabling usage of renderers 13 depending on the location where the content providing device, such as the server 14 for example, is installed. Displayed in the screen are a pull-down menu 411 for selecting the installation location of the content providing device, a button 402 for canceling selection of the installation location of the content providing device, and a button 403 for proceeding with the operation for setting whether or not to permit usage of the renderer 13 according to the selected installation location of the content providing device.

Note that the "1/2" in the "location setting screen (1/2)" indicates that this is the first screen of two location setting screens, and the second screen will be described below as location setting screen (2/2) in the same way.

Upon operation by the user, the pull-down menu 411 displays the parameters of, e.g., "living room", "study", and "bedroom", as locations of the content providing device. For example, in the event that the installation location of the content providing device that the user wishes to set is "living room", the user selects "living room" from these parameters.

Figure 19:
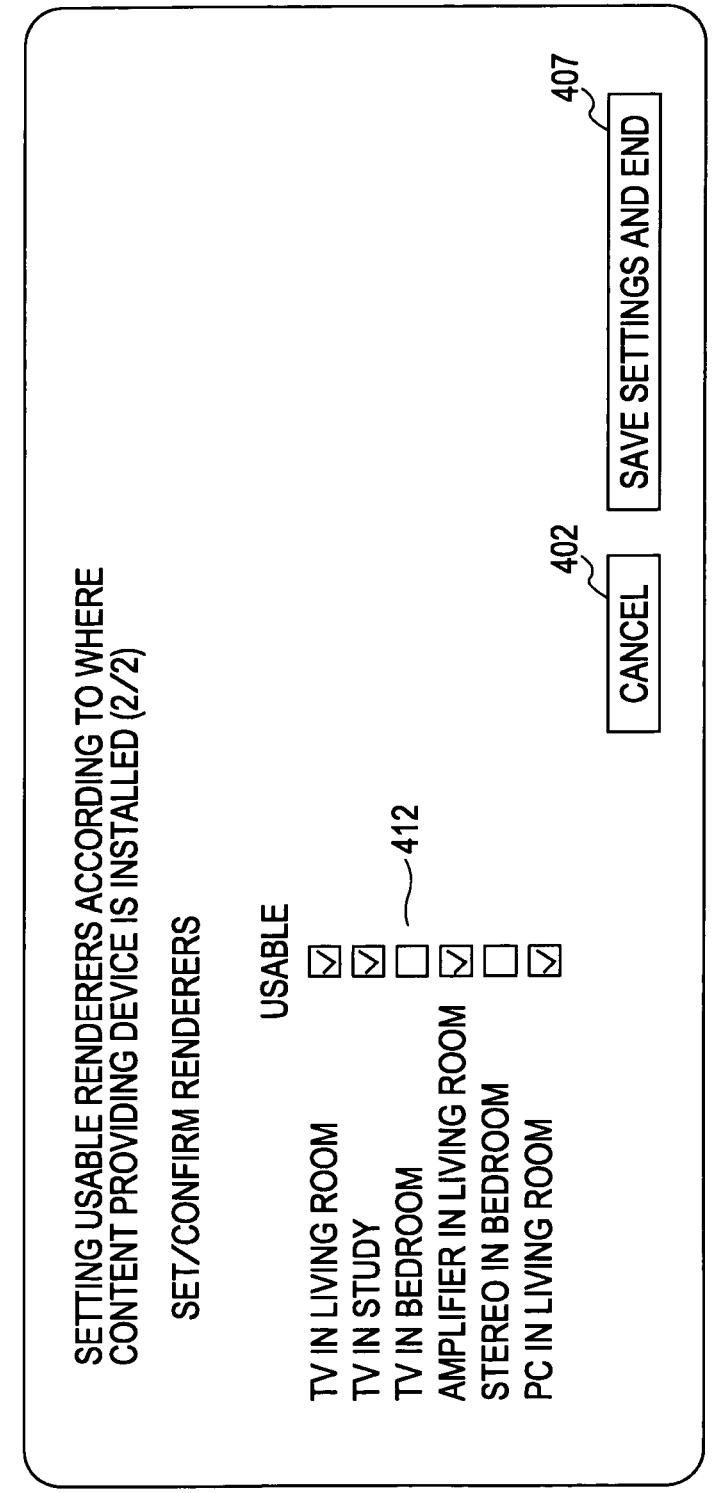
FIG. 19 is a diagram illustrating an example of the screen of an LCD displaying an installation location setting screen (2/2)

Once the user presses the button 403, the later-described location setting screen (2/2) in FIG. 19 is displayed on the screen of the LCD 39.

FIG. 19 is a diagram illustrating an example of a screen displayed on the LCD 39 showing the location setting screen (2/2). Portions which are the same as with FIG. 18 are denoted with the same reference numerals, and description thereof will be omitted as appropriate.

The example of the location setting screen (2/2) shown in FIG. 19 is a screen for selecting a renderer 13 capable of use with the content providing device installation location "living room" set in the location setting screen (1/2), for example.

Displayed in the location setting screen (2/2) as renderers 13 are "TV in living room", "TV in study", "TV in bedroom", "amplifier in living room", "stereo in bedroom", and "PC in living room". A checkbox 412 is displayed to the right of each renderer 13, and checking the checkbox 412 enables that renderer 13 to be used at the installation location of the content providing device (e.g., server 14) selected in the location setting screen (1/2). Also displayed is a button 407 for setting and saving the usable renderers 13.

For example, in the event that the user wishes to enable the "TV in living room" to be able to use contents provided by the server 14 installed in the "living room", the user checks the checkbox to the right of the "TV in living room", and presses the button 407 to save the settings.

Thus, whether or not each renderer 13 can use content according to where the content providing device is installed can be set with the location setting screen (1/2) shown in FIG. 18 and the location setting screen (2/2) shown in FIG. 19.

FIG. 20 is a diagram illustrating an example of renderers which can be used according to the installation location of content providing devices (e.g., server 14).

In the example shown in FIG. 20, the first column shows the names of the renderers, the second column indicates whether or not usage of a content providing device installed in the "living room" is permitted, the third column indicates whether or not usage of a content providing device installed in the "study" is permitted, and the fourth column indicates whether or not usage of a content providing device installed in the "bedroom" is permitted. The spaces marked "Yes" in the second through fourth column indicate that the renderer 13 can use that content providing device, and blank spaces indicate that the renderer 13 cannot use that content providing device.

In the example shown in FIG. 20, the second row from the top shows that the "TV in living room" can use the content providing devices installed in the "living room", "study", and "bedroom", the third row from the top shows that the "TV in study" can use the content providing devices installed in the "living room", and "study", and the fourth row from the top shows that the "TV in bedroom" can use the content providing device installed in the "bedroom".

Further, the fifth row from the top shows that the "amplifier in living room" can use the content providing devices installed in the "living room", "study", and "bedroom", the sixth row from the top shows that the "stereo in bedroom" can use the content providing device installed in the "bedroom", and the seventh row from the top shows that the "PC in living room" can use the content providing devices installed in the "living room", "study", and "bedroom".

Next, whether or not usage is permitted according to the content owner, an item which is set for each renderer 13, will be described with reference to FIGS. 21 through 23.

Figure 21:
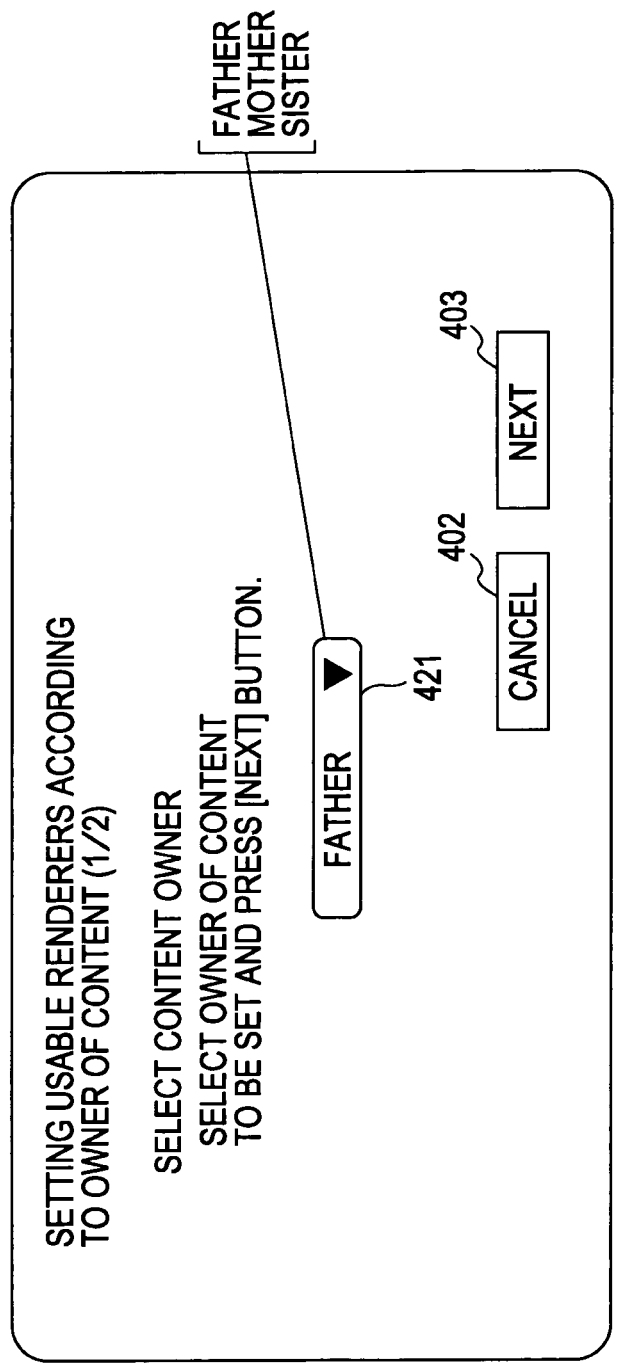
FIG. 21 is a diagram illustrating an example of the screen of an LCD displaying an owner setting screen (1/2)

FIG. 21 is a diagram illustrating an example of a screen displayed on the LCD 39 showing a screen for setting whether or not usage is permitted according to the content owner (hereafter referred to as "owner setting screen").

The example of the owner setting screen (1/2) shown in FIG. 21 is an example of a screen for enabling the user to select whether or not to enabling usage of renderers 13 depending on the owner of the content. Displayed in the screen are a pull-down menu 421 for selecting the owner of the content, a button 402 for canceling selection of the owner of the content, and a button 403 for proceeding with the operation for setting whether or not to permit usage of the renderer 13 according to the selected owner of the content.

Note that the "1/2" in the "owner setting screen (1/2)" indicates that this is the first screen of two owner setting screens, and the second screen will be described below as owner setting screen (2/2) in the same way.

Upon operation by the user, the pull-down menu 421 displays the parameters of, e.g., "father", "mother", and "sister", as content owners. For example, in the event that the content owner that the user wishes to set is "father", the user selects "father" from these parameters. Once the user presses the button 403, the later-described owner setting screen (2/2) in FIG. 22 is displayed on the screen of the LCD 39.

Figure 22:
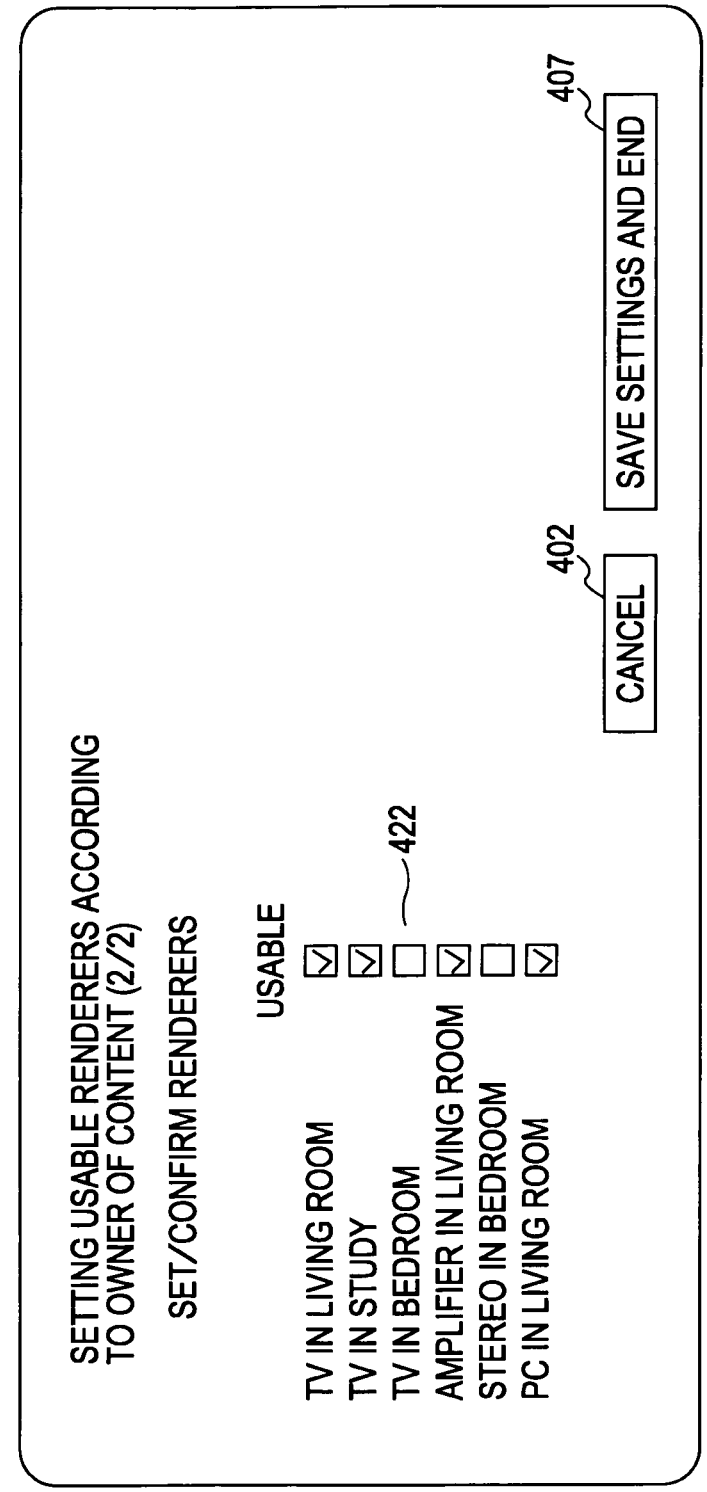
FIG. 22 is a diagram illustrating an example of the screen of an LCD displaying an owner setting screen (2/2)

FIG. 22 is a diagram illustrating an example of a screen displayed on the LCD 39 showing the owner setting screen (2/2). Portions which are the same as with FIG. 21 are denoted with the same reference numerals, and description thereof will be omitted as appropriate.

The example of the owner setting screen (2/2) shown in FIG. 22 is a screen for selecting a renderer 13 capable of use with the content owner "father" selected in the owner setting screen (1/2), for example.

Displayed in the owner setting screen (2/2) as renderers 13 are "TV in living room", "TV in study", "TV in bedroom", "amplifier in living room", "stereo in bedroom", and "PC in living room". A checkbox 422 is displayed to the right of each renderer 13, and checking the checkbox 422 enables that renderer 13 to use contents owned by that content owner. Also displayed is a button 407 for setting and saving the usable renderers 13.

For example, in the event that the user wishes to enable the "TV in living room" to be able to use contents owned by "father", the user checks the checkbox 422 to the right of the "TV in living room", and presses the button 407 to save the settings.

Thus, whether or not each renderer 13 can use content according to the content owner can be set with the owner setting screen (1/2) shown in FIG. 21 and the owner setting screen (2/2) shown in FIG. 22.

FIG. 23 is a diagram illustrating an example of renderers which can be used according to content owner.

In the example shown in FIG. 23, the first column shows the names of the renderers, the second column indicates whether or not usage of content owned by "father" is permitted, the third column indicates whether or not usage of content owned by "mother" is permitted, and the fourth column indicates whether or not usage of content owned by "sister" is permitted. The spaces marked "Yes" in the second through fourth column indicate that the renderer 13 can use that content, and blank spaces indicate that the renderer 13 cannot use that content.

In the example shown in FIG. 23, the second row from the top shows that the renderer 13 serving as the "TV in living room" can use the content owned by "father" and "mother", the third row from the top shows that the renderer 13 serving as the "TV in study" can use the content owned by "father", and the fourth row from the top shows that the renderer 13 serving as the "TV in bedroom" can use the content owned by "mother".

Further, the fifth row from the top shows that the renderer 13 serving as the "amplifier in living room" can use the content owned by "father" and "mother", the sixth row from the top shows that the renderer 13 serving as the "stereo in bedroom" can use the content owned by "sister", and the seventh row from the top shows that the renderer 13 serving as the "PC in living room" can use the content owned by "father" and "mother".

As described above, the processing in step S11 in FIG. 8 involves user operations of the input switch matrix unit 32 to make settings in the renderer selection condition setting unit 201, more specifically, repeating the operations described with reference to FIGS. 11 through 13 sets the order or priority of the renderers for each compatible content type as shown in FIG. 14, repeating the operations described with reference to FIG. 15 sets renderers capable of using user-restricted contents as shown in FIG. 16 and renderers capable of using pay contents as shown in FIG. 17, repeating the operations described with reference to FIGS. 18 and 19 sets the renderers which can be used according to where the content providing device is installed as shown in FIG. 20, and repeating the operations described with reference to FIGS. 21 and 22 sets the renderers which can be used according to the content owner as shown in FIG. 23.

That is to say, based on operations made at the input switch matrix unit 32, the renderer selection condition setting unit 201 stores in the settings information managing unit 202 settings information, such as for example, order of priority of renderers for each compatible content type (FIG. 14), renderers capable of using user-restricted contents (FIG. 16), renderers capable of using pay contents (FIG. 17), renderers capable of use according to the location of the content providing device (FIG. 20), and renderers capable of use according to the content owner (FIG. 23), thereby setting settings information for the renderer selecting conditions.

Returning to the flowchart in FIG. 8, in step S12 the renderer selection condition setting unit 201 generates a renderer search request for searching for renderers 13 which are connected to the network 12 and which are in a state capable of responding. The renderer selection condition setting unit 201 supplies the generated renderer search request to the communication unit 36.

In step S13, the communication unit 36 transmits the renderer search request supplied from the renderer selection condition setting unit 201 to the renderers 13.

In step S14, the profile information obtaining unit 203 determines whether or not profile information has been received, based on the profile information transmitted from the renderers 13 which is supplied from the communication unit 36.

In the event that determination is made in step S14 that no profile information has been received, the step S14 loops itself. That is to say, the controller 11 stands by until profile information is transmitted from the renderers 13. This can be realized by, for example, standing by for a predetermined amount of time.

On the other hand, in the event that determination is made in step S14 that profile information has been received, the profile information obtaining unit 203 supplies the received profile information to the priority order determining unit 207. The flow then proceeds to step S15.

Details of profile information will be described with reference to FIGS. 24 through 26. As described above, profile information is various types information such as compatible codec, compatible content type, compatible image resolution, and so forth, so compatible codec methods will first be described with reference to FIG. 24, following which compatible content type and compatible image resolution will be described.

FIG. 24 is a diagram illustrating examples of profile information with regard to compatible codecs.

In the example shown in FIG. 24, the first column shows the names of the renderers, the second column indicates whether content encoded with "MPEG2" can be reproduced, and in the same way the third column on indicate whether content encoded with "MPEG4", "WMV", "LPCM", "MP3", "ATRAC3", and "JPEG" can be reproduced. The spaces marked "Yes" in the second through eight columns indicate that content encoded with that codec can be reproduced by that renderer 13, i.e., that the renderer 13 is compatible with that codec. Blank spaces indicate that the renderer 13 is not compatible with that codec.

In the example shown in FIG. 24, the second row from the top shows that the renderer 13 "TV in living room" is compatible with the codecs "MPEG2", "MPEG4", "LPCM", and "JPEG", the third row from the top shows that the renderer 13 "TV in study" is compatible with the codecs "MPEG2", "MPEG4", "WMV", and "LPCM", and the fourth row from the top shows that the renderer 13 "TV in bedroom" is compatible with the codec "MPEG2".

Further, the fifth row from the top shows that the renderer 13 "amplifier in living room" is compatible with the codecs "LPCM", "MP3", and "ATRAC3", the sixth row from the top shows that the renderer 13 "stereo in bedroom" is compatible with the codec "LPCM", and the seventh row from the top shows that the renderer 13 "PC in living room" is compatible with the codecs "MPEG2", "MPEG4", "WMV", "LPCM", "MP3", "ATRAC3", and "JPEG".

Next, FIG. 25 is a diagram illustrating examples of profile information with regard to compatible content types.

In the example shown in FIG. 25, the first column shows the names of the renderers, the second column indicates whether the content type "photo" can be displayed and in the same way the third column on indicate whether the content types "music", "video", "TV", and "games" can be reproduced (displayed). The spaces marked "Yes" in the second through eight columns indicate that the content type can be reproduced (displayed) by that renderer 13, i.e., that the renderer 13 is compatible with that content type. Blank spaces indicate that the renderer 13 is not compatible with that content type.

In the example shown in FIG. 25, the second row from the top shows that the renderer 13 "TV in living room" is compatible with the content types "photo", "music", "video", "TV", and "games", the third row from the top shows that the renderer 13 "TV in study" is compatible with the content types "photo", "music", "video", "TV", and "games", and the fourth row from the top shows that the renderer 13 "TV in bedroom" is compatible with the content types "video" and "TV".

Also, the fifth row from the top shows that the renderer 13 "amplifier in living room" is compatible with the content type "music", the sixth row from the top shows that the renderer 13 "stereo in bedroom" is compatible with the content type "music", and the seventh row from the top shows that the renderer 13 "PC in living room" is compatible with the content types "photo", "music", "video", "TV", and "games".

Next, profile information with regard to compatible image resolution will be described with reference to FIG. 26.

In the example shown in FIG. 26, the first column shows the names of the renderers, and the second column indicates "maximum image resolution".

In the example shown in FIG. 26, the second row from the top indicates that the "TV in living room" has a screen with a resolution of "1920 dots vertically×1080 dots horizontally", the third row from the top indicates that the "TV in study" has a screen with a resolution of "1280 dots vertically×768 dots horizontally", and the fourth row from the top indicates that the "TV in bedroom" has a screen with a resolution of "1024 dots vertically×768 dots horizontally".

Also, the fifth and sixth row from the top indicate that the "amplifier in living room" and "stereo in bedroom" have no screens capable of displaying contents, and the seventh row from the top indicates that the "PC in living room" has a screen with a resolution of "1280 dots vertically×1024 dots horizontally".

That is to say, the profile information obtaining unit 203 obtains, for example, compatible code methods (FIG. 24), compatible content types (FIG. 25), and compatible image resolutions (FIG. 26), as profile information received from the renderers 13, supplied from the communication unit 36, and supplies the obtained profile information to the priority order determining unit 207.

Returning to the flowchart in FIG. 8, in step S15, the profile information obtaining unit 203 generates a content list obtaining request to request a list of contents which the servers 14 can provide. The profile information obtaining unit 203 supplies the generated content list obtaining request to the communication unit 36.

In step S16, the communication unit 36 transmits the content list obtaining request supplied from the profile information obtaining unit 203 to the servers 14 via the network 12.

In step S17, the content list obtaining unit 204 determines whether or not a content list has been received, based on the content list transmitted from the servers 14 supplied from the communication unit 36.

In the event that determination is made in step S17 that no content lists have been received, the step S17 loops itself. That is to say, the controller 11 stands by until content lists are transmitted from the server 14.

In the event that determination is made in step S17 that content lists have been received, the flow proceeds to step S18, and the content list obtaining unit 204 supplies the content lists supplied from the communication unit 36 to the GDP 38, thereby displaying content lists on the screen of the LCD 39. For example, the content list obtaining unit 204 supplies to the GDP 38 the content lists supplied from the communication unit 36, for display on the LCD 39. Let us say that, for example, a content list of contents which the server 14 can provide includes "World Cup Soccer", "Today's Weather", and "Today's News".

In step S19, the content selecting unit 205 accepts selection of a content from the content list displayed on the screen of the LCD 39, based on user operations made at the input switch matrix unit 32. Also, the content selecting unit 205 obtains content attribute information relating to the selected content from the content list obtaining unit 204, and supplies the obtained content attribute information to the content attribute obtaining unit 206.

For example, in the event that the content "World Cup Soccer" has been selected from the contents "World Cup Soccer", "Today's Weather", and "Today's News", based on user operations made at the input switch matrix unit 32, the content selecting unit 205 supplies content attribute information relating to the content "World Cup Soccer" to the content attribute obtaining unit 206.

In step S20, the content attribute obtaining unit 206 obtains the content attribute information supplied from the content selecting unit 205. The content attribute obtaining unit 206 supplies the obtained content attribute information to the priority order determining unit 207. For example, the content attribute obtaining unit 206 obtains the content attribute information relating to the content "World Cup Soccer" supplied from the content selecting unit 205, and supplies the obtained content attribute information to the priority order determining unit 207.

Now, details of content attributes information will be described with reference to FIG. 27.

In the example shown in FIG. 27, the first column is "attribute" which is information relating to the content, and the second column is specific values corresponding to the "attribute" of the first column. Also, the first row is headings and the second row on is data.

In the example shown in FIG. 27, the second row from the top indicates that the codec corresponding to the content is "MPEG2", the third row from the top indicates that optimal screen resolution for displaying the content is "720 dots vertically×480 dots horizontally", the fourth row from the top indicates that the content is "viewer-restricted content", and the fifth row from the top indicates that the content is not "pay content".

Also, the sixth row from the top indicates that the device providing the content is installed in the living room, the seventh row from the top indicates that the owner of this content is "father", and the eighth row from the top indicates that the type of content is "video".

In this example, the content attribute information shown in FIG. 27 is content attribute information relating to the content "World Cup Soccer". That is to say, the content attribute obtaining unit 206 obtains the content attribute information (FIG. 27) supplied from the content selecting unit 205, and supplies the obtained content attribute information (FIG. 27) to the priority order determining unit 207.

Returning to the flowchart in FIG. 9, in step S21 the priority order determining unit 207 performs order of priority determining processing, based on the settings information supplied from the renderer selection condition setting unit 201, the profile information supplied from the profile information obtaining unit 203, and the content attributes supplied from the content attribute obtaining unit 206. The priority order determining unit 207 supplies the processing results of the order of priority determining processing to the renderer selecting unit 208.

For example, the priority order determining unit 207 performs order of priority determining processing, based on the settings information (viewer-restricted content, pay content, content providing device installation location, content owner, order of priority of renderer for each compatible content type) supplied from the renderer selection condition setting unit 201, the profile information (compatible codec, compatible content type, compatible image resolution) supplied from the profile information obtaining unit 203, and the content attributes (content attribute information) supplied from the content attribute obtaining unit 206, thereby extracting the renderers 13 "TV in study" and "TV in living room", and of these renderers 13, setting the "TV in study" to the No. 1 order of priority and setting the "TV in living room" to the No. 2 order of priority. The details of the priority determining processing will be described later.

Also, the priority order determining unit 207 supplies information indicating the content "World Cup Soccer", for example, to the content display reproduction processing unit 209 via the renderer selecting unit 208.

In step S22, the renderer selecting unit 208 supplies the list of renderers 13 to the GDP 38 based on the processing results of the order of priority determining processing supplied from the priority order determining unit 207, thereby displaying a list of compatible renderers 13 on the screen of the LCD 39. For example, the renderer selecting unit 208 supplies to the GDP 38 information indicating the "TV in study" and "TV in living room" based on the processing results of the order of priority determining processing supplied from the priority order determining unit 207, thereby displaying these on the screen of the LCD 39 in the order of "TV in study" and "TV in living room" based on the order of priority thereof.

In step S23, the renderer selecting unit 208 accepts selection of a render 13 from the list of renderers 13 displayed on the screen of the LCD 39 according to operations of the input switch matrix unit 32 by the user. The renderer selecting unit 208 supplies information indicating the selected renderer 13 to the content display reproduction processing unit 209. For example, the renderer selecting unit 208 accepts selection of "TV in study" selected from the "TV in study" and "TV in living room" displayed on the screen of the LCD 39 as a list of renderers 13, and supplies information indicating the selected "TV in study" to the content display reproduction processing unit 209, according to operations of the input switch matrix unit 32 by the user.

In step S24, the content display reproduction processing unit 209 generates a content reproduction instruction, which is a request instructing reproducing of the content, based on the information indicating the content to reproduce and the information indicating the selected renderer 13, supplied from the renderer selecting unit 208. The content display reproduction processing unit 209 supplies the generated content reproduction instruction to the communication unit 36. For example, the content display reproduction processing unit 209 generates a content reproduction instruction based on the information indicating the content "World Cup Soccer" and the information indicating the "TV in study", supplied from the renderer selecting unit 208, and supplies the generated content reproduction instruction to the communication unit 36.

In step S25, the communication unit 36 transmits the content reproduction instruction supplied from the content display reproduction processing unit 209 to the renderer 13 selected from the list via the network 12. For example, the communication unit 36 transmits the content reproduction information for reproducing the content "World Cup Soccer" supplied from the content display reproduction processing unit 209 to the "TV in study" via the network 12.

In step S26, the content display reproduction processing unit 209 determines whether or not usage status information has been received, based on usage status information received from the renderer 13 that is supplied from the communication unit 36.

In the event that determination is made in step S26 that usage status information has not been received, the renderer 13 can reproduce the content, so the processing of the controller 11 ends. For example, in the event that determination is made by the content display reproduction processing unit 209 that usage status information has not been received, the content can be displayed on the "TV in study", so the "TV in study" receives the content "World Cup Soccer" from the server 14 regarding which reproducing has been instructed from the controller 11, and starts reproduction.

On the other hand, in the event that determination is made in step S26 that usage status information has been received, the flow proceeds to step S27, where the content display reproduction processing unit 209 supplies the usage status information to the GDP 38 based on the usage status information supplied from the communication unit 36, thereby displaying the usage status information on the screen of the LCD 39. For example, the content display reproduction processing unit 209 displays on the screen of the LCD 39 a message to the effect that the content "World Cup Soccer" cannot be reproduced due to the "TV in study" already being in use, based on the usage status information supplied from the communication unit 36.

In step S28, the content display reproduction processing unit 209 determines whether or not an instruction for reproducing the content has been received by operations of the input switch matrix unit 32 by the user. For example, the content display reproduction processing unit 209 determines whether or not an instruction for forcibly reproducing the content "World Cup Soccer" on the "TV in study" has been received by operations of the input switch matrix unit 32 by the user.

In the event determination is made in step S28 that an instruction for reproducing the content has been received, the flow proceeds to step S29, where the content display reproduction processing unit 209 generates a content reproduction instruction. The content display reproduction processing unit 209 then supplies the generated content reproduction instruction to the communication unit 36.

In step S30, the communication unit 36 transmits the content reproduction instruction supplied from the content display reproduction processing unit 209 to the renderer 13 via the network 12. For example, the communication unit 36 transmits the content reproduction instruction for reproducing the content "World Cup Soccer" supplied from the content display reproduction processing unit 209 to the "TV in study" via the network 12.

On the other hand, in the event determination is made in step S28 that an instruction for reproducing the content has not been received, the flow proceeds to step S31, where determination is made by the content display reproduction processing unit 209 regarding whether or not a request for selecting another renderer 13 has been accepted, based on operations of the input switch matrix unit 32 by the user.

In the event determination is made in step S31 that no request for selecting another renderer 13 has been accepted, the user is deemed to have no further intent to reproduce the content, so the processing ends without reproducing the content.

In the event determination is made in step S31 that a request for selecting another renderer 13 has been accepted, the user has intent to reproduce the content, so the flow returns to step S22 and the above processing is repeated. However, repeating the processing of steps S22 through S31 means that of the "TV in study" and "TV in living room" displayed in the list of renderers 13 on the screen of the LCD 39, selection of "TV in living room" is accepted this time instead of the "TV in study" in use, so that the content "World Cup Soccer" is reproduce on the "TV in living room".

Thus, the controller 11 receives profile information from compatible renderers 13 via the network 12, and accordingly can display a list of renderers 13 which are usable at that point in time. Also, the user selects a renderer 13 from that list, so the user can effectively select a renderer 13 since unnecessary options such as renderers 13 that are turned off or that are disconnected from the network 12 are not included in the list.

Further, setting the order of priority of the renderers 13 beforehand enables renderers 13 with higher order of priority to be displayed with greater priority, so a list of renderers 13 can be displayed in the order of priority, for example.

Next, details of the order of priority determining processing in step S21 of FIG. 9 will be described with reference to the flowchart in FIG. 28.

In step S51, the priority order determining unit 207 extracts renderers 13 which can use the codec of the content, based on the profile information supplied from the profile information obtaining unit 203, and the content attributes supplied from the content attribute obtaining unit 206.

For example, in the renderer selection conditions, the content attribute "compatible codec" parameters are not user settable, so the priority order determining unit 207 extracts the renderers compatible with the codec "MPEG2" for "World Cup Soccer", correlated in FIG. 24, i.e., the "TV in living room", "TV in study", "TV in bedroom", and "PC in living room", based on the compatible codecs (FIG. 24) included in the profile information supplied from the profile information obtaining unit 203 and the content attribute information (FIG. 27) supplied from the content attribute obtaining unit 206.

Note that the solid lines displayed in FIG. 24 which is an example of profile information according to codec method indicate the renderers 13 extracted in step S51; the same holds true in the following description as well.

In step S52, the priority order determining unit 207 extracts renderers 13 compatible with the content type based on the profile information supplied from the profile information obtaining unit 203 and the content attributes supplied from the content attribute obtaining unit 206.

For example, in the renderer selection conditions, the content attribute "compatible content type" parameters are not user settable, so the priority order determining unit 207 extracts the renderers 13 which have been extracted in the processing in step S51 and which are compatible with the content type "video" for "World Cup Soccer", correlated in FIG. 25, i.e., the "TV in living room", "TV in study", "TV in bedroom", and "PC in living room", based on the compatible content type (FIG. 25) included in the profile information supplied from the profile information obtaining unit 203 and the content attribute information (FIG. 27) supplied from the content attribute obtaining unit 206.

In step S53, the priority order determining unit 207 extracts renderers 13 compatible with the content resolution based on the profile information supplied from the profile information obtaining unit 203 and the content attributes supplied from the content attribute obtaining unit 206.

For example, in the renderer selection conditions, the content attribute "compatible image resolution" parameters are not user settable, so the priority order determining unit 207 extracts the renderers 13 which have been extracted in the processing in step S52 and which are compatible with the content resolution "720 (dots vertically)×480 (dots horizontally)" for "World Cup Soccer", correlated in FIG. 26, i.e., the "TV in living room", "TV in study", "TV in bedroom", and "PC in living room", which are capable of image resolution equal to or greater than "720 (dots vertically)×480 (dots horizontally)", based on the compatible image resolution (FIG. 26) included in the profile information supplied from the profile information obtaining unit 203 and the content attribute information (FIG. 27) supplied from the content attribute obtaining unit 206.

In step S54, the priority order determining unit 207 extracts renderers 13 capable of handling viewer-restricted content based on the settings information supplied from the renderer selection condition setting unit 201 and the content attributes supplied from the content attribute obtaining unit 206.

For example, in the renderer selection conditions, the content attribute "viewer-restricted content" parameters are set by the user, so the priority order determining unit 207 extracts the renderers 13 which have been extracted in the processing in step S53 and which are capable of handling viewer-restricted content, correlated in FIG. 16, i.e., the "TV in living room", "TV in study", and "TV in bedroom", based on the settings information (FIG. 16) supplied from the renderer selection condition setting unit 201 and the content attribute information (FIG. 27) supplied from the content attribute obtaining unit 206.

In step S55, the priority order determining unit 207 extracts renderers 13 capable of handling pay content based on the settings information supplied from the renderer selection condition setting unit 201 and the content attributes supplied from the content attribute obtaining unit 206.

For example, in the renderer selection conditions, the content attribute "pay content" parameters are set by the user, so the priority order determining unit 207 extracts the renderers 13 based on the table of renderers capable of handling pay content (FIG. 17) supplied from the renderer selection condition setting unit 201 and the content attribute information (FIG. 27) supplied from the content attribute obtaining unit 206. The content attribute information (FIG. 27) shows that the content is not "pay content", so of the renderers 13 which have been extracted in the processing in step S54 and are in the table of renderers capable of handling pay content (FIG. 17), those capable of handling non-pay content (in this case, all renderers 13) i.e., the "TV in living room", "TV in study", and "TV in bedroom", are extracted.

In step S56, the priority order determining unit 207 extracts renderers 13 usable according to the installation location of the content providing device, based on the settings information supplied from the renderer selection condition setting unit 201 and the content attributes supplied from the content attribute obtaining unit 206.

For example, in the renderer selection conditions, the content attribute "installation location of content providing device" parameters are set by the user, so the priority order determining unit 207 extracts, from the renderers 13 which have been extracted in the processing in step S55 and which are usable according to the installation location of the content providing device, correlated in FIG. 20, the renderers 13 usable according to the content providing device installation location "living room", i.e., the "TV in living room" and "TV in study", based on the settings information (FIG. 20) supplied from the renderer selection condition setting unit 201 and the content attribute information (FIG. 27) supplied from the content attribute obtaining unit 206.

In step S57, the priority order determining unit 207 extracts renderers 13 usable according to the content owner, based on the settings information supplied from the renderer selection condition setting unit 201 and the content attributes supplied from the content attribute obtaining unit 206.

For example, in the renderer selection conditions, the content attribute "content owner" parameters are set by the user, so the priority order determining unit 207 extracts, from the renderers 13 which have been extracted in the processing in step S56 and which are usable according to the content owner, correlated in FIG. 23, the renderers 13 usable according to the content owner "father", i.e., the "TV in living room" and "TV in study", based on the settings information (FIG. 23) supplied from the renderer selection condition setting unit 201 and the content attribute information (FIG. 27) supplied from the content attribute obtaining unit 206.

In step S58, the priority order determining unit 207 sorts the order of priority of the renderers 13 based on the settings information supplied from the renderer selection condition setting unit 201 and the content attributes supplied from the content attribute obtaining unit 206, following which the flow returns to step S21 in FIG. 9, and the subsequent steps S22 and on are executed.

For example, in the renderer selection conditions, the content attribute "renderer order of priority for each compatible content type" parameters are set by the user, so the priority order determining unit 207 sorts, in order of higher priority, the renderers 13 which have been extracted in the processing in step S57 according to the compatible content type and order of priority for display selection (FIG. 14), based on the compatible content type and order of priority for display selection (FIG. 14) included in the settings information supplied from the renderer selection condition setting unit 201 and the content attribute information (FIG. 27) supplied from the content attribute obtaining unit 206. That is to say, of the extracted renderers 13, the "TV in study" has higher order of priority than the "TV in living room", so the renderers 13 are rearranged in the order of "TV in study", "TV in living room".

In other words, the processing in steps S51 through S53 compare the profile information obtained from the renderers 13 with the content attribute information, and the processing in steps S54 through S58 compare the settings information set by the user with the content attribute information.

Thus, the content attribute information is compared with the profile information, enabling renderers 13 which cannot reproduce (display) the content to be eliminated from the list, so renderers 13 can be determined more efficiently. Consequently, the user can determine a renderer 13 more speedily.

The above has been a description of content reproduction processing performed by the controller 11. Next, content reproduction processing performed by the renderer 13 will be described with reference to FIG. 29.

In step S71, the device information managing unit 251 determines whether or not a renderer search request has been received, based on the renderer search request received from the controller 11 that is supplied from the communication unit 66.

In the event that determination is made in step S71 that no renderer search request has been received, step S71 loops back on itself. That is to say, the renderer 13 stands by until a renderer search request is received from the controller 11.

On the other hand, in the event that determination is made in step S71 that a renderer search request has been received, the flow proceeds to step S72, where the device information managing unit 251 generates profile information. The device information managing unit 251 then supplies the generated profile information to the communication unit 66.

For example, the device information managing unit 251 generates profile information including compatible codecs, compatible content types, compatible image resolution information, and so forth, based on the device information stored within itself, and supplies this to the communication unit 66. Specifically, in the event that the renderer 13 is the "TV in study", the device information managing unit 251 generates profile information including information indicating compatibility with the codecs "MPEG2", "MPEG4", "WMV", "LPCM", and "JPEG", information indicating compatibility with content types "photo", "music", "video", "TV", and "games", and information indicating resolution of "1280 (dots vertically)×768 (dots horizontally)".

In step S73, the communication unit 66 transmits the profile information supplied from the device information managing unit 251 to the controller 11 via the network 12.

In step S74, the control command reception unit 252 determines whether or not a content reproduction instruction has been received, based on the content reproduction instruction received from the controller 11 which is supplied from the communication unit 66.

In the event that determination is made in step S74 that no content reproduction instruction has been received, the step S74 loops back on itself. That is to say, the renderer 13 stands by until receiving a content reproduction instruction from the controller 11.

In the event that determination is made in step S74 that a content reproduction instruction has been received, the flow proceeds to step S75, where the command processing unit 253 determines whether or not itself (the renderer 13) is being used. In the event that a content reproduction instruction has been supplied from the control command reception unit 252 for example, the command processing unit 253 determines whether or not it is already reproducing a different content itself, thereby determining whether or not it itself is being used.

In the event that determination is made in step S75 that it is not in use, the flow proceeds to step S76, and since the renderer 13 can reproduce contents by itself, the command processing unit 253 generates a content reproduction request for requesting providing of a predetermined content as to the server 14, and the generated content reproduction request is supplied to the communication unit 66 via the control command reception unit 252. For example, the command processing unit 253 generates a content reproduction request for requesting providing of the content "World Cup Soccer" from the server 14, and supplies the generated content reproduction request to the communication unit 66 via the control command reception unit 252.

In step S77, the communication unit 66 transmits the content reproduction request supplied from the control command reception unit 252 to the server 14 via the network 12.

In the event that determination is made in step S75 that it is in use, the flow proceeds to step S78, and the command processing unit 253 generates usage status information indicating that it is in use. The command processing unit 253 supplies the generated usage status information to the communication unit 66 via the control command reception unit 252.

In step S79, the communication unit 66 transmits the usage status information supplied from the control command reception unit 252 to the controller 11 via the network 12, and the processing ends.

In step S80, the content reception processing unit 254 determines whether or not the content has been received, based on the content received from the server 14 that is supplied from the communication unit 66.

In the event that determination is made in step S80 that no content has been received, the step S80 loops back on itself. That is to say, the renderer 13 stands by until receiving content from the server 14.

On the other hand, in the event that determination is made in step S80 that the content has been received, the flow proceeds to step S81, where the content display reproduction processing unit 256 displays the content on the screen of the LCD 39, thereby starting reproducing of the content. For example, the content decoding unit 255 of the renderer 13 which is the "TV in study" subjects the content "World Cup Soccer" supplied from the content reception processing unit 254 to predetermined decoding processing corresponding to the content encoding unit 303, and supplies the content obtained as a result of the decoding processing to the content display reproduction processing unit 256. The content display reproduction processing unit 256 supplies the content "World Cup Soccer" supplied from the content decoding unit 255 to the GDP 68 for display on the screen of the LCD 69, thereby starting reproduction of the content "World Cup Soccer".

Note that reproduction of the content ends based on instructions from the controller 11, operation of the input switch matrix unit 62 by the user, stopping of input of content from the content decoding unit 255, or the like, which ends content reproduction processing of the contents at the renderer 13.

Thus, the usage status of the renderer 13 can be communicated to the controller 11, so in the event that a certain renderer 13 is in use, the user can make selection pertinent for the current situation, such as selecting another renderer 13, canceling processing, and so forth.

The above has been a description of content reproduction processing performed at the renderer 13. Next, content reproduction processing performed at the server 14 will be described with reference to FIG. 30.

In step S101, the content distribution processing unit 301 determines whether or not a content list obtaining request has been received, based on the content list obtaining request received from the controller 11 supplied from the communication unit 109.

In the event that determination is made in step S101 that no content list obtaining request has been received, the step S101 loops back on itself. That is to say, the server 14 stands by until receiving a content list obtaining request from the controller 11.

On the other hand, in the event that determination is made in step S101 that a content list obtaining request has been received, the flow proceeds to step S102, where the content distribution processing unit 301 generates a content list. The content distribution processing unit 301 then supplies the generated content list to the communication unit 109. For example, the content distribution processing unit 301 reads out information relating to contents stored in the content managing unit 302, thereby generating a content list including the contents "World Cup Soccer", "Today's weather", and "Today's news", and supplies the generated content list to the communication unit 109.

In step S103, the communication unit 109 transmits the content list supplied from the content distribution processing unit 301 to the controller 11 via the network 12.

In step S104, the content distribution processing unit 301 determines whether or not a content reproduction request has been received, based on the content reproduction request received form the renderer 13 supplied from the communication unit 109.

In the event that determination is made in step S104 that no content reproduction request has been received, the step S104 loops back on itself. That is to say, the server 14 stands by until receiving a content reproduction request from a renderer 13.

On the other hand, In the event that determination is made in step S104 that a content reproduction request has been received, the flow proceeds to step S105, where the content distribution processing unit 301 obtains the content from the content managing unit 302. The content distribution processing unit 301 then supplies the obtained content to the communication unit 109.

For example, the content distribution processing unit 301 supplies a content reproduction request for the content "World Cup Soccer" to the content managing unit 302. The content managing unit 302 supplies the content "World Cup Soccer" from the contents stored within itself to the content encoding unit 303. The content encoding unit 303 encodes the content "World Cup Soccer" supplied from the content managing unit 302 with the codec method "MPEG2". The content distribution processing unit 301 then obtains the encoded content "World Cup Soccer" from the content encoding unit 303, and supplies the obtained content to the communication unit 109.

In step S106, the communication unit 109 transmits the content supplied from the content distribution processing unit 301 to the renderer 13 via the network 12. For example, the communication unit 109 transmits the content "World Cup Soccer" supplied from the content distribution processing unit 301 to the renderer 13 via the network 12.

Note that reproduction of the content ends based on instructions from the controller 11 or renderer 13, operation of the input unit 106 by the user, stopping of input of content from the content encoding unit 303, or the like, which ends content reproduction processing of the contents at the server 14.

The above has been a description of content reproduction processing performed by the server 14.

Now, in the above-described example, renderers 13 which are capable of reproducing (displaying) a content selected by the user are displayed as a list according to an order of priority determined beforehand, and the user selects a renderer 13 from that list, but an arrangement may be made as another embodiment of the present invention wherein a content is reproduced (displayed) on a renderer 13 without the user selecting the renderer 13.

Accordingly, processing will now be described as one example of processing with the content reproduction system 1 according to an embodiment of the present invention with reference to FIGS. 31 and 32, wherein renderers 13 are selected in order of priority, and the content is reproduced (displayed) with the selected renderer 13.

Figure 31:
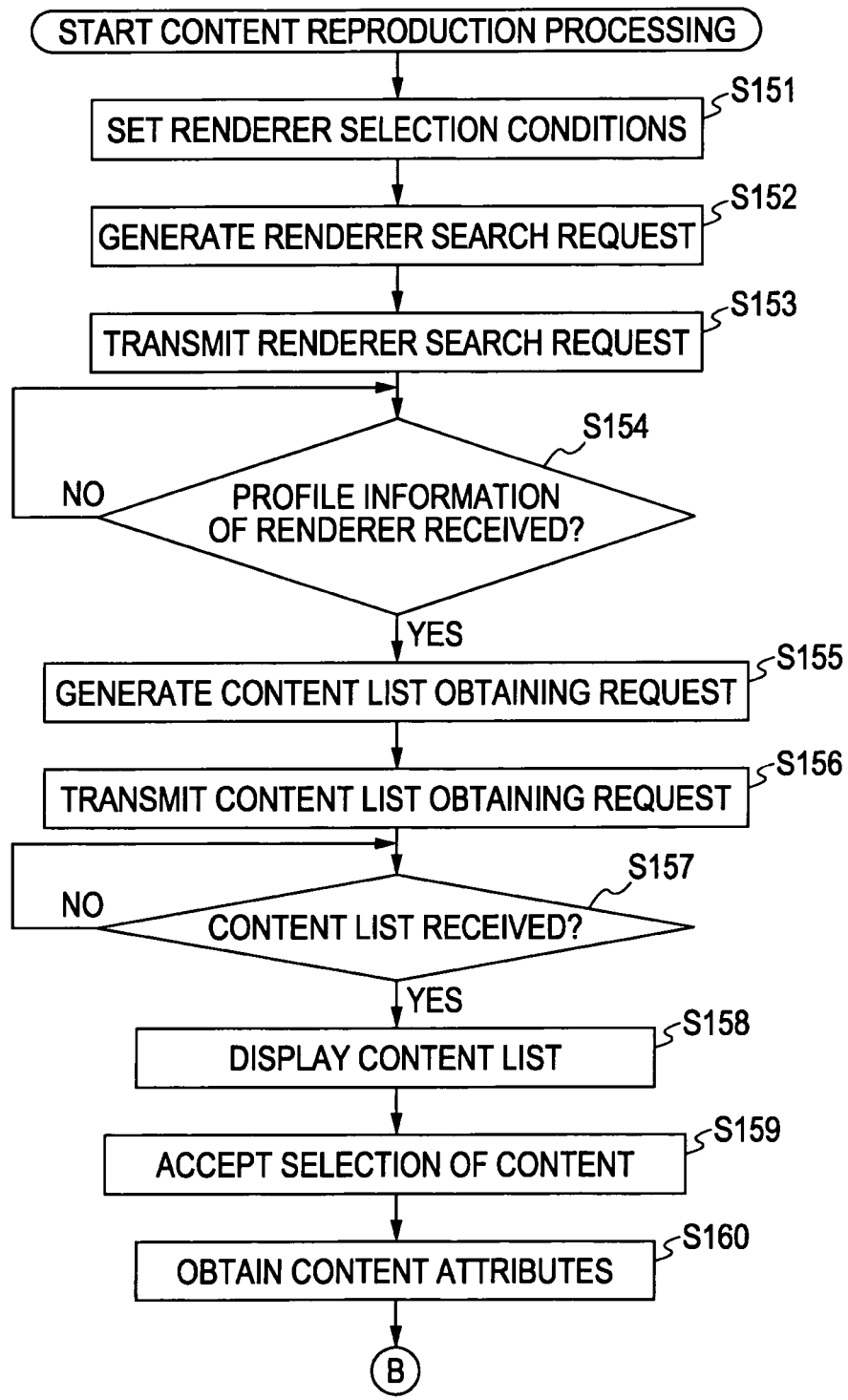
FIG. 31 is a flowchart for describing the processing for content reproduction with a controller.
Figure 32:
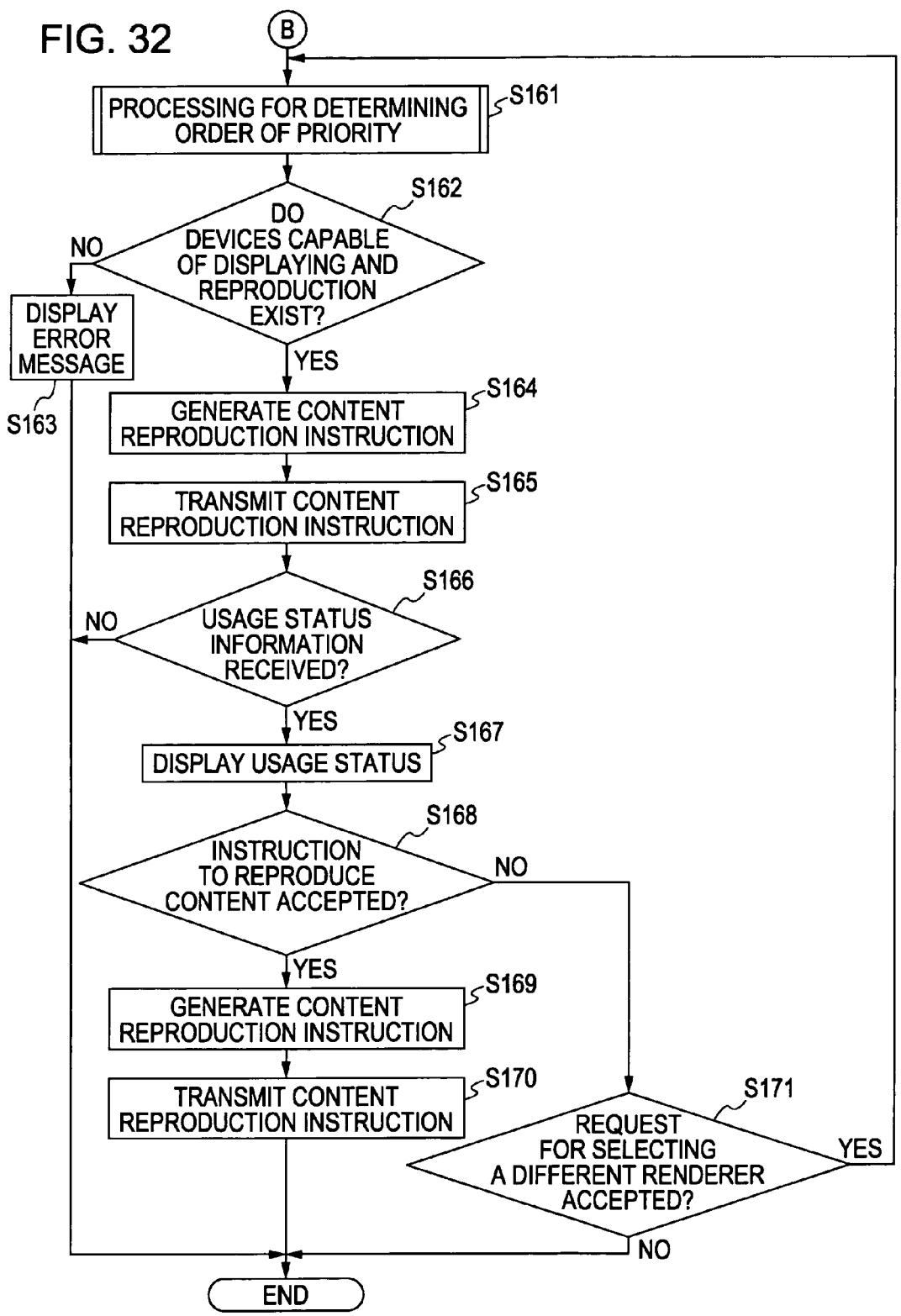
FIG. 32 is a flowchart for describing the processing for content reproduction with a controller.

FIG. 31 is a flowchart for describing content reproduction processing at the controller 11.

The processing of steps S151 through S160 is the same as the processing of steps S11 through S20 in FIG. 8, and accordingly description thereof will be omitted.

In step S161, the priority order determining unit 207 performs the above order of priority determining processing (FIG. 28), based on the settings information supplied from the renderer selection condition setting unit 201, the profile information supplied from the profile information obtaining unit 203, and the content attributes supplied from the content attribute obtaining unit 206. The priority order determining unit 207 supplies, to the renderer selecting unit 208, information relating to the renderer 13 which has the highest order of priority of the renderers 13 capable of reproducing the content as the processing result of the order of priority determining processing.

For example, the priority order determining unit 207 performs order of priority determining processing, based on the settings information (viewer-restricted content, pay content, content providing device installation location, content owner, order of priority of renderer for each compatible content type) supplied from the renderer selection condition setting unit 201, the profile information (compatible codec, compatible content type, compatible image resolution) supplied from the profile information obtaining unit 203, and the content attributes (content attribute information) supplied from the content attribute obtaining unit 206, thereby extracting the renderers 13 "TV in study" and "TV in living room", and of these renderers 13, and of the extracted renderers 13 capable of reproducing the content, information relating to the renderer 13 "TV in study" which has the highest order of priority is supplied to the renderer selecting unit 208.

Also, the priority order determining unit 207 supplies information indicating the content "World Cup Soccer", for example, to the content display reproduction processing unit 209 via the renderer selecting unit 208.

In step S162, the renderer selecting unit 208 determines whether or not the renderer 13 capable of displaying or reproducing exists, based on the information relating to the renderer 13, selected by the order of priority determining processing, supplied from the priority order determining unit 207.

In the event that the renderer 13 capable of displaying or reproducing does not exist in step S162, the flow proceeds to step S163, where the renderer selecting unit 208 displays an error message on the screen of the LCD 39 to the effect that the renderer 13 for reproducing (displaying) does not exist so the content cannot be reproduced, based on the information relating to the renderer 13, selected by the order of priority determining processing, supplied from the priority order determining unit 207.

On the other hand, in the event that the renderer 13 capable of displaying or reproducing exists in step S162, the flow proceeds to step S164.

The processing of steps S164 through S171 is the same as the processing of steps S24 through S31 in FIG. 9, so description thereof will be omitted as appropriate.

That is to say, by performing the processing of steps S164 through S171, the controller 11 can transmit a content reproduction instruction to renderer 13 which has the highest order of priority of the renderers 13 capable of reproducing the content, selected by the order of priority determining processing, supplied from the priority order determining unit 207.

Specifically, for example, the controller 11 transmits a content reproduction instruction to the "TV in study", which is the renderer 13 which has the highest order of priority. Also, in the event that the "TV in study" is in use, the controller 11 transmits a content reproduction instruction to the "TV in living room", which is the renderer 13 which has the highest order of priority of the renderers 13 following exclusion of the "TV in study".

Thus, renderers 13 highest in order of priority can be selected without user operations, by setting the order of priority of the renderers 13 beforehand for each content attribute.

Note that the content reproduction processing at the renderer 13 is the same as the content reproduction processing described with reference to FIG. 29, and accordingly description thereof will be omitted. Also, in the same way, content reproduction processing at the server 14 is the same as the content reproduction processing described with reference to FIG. 30, so description thereof will be omitted.

With the content reproducing system 1, various arrangements using combinations of renderers 13 for reproducing (displaying) contents can be conceived other than that described with reference to FIG. 1. For example, there may be users who desire to output the audio of a content being reproduced from a renderer 13 other than the renderer 13 from which the content is being reproduced. Accordingly, processing for displaying images and outputting audio of the content from separate renderers 13 will be described as an example of an embodiment of the content reproducing system according to the present invention, with reference to FIGS. 33 through 39.

Figure 33:
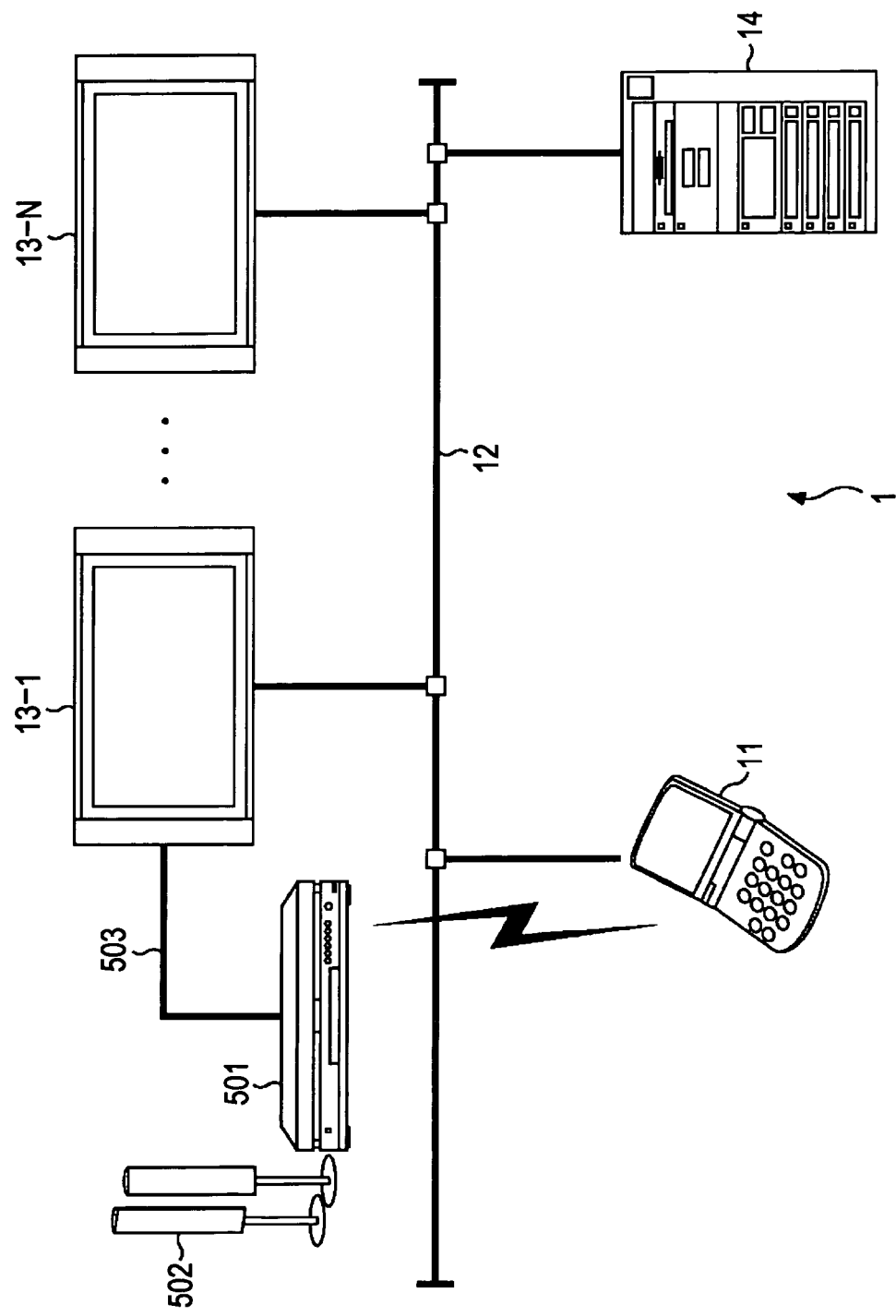
FIG. 33 is a block diagram illustrating the configuration of another embodiment of a content reproducing system to which the present invention has been applied.

FIG. 33 is a block diagram illustrating another configuration of an embodiment of the content reproduction system 1 to which the present invention has been applied. Portions the same as those shown in FIG. 1 are denoted with the same reference numerals, and description thereof will be omitted as appropriate.

The amplifier 501 is an AV (Audio Visual) amplifier for example, and is connected to the renderer 13-1 by a cable 503 and is connected to speakers 502 by speaker cables (not shown).

The amplifier 501 receives input switchover commands for switchover of audio input to itself, as SIRCS-compliant infrared commands. Also, the amplifier performs predetermined processing on audio data input from the renderer 13 via the cable 503. The amplifier 501 outputs audio data subjected to predetermined processing to the speakers 502 via the unshown speaker cables.

The speakers 502 reproduce audio corresponding to the audio data input from the amplifier 501 via the unshown speaker cables. Note that the amplifier 501 may be configured in the same way as that shown in FIG. 4.

Figure 34:
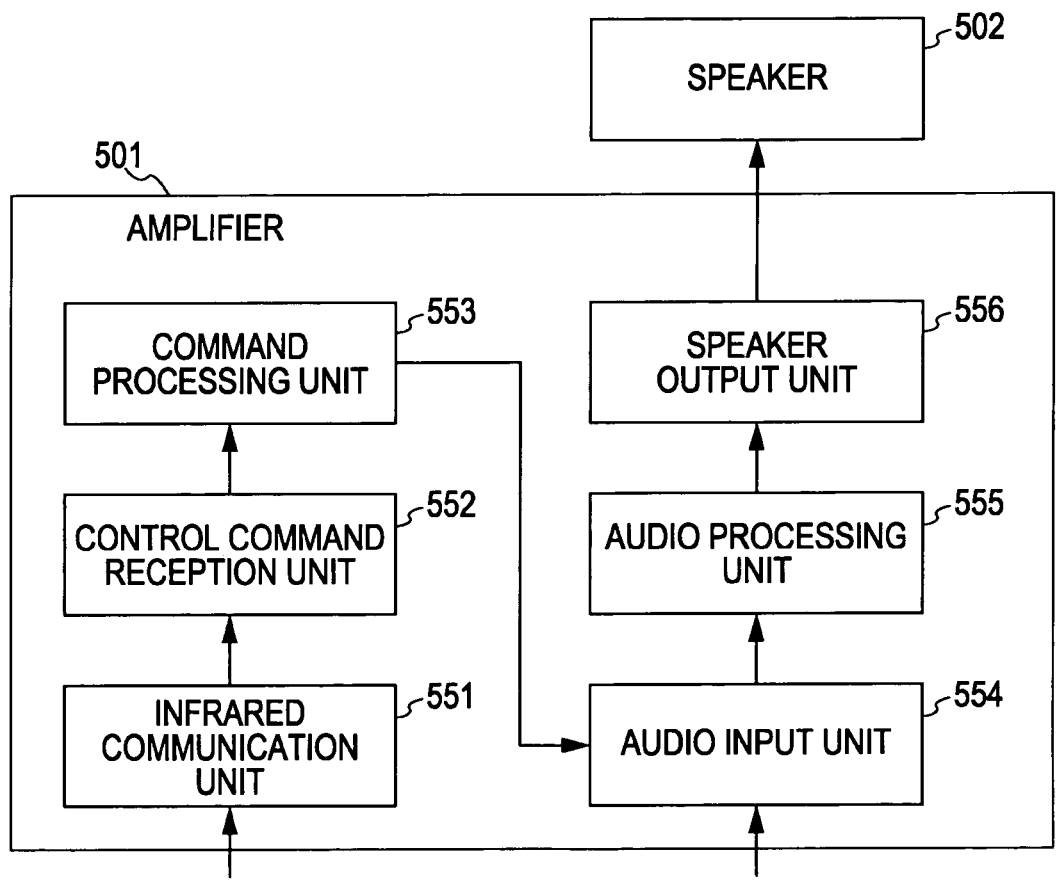
FIG. 34 is a block diagram illustrating an example of the functional configuration of an amplifier.

FIG. 34 is a block diagram illustrating a functional configuration example of the amplifier 501.

The amplifier 501 is configured including an infrared reception unit 551, a control command reception unit 552, a command processing unit 553, an audio input unit 554, an audio processing unit 555, and a speaker output unit 556.

The infrared reception unit 551 receives input switchover commands transmitted as SIRCS infrared commands from the controller 11. The infrared reception unit 551 supplies the received input switchover commands to the control command reception unit 552.

The control command reception unit 552 determines whether or not an input switchover command has been received, based on the input switchover command received from the controller 11 that is supplied from the infrared reception unit 551. The control command reception unit 552 supplies the input switchover commands supplied from the infrared reception unit 551 to the command processing unit 553.

The command processing unit 553 switches the input of the audio input unit 554 to that of the renderer 13, based on the input switchover command supplied from the control command reception unit 552.

The audio input unit 554 supplies the audio data input from the renderer 13 to the audio processing unit 555. The audio processing unit 555 determines whether or not audio data has been input, based on the audio data input from the renderer 13 that is audio data supplied from the audio input unit 554. In the event that audio data has been input, the audio processing unit 555 supplies the audio data to the speakers 502 via the speaker output unit 556, thereby reproducing the audio data at the speakers 502.

Next, content reproduction processing in a case wherein the image display and audio output are to be performed at separate renderers 13 will be described with reference to FIGS. 35 through 39. First, FIGS. 35 through 37 will be referred to in order to describe the processing for content reproduction with the controller 11, FIG. 38 will be referred to in order to describe the processing for content reproduction with the renderer 31, and FIG. 39 will be referred to in order to describe the processing for content reproduction with the amplifier 501. Note that the content reproduction processing performed by the server 14 is the same as the content reproduction processing described with reference to FIG. 30, and accordingly description thereof will be omitted.

Figure 35:
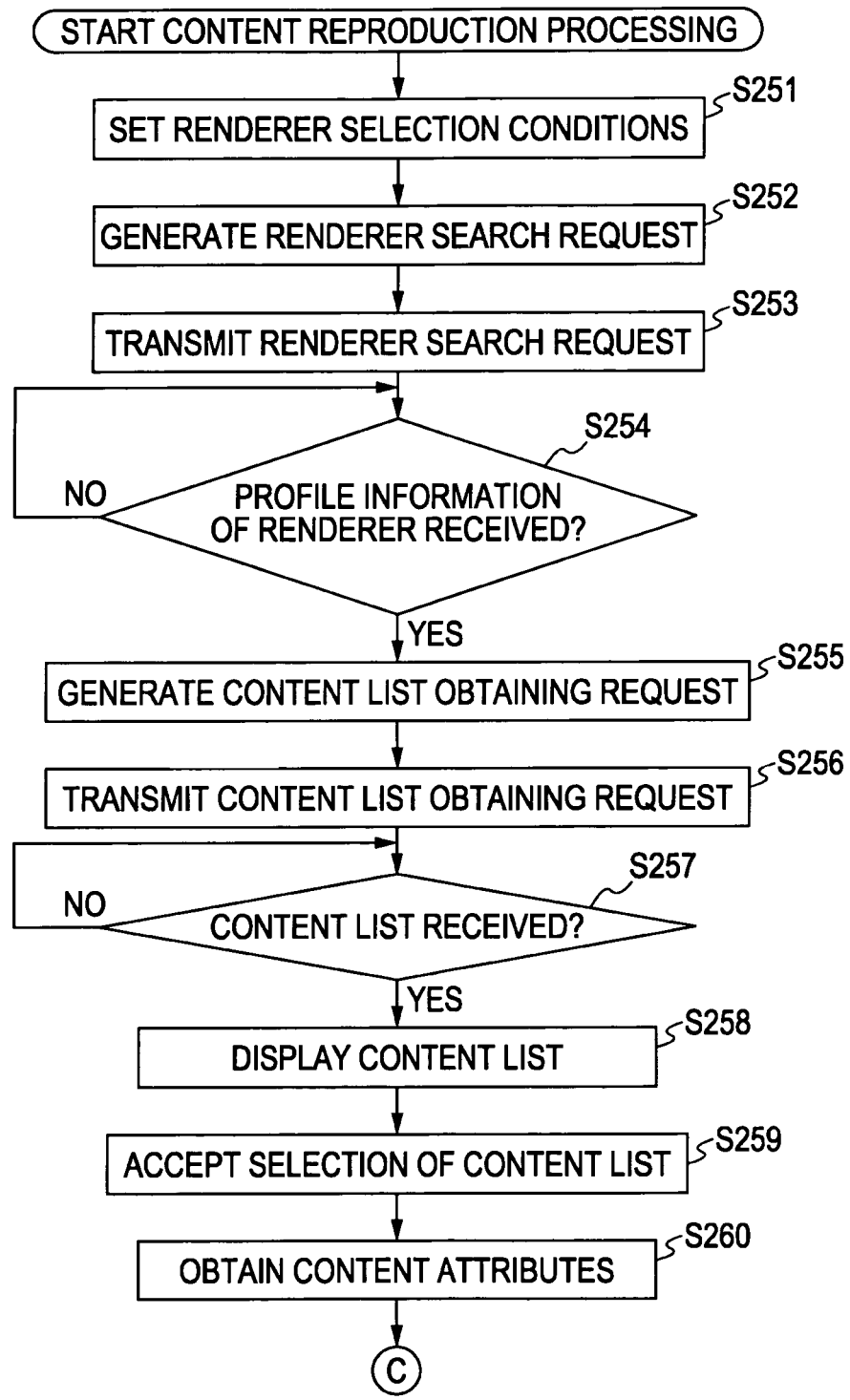
FIG. 35 is a flowchart for describing the processing for content reproduction with a controller.

FIG. 35 is a flowchart describing content reproduction processing with the controller 11.

The processing insteps S251 through S263 is the same as that of the steps S11 through S23 in FIG. 8, and accordingly description thereof will be omitted as appropriate.

Note that in step S251, the renderer selection condition setting unit 201 sets the renderer selection conditions. This can be realized such that display of the images and output of audio are performed at separate renderers 13 by making settings in the order of priority setting screen (2/4) in FIG. 12 as described above, such that the "TV in living room" (renderer 13) performs image display itself (renderer 13) and causes audio output to be performed at the "amplifier in living room" (amplifier 501).

In step S264, the content display reproduction processing unit 209 generates a status request for requesting the status (usage status information) of the renderer 13, based on information indicating the content to be reproduced and information indicating the selected renderer 13, supplied from the renderer selecting unit 208. For example, the content display reproduction processing unit 209 generates a status request based on information indicating the content "World Cup Soccer" and the information indicating "TV in living room", supplied from the renderer selecting unit 208, and supplies the generated status request to the communication unit 36.

In step S265, the communication unit 36 transmits the status request supplied from the content display reproduction processing unit 209 to the renderer 13 selected from the list, via the network 12. For example, the communication unit 36 transmits the status request for confirming the status of the "TV in living room" supplied from the content display reproduction processing unit 209 to the "TV in living room" via the network 12.

In step S266, the content display reproduction processing unit 209 determines whether or not usage status information has been received, based on usage status information received from the renderer 13 and supplied from the communication unit 36.

In the event that determination is made in step S266 that usage status information has not been received, the step S266 loops back on itself. That is to say, the controller 11 stands by until the usage status information is received.

On the other hand, in the event that determination is made in step S266 that usage status information has been received, the flow proceeds to step S267, where the content display reproduction processing unit 209 determines whether or not the renderer 13 is in use, based on the usage status information received from the renderer 13 that is supplied from the communication unit 36.

In the event that determination is made in step S267 that the renderer 13 is not in use, the flow proceeds to step S268, where, since the renderer 13 can play the content, the content display reproduction processing unit 209 generates content reproduction instruction based on information indicating the content to reproduce and the renderer 13 hat has been selected, supplied from the renderer selecting unit 208, and the generated content reproduction instruction is supplied to the communication unit 36. For example, the content display reproduction processing unit 209 generates the content reproduction instruction based on the information indicating the content "World Cup Soccer" and the information indicating the "TV in living room", supplied from the renderer selecting unit 208.

In step S269, the communication unit 36 transmits the content reproduction instruction supplied from the content display reproduction processing unit 209 to the renderer 13 selected from the list, via the network 12. For example, the communication unit 36 transmits the content reproduction instruction to reproduce the content "World Cup Soccer", supplied from the content display reproduction processing unit 209, to the "TV in living room", via the network 12.

In step S270, the renderer control unit 210 generates an input switchover command which is a command for switchover of audio input to the amplifier 501. The renderer control unit 210 supplies the generated input switchover command to the infrared communication unit 42. For example, in the event that the content reproduction instruction for reproducing the content "World Cup Soccer" generated by the content display reproduction processing unit 209 in the processing in step S269 has been transmitted to the "TV in living room", the renderer control unit 210 generates an input switchover command, and the generated input switchover command is supplied to the infrared communication unit 42.

In step S271, the infrared communication unit 42 transmits the input switchover command supplied from the renderer control unit 210 to the amplifier 501 as an SIRCS infrared command.

Note that in the event that the amplifier 501 is connected to the network 12, the renderer control unit 210 can transmit an input switchover command to the amplifier 501 via the network 12 by supplying the generated input switchover command to the communication unit 36. Also, an arrangement may be made wherein, instead of the amplifier 501 being connected directly to the network 12, a separate device exists on the network 12 to receive commands addressed to the amplifier 501, and converts these into infrared commands and relays to the amplifier 501, and further, such a relay function can be built into the renderer 13-1.

In step S272, the content display reproduction processing unit 209 determines whether or not a content reproduction start status, indicating that content reproduction has been started, has been received, based on the content reproduction start status received from the renderer 13 and supplied from the communication unit 36.

In the event that determination is made in step S272 that no content reproduction start status has been received, the step S272 loops back on itself. That is to say, the controller 11 stands by until receiving a content reproduction start status from the renderer 13.

On the other hand, in the event that determination is made in step S272 that a content reproduction start status has been received, the flow proceeds to step S273, where the content display reproduction processing unit 209 displays a video content operation screen for operating the content displayed on the renderer 13 on the screen of the LCD 39. For example, in the event that determination is made that the content reproduction start status has been received, reproduction of the content "World Cup Soccer" will start on the "TV in living room", so the content display reproduction processing unit 209 displays a video content operating screen for operating the content on the screen of the LCD 39.

Next, details of a video content operating screen will be described with reference to FIGS. 37A through 37C. In the example shown here, FIG. 37A illustrates an example of a video content operating screen displayed on the screen of the LCD 39 as a result of the processing in step S273, FIG. 37B illustrates an example of a GUI (Graphical User Interface) button layout (video button layout) for controlling a video device, and FIG. 37C illustrates a GUI button layout (amplifier button layout) for controlling the amplifier.

Figure 37A:
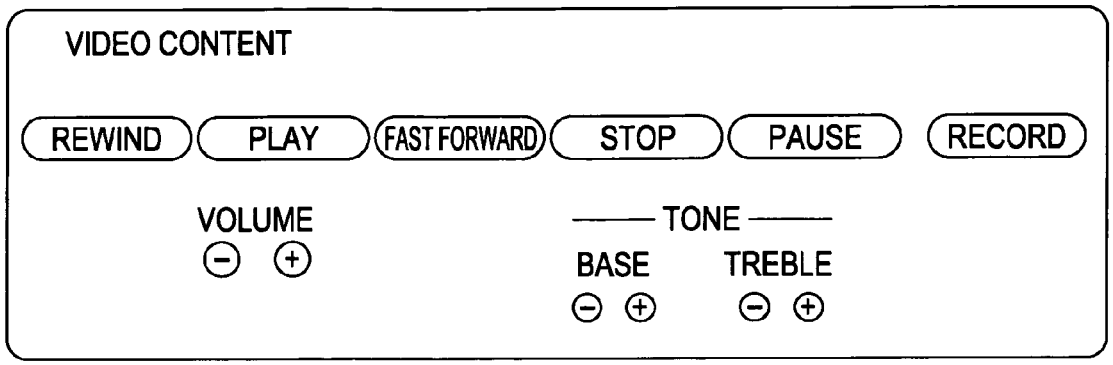
FIG. 37 is a diagram illustrating details of video content operating screens.

In the example of the video content operating screen shown in FIG. 37A, buttons shown for operating reproduction and recording and the like of content include "REWIND", "PLAY", "FAST FORWARD", "STOP", "PAUSE", and "RECORD". A "+" and a "−" button are displayed as buttons for adjusting volume, and further "+" and "−" buttons are displayed for each of "BASS" and "TREBLE" as buttons for adjusting tone.

Figure 37B:
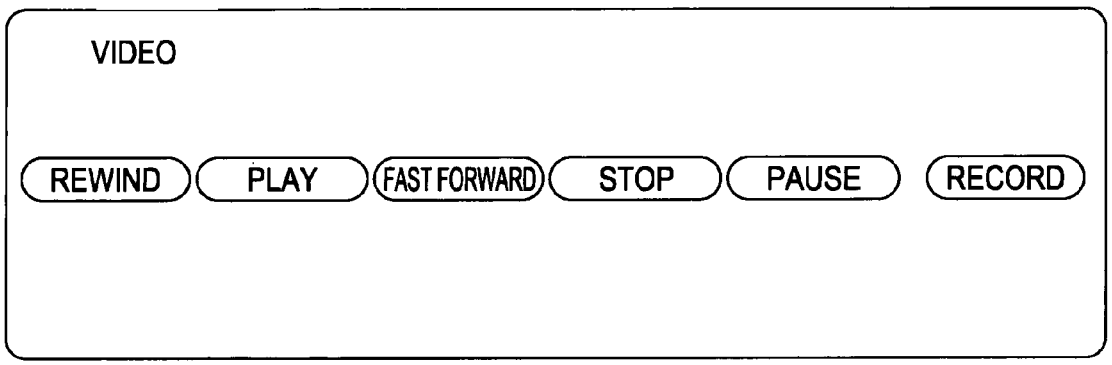
Figure 37C:
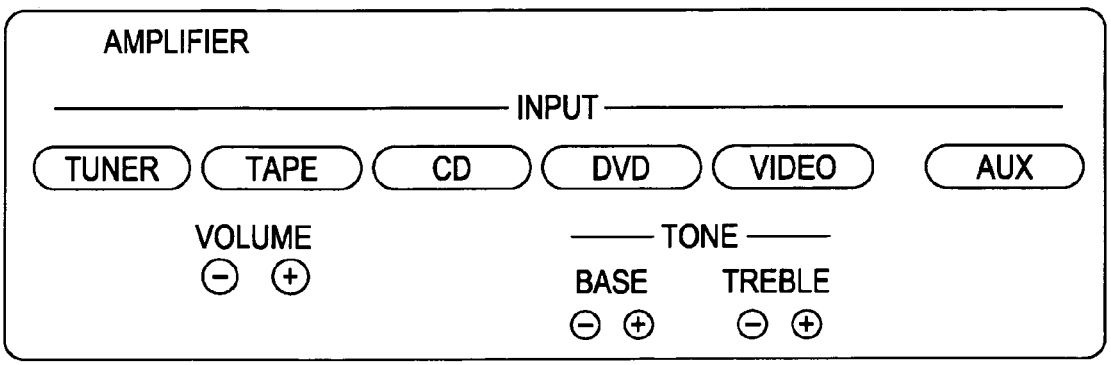
Figure 38:
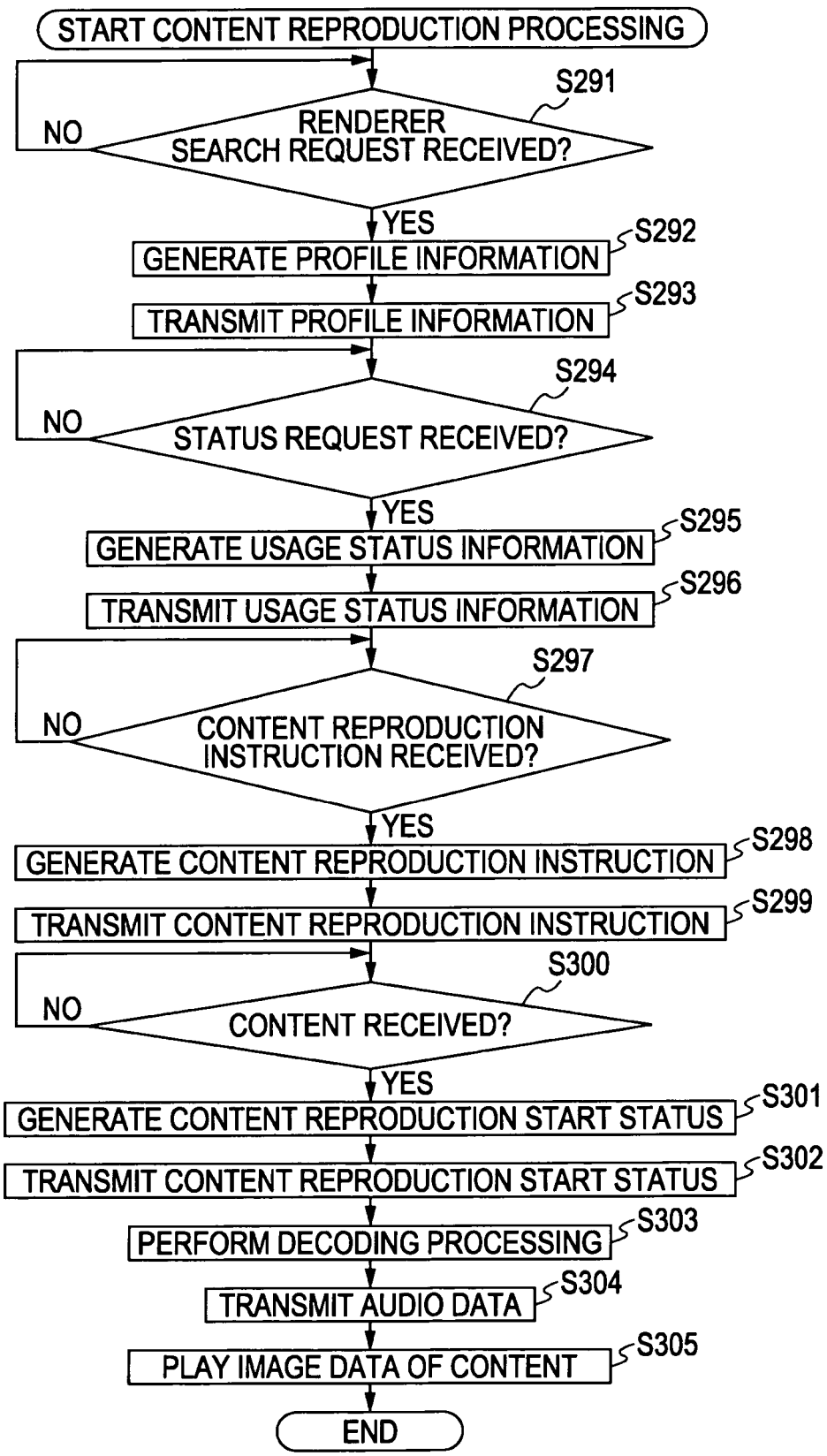
FIG. 38 is a flowchart for describing the processing for content reproduction with a renderer.
Figure 39:
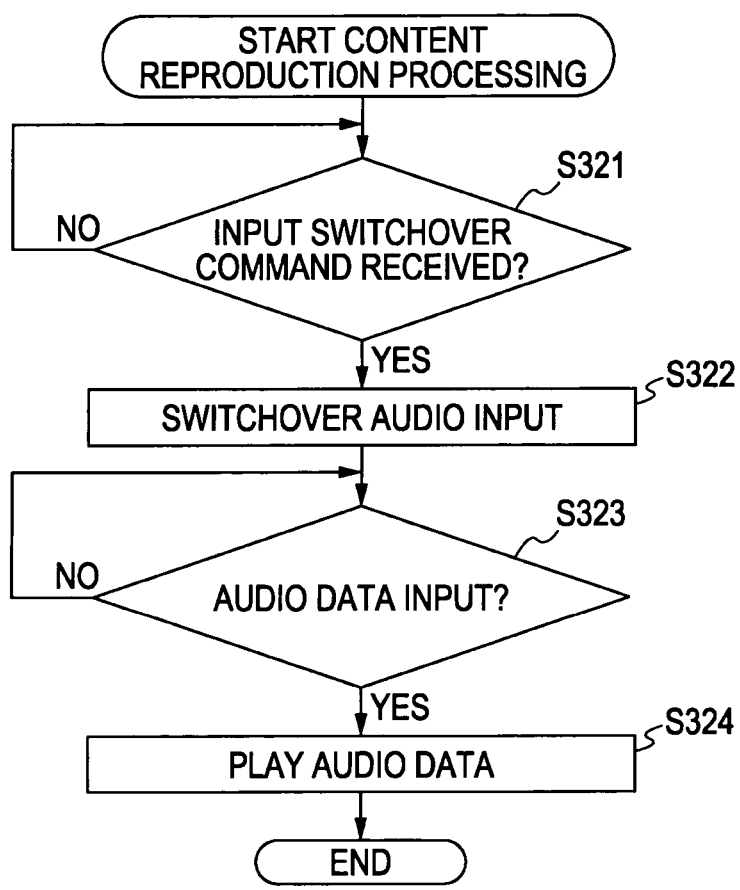
FIG. 39 is a flowchart for describing the processing for content reproduction with an amplifier.

That is to say, in the example of the video content operating screen shown in FIG. 37A, "REWIND", "PLAY", "FAST FORWARD", "STOP", "PAUSE", and "RECORD" buttons are displayed in the same way as with the video button layout shown in FIG. 37B, and further, a "+" and a "−" button are displayed as buttons for adjusting volume and "+" and "−" buttons are displayed for each of "BASS" and "TREBLE" as buttons for adjusting tone, in the same way as with the amplifier button layout shown in FIG. 37C.

Accordingly, with the example of the video content operating screen shown in FIG. 37A, operations of image reproduction and audio control can be made from a single controller 11 even in cases of outputting image display and audio output from separate renderers 13. For example, the controller 11 can allows the user to operate both the "TV in living room" and "amplifier in living room".

Thus, integrated operations of image reproduction and audio control can be made from a single controller 11, so the user can easily perform operations of image reproduction and audio control.

Note that an arrangement may be made wherein the communication unit 36 transmits play-related commands ("REWIND", "PLAY", "FAST FORWARD", "STOP", "PAUSE", "RECORD", etc.) corresponding to the upper side of the video content operating screen to the renderer 13 via the network 12, while the infrared communication unit 42 transmits audio-related commands for volume and tone, corresponding to the lower side of the video content operating screen, to the amplifier 501 as SIRCS infrared commands, or an arrangement may be made wherein the infrared communication unit 42 transmits both the play-related commands at the upper side and the audio-related commands at the lower side to both the renderer 13 and the amplifier 501.

More specifically, for example, the communication unit 36 transmits commands following the DLNA guideline which correspond to play-related commands, to the renderer 13 via the network 12. Note that the controller 11 is not restricted to DLNA guideline commands which correspond to play-related commands, and may be arranged to transmit commands compliant to other standards or guidelines, such as UPnP (Universal Plug and Play) to the renderer 13 via the network 12.

Further, an arrangement may be made wherein the controller 11 transmits commands corresponding to play-related infrared commands which use infrared as a medium to the renderer 13 via the network 12. Here, a command corresponding to an infrared command is sufficient to be able to determine a single infrared command. For example, a command corresponding to an infrared command may be a command of a value indicating an on/off pattern of infrared commands, a command of an ID identifying infrared commands, a command of data indicating manufacturer, device, action, etc., manifested by infrared commands, and so forth.

Returning to the flowchart in FIG. 36, the reproduction of the content ends based on operation of the video content operating screen by the user for example, which ends content reproduction processing of the contents at the controller 11.

On the other hand, in the event that determination is made in step S267 that the renderer 13 is in use, the flow proceeds to step S274. The processing of steps S274 through S276 is the same as the processing of steps S27, S28, and S31 in FIG. 9, so description thereof will be omitted.

Thus, even devices not compatible with renderer 13 searches and not connected to the network 12 can be set by the user beforehand for reproducing (displaying) content, thereby increasing devices capable of handling by the controller 11, and extending the range of use.

The above has been a description of content reproduction processing performed by the controller 11. Next, content reproduction processing performed by the renderer 13 will be described with reference to FIG. 38.

Figure 29:
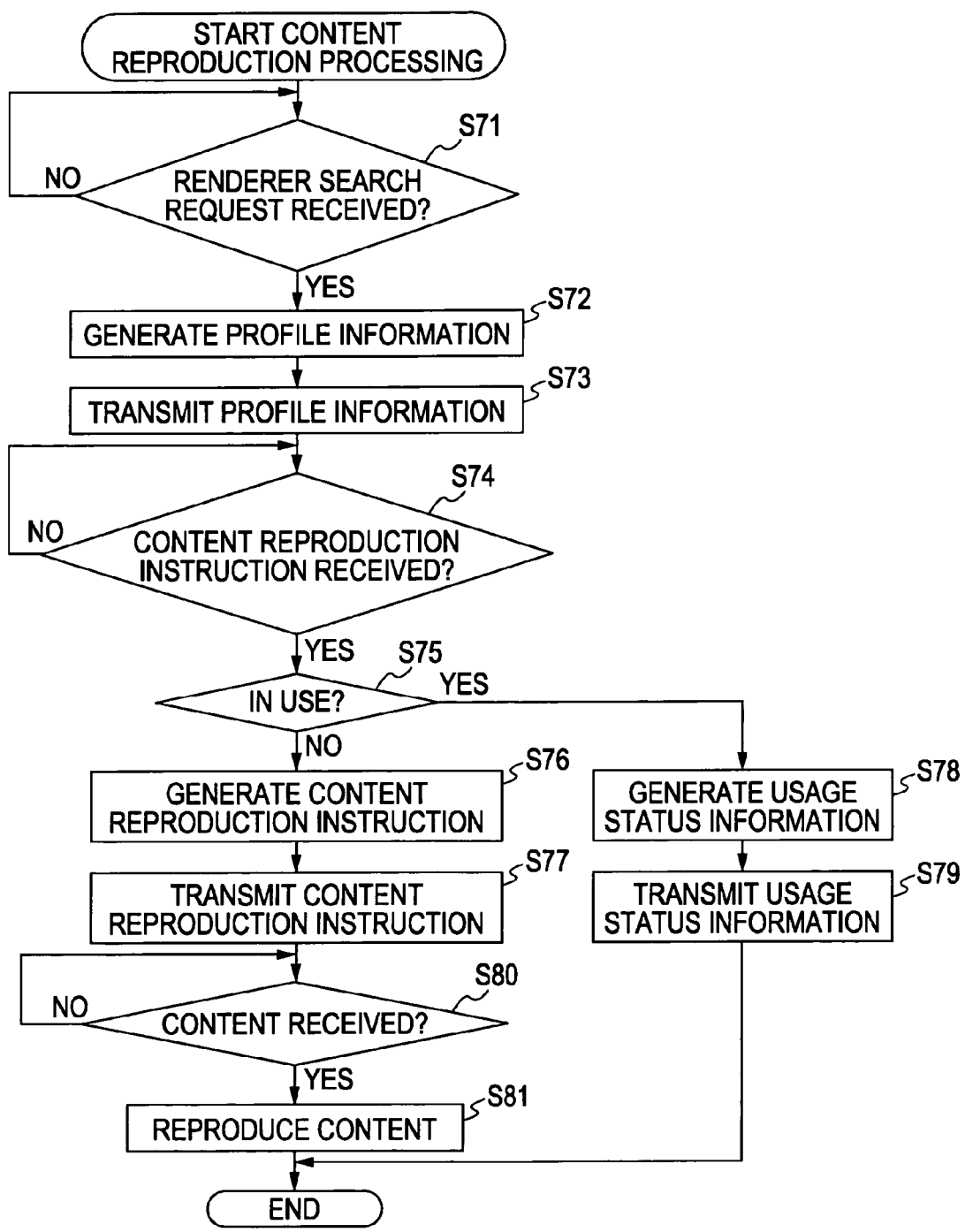
FIG. 29 is a flowchart for describing the processing for content reproduction with a renderer.
Figure 30:
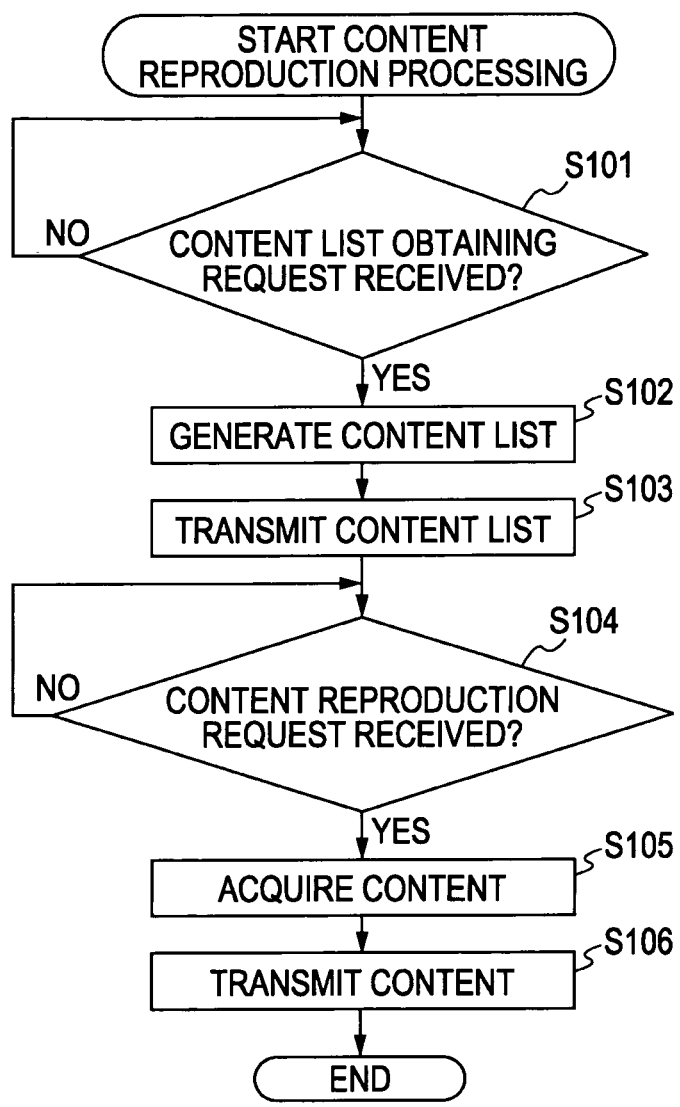
FIG. 30 is a flowchart for describing the processing for content reproduction with a server.

The processing of steps S291 through S293 is the same as the processing of steps S71 through S73 in FIG. 29, so description thereof will be omitted.

In step S294, the control command reception unit 252 determines whether or not a status request has been received, based on the status request received from the controller 11 that is supplied from the communication unit 66.

In the event that determination is made in step S294 that no status request has been received, the step S294 loops back on itself. That is to say, the renderer 13 stands by until a status request is received.

On the other hand, in the event that determination is made in step S294 that a status request has been received, the flow proceeds to step S295, and the command processing unit 253 generates usage status information indicating that itself (the renderer 13) is being used. The command processing unit 253 supplies the generated usage status information to the communication unit 66 via the control command reception unit 252.

In step S296, the communication unit 66 transmits the usage status information supplied from the control command reception unit 252 to the controller 11 via the network 12.

In step S297, the control command reception unit 252 determines whether or not a content reproduction instruction has been received, based on the content reproduction instruction received from the controller 11 which is supplied from the communication unit 66.

In the event that determination is made in step S297 that no content reproduction instruction has been received, the step S297 loops back on itself. That is to say, the renderer 13 stands by until receiving a content reproduction instruction.

On the other hand, in the event that determination is made in step S297 that a content reproduction instruction has been received, the flow proceeds to step S298, where the command processing unit 253 generates a content reproduction request for requesting providing of predetermined content as to the server 14, and supplies the generated content reproduction request to the communication unit 66 via the control command reception unit 252. For example, the command processing unit 253 generates a content reproduction request for making a request to the server 14 for providing of the content "World Cup Soccer", and supplies the generated content reproduction request to the communication unit 66 via the control command reception unit 252.

In step S300, the content reception processing unit 254 determines whether or not the content has been received, based on the content received from the server 14 that is supplied from the communication unit 66.

In the event that determination is made in step S300 that no content has been received, the step S300 loops back on itself. That is to say, the renderer 13 stands by until receiving the content from the server 14.

On the other hand, in the event that determination is made in step S300 that the content has been received, the flow proceeds to step S301, where the content reception processing unit 254 generates a content reproduction start status, and supplies the generated content reproduction start status to the communication unit 66. In step S302, the communication unit 66 supplies the content reproduction start status from the content reception processing unit 254 to the controller 11 via the network 12.

In step S303, the content decoding unit 255 performs decoding processing. For example, the content decoding unit 255 subjects the content "World Cup Soccer" being supplied from the content reception processing unit 254 to predetermined decoding processing corresponding to the content encoding unit 303, and of the decoded content data obtained by the decoding processing, supplies the image data to the content display reproduction processing unit 256, and supplies the audio data to the audio output unit 257.

In step S304, the audio output unit 257 supplies the audio data of the content supplied from the content decoding unit 255 to the amplifier 501 via the cable 503. For example, the audio output unit 257 supplies the audio data of the content "World Cup Soccer" supplied from the content decoding unit 255 to the amplifier 501 via the cable 503.

In step S305, the content display reproduction processing unit 256 reproduces the image data of the content. For example, the content display reproduction processing unit 256 displays image data of the content "World Cup Soccer" supplied from the content decoding unit 255 on the screen of the LCD 39, thereby starting reproduction of the content "World Cup Soccer".

For example, at the "TV in living room", only the images of the content "World Cup Soccer" is displayed on the screen of the LCD 39, and no audio is output therefrom.

Note that reproduction of the content ends based on instructions from the controller 11, operation of the input switch matrix unit 62 by the user, stopping of input of content from the content decoding unit 255, or the like, which ends content reproduction processing of the contents at the renderer 13.

The above has been a description of content reproduction processing performed by the renderer 13. The following is a description of content reproduction processing performed by the amplifier 501, with reference to FIG. 39.

In step S321, the control command reception unit 552 determines whether or not an input switchover command has been received, based on the input switchover command received from the controller 11 that is supplied from the infrared reception unit 551.

In the event that determination is made in step S321 that no input switchover command has been received, the step S321 loops back on itself. That is to say, the amplifier 501 stands by until reception of an input switchover command.

On the other hand, in the event that determination is made in step S321 that an input switchover command has been received, the flow proceeds to step S322, where the command processing unit 553 switches the input of the audio input unit 554 to that of the renderer 13. For example, the command processing unit 553 of the amplifier "amplifier in living room" switches the input of the audio input unit 554 to that of the renderer 13 which is the "TV in living room", based on the input switchover command supplied from the control command reception unit 552. That is to say, the "amplifier in living room" outputs the audio of the "TV in living room".

In step S323, the audio processing unit 555 determines whether or not audio data has been input, based on the audio data input from the renderer 13 which is supplied from the audio input unit 554.

In the event that determination is made in step S323 that no audio data has been input, the step S323 loops back on itself. That is to say, the amplifier 501 stands by until audio data is supplied from the renderer 13.

On the other hand, in the event that determination is made in step S323 that audio data has been input, the flow proceeds to step S324, where the audio processing unit 555 supplies the audio data to the speakers 502 via the speaker output unit 556, hereby reproducing the audio data at the speakers 502. That is to say, the speakers 502 reproduce the audio data. For example, the speakers 502 reproduce the audio of the content "World Cup Soccer" supplied from the "amplifier in living room" (amplifier 501).

Accordingly, the image of the content "World Cup Soccer" is displayed on the "TV in living room" (renderer 13) and the audio is played by the speakers 502 connected to the "amplifier in living room" (amplifier 501).

Thus, user usage environment can be flexibly handled by setting the settings information according to combinations of multiple renderers 13 used for reproduction (displaying) for each attribute of the content.

Also, while the example in FIG. 33 has been described with an arrangement wherein the controller 11 transmits an input switchover command to the amplifier 501 using an infrared beam as the medium, but an arrangement may be made wherein an input switchover command corresponding to the infrared input switchover command is transmitted over the network, and a device which has received this input switchover command transmits an infrared input switchover command, i.e., emits infrared beams serving as the infrared input switchover command.

Here, an input switchover command corresponding to an infrared input switchover command is sufficient to be able to determine a single infrared command. For example, an input switchover command corresponding to an infrared input switchover command may be an input switchover command of a value indicating an on/off pattern of infrared input switchover commands, an input switchover command of an ID identifying infrared input switchover commands, an input switchover command of data indicating manufacturer, device, action, etc., manifested by infrared input switchover commands, and so forth.

FIG. 40 is a block diagram illustrating another configuration of an embodiment of the content reproduction system 1 of the present invention, in the event of transmitting input switchover commands over a network corresponding to input switchover commands which use infrared as a medium. Portions the same as those shown in FIG. 33 are denoted with the same reference numerals, and description thereof will be omitted as appropriate.

The controller 11 transmits input switchover commands corresponding to infrared input switchover commands to a converter 601 via the network 12. The converter 601 receives the input switchover commands corresponding to the infrared input switchover commands, transmitted from the controller 11 via the network 12. The converter 601 then transmits infrared input switchover commands based on the received input switchover commands. That is to say, the converter 601 emits infrared beams serving as input switchover commands, based on the received input switchover commands.

Note that the converter 601 may be a dedicate device, or may be realized as a function of another device.

Also, as described above, once reproduction of the content starts, the video content operating screen described with reference to FIG. 37 for example, is displayed on the screen of the LCD 39 of the controller 11. In this case, an arrangement may be made wherein the communication unit 36 transmits play-related commands ("REWIND", "PLAY", "FAST FORWARD", "STOP", "PAUSE", "RECORD", etc.), such as DLNA, UPnP, or other standard or guideline commands, corresponding to the upper side of the video content operating screen in FIG. 37A to the renderer 13 via the network 12, and transmits audio-related commands for volume and tone, corresponding to the lower side of the video content operating screen in FIG. 37A, to the converter 601 via the network 12 as commands corresponding to SIRCS infrared commands.

Further, the play-related commands and the audio-related commands may be DLNA, UPnP, or other standard or guideline commands, transmitted to the renderer 13 or converter 601 via the network 12, or the play-related commands and the audio-related commands may be commands corresponding to infrared commands such as SIRCS or the like, transmitted to the renderer 13 or converter 601 via the network 12.

Figure 41:
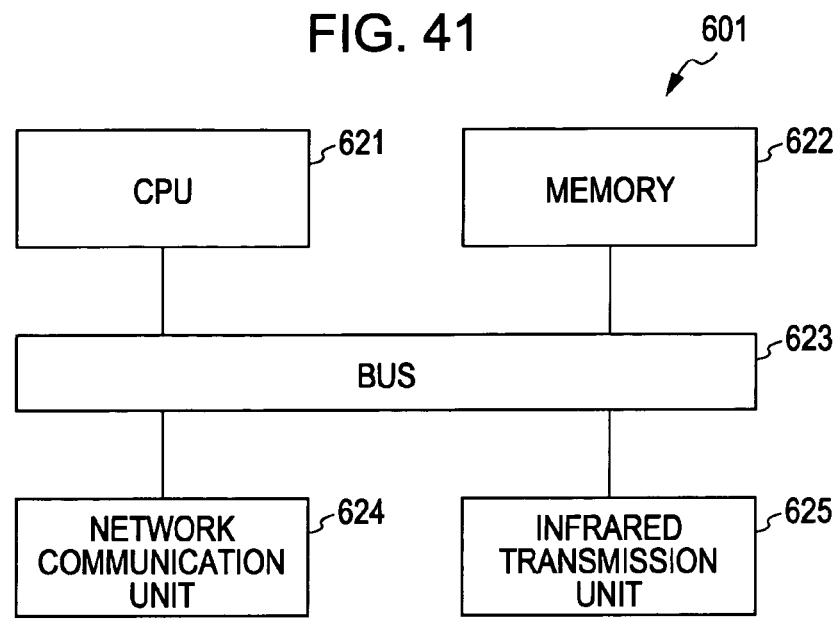
FIG. 41 is a block diagram illustrating a configuration example of hardware of a converter.

FIG. 41 is a block diagram illustrating an example of the hardware configuration of the converter 601. The converter 601 includes a CPU 621, memory 622, a bus 623, a network communication unit 624, and an infrared transmission unit 625.

The CPU 621 executes programs and controls the entire converter 601. For example, the CPU 621 loads programs stored in ROM in the memory 622 to RAM in the memory 622, and executes predetermined processing based on the loaded programs, thereby controlling the entire converter 601.

The memory 622 stores programs for executing the above-described series of processing, and various types of data necessary for executing the programs.

The CPU 621 and memory 622 are connected by the bus 623. Further connected to the bus 623 are the network communication unit 624 and infrared transmission unit 625.

The network communication unit 624 communicates with other devices via the network 12, under control of the CPU 621. For example, the network communication unit 624 communicates with the controller 11 via the network 12, either over cable or wirelessly. Identification information such as MAC address and the like, which is unique on the network 12, is set to the network communication unit 624.

The infrared transmission unit 625 transmits infrared commands conforming to SIRCS which is the infrared communication standard widely used with remote controllers for AV devices and the like for example, under control of the CPU 621.

Figure 42:
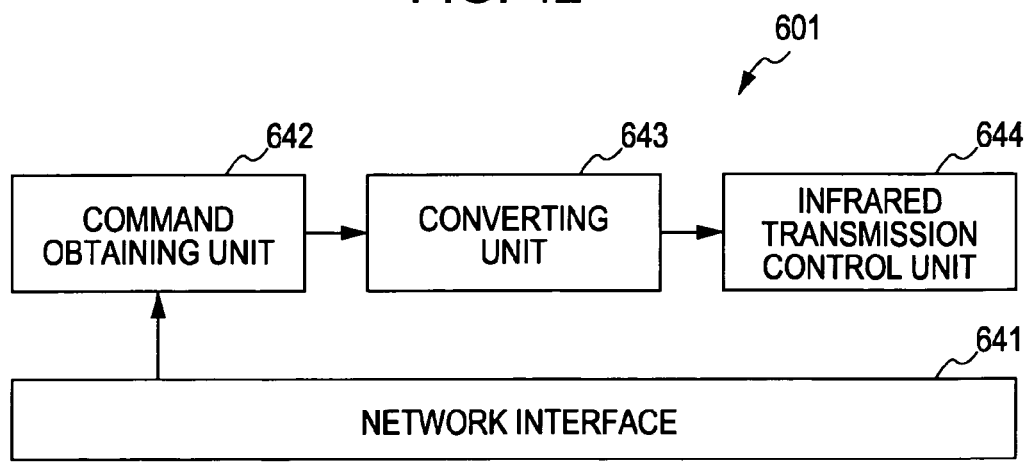
FIG. 42 is a block diagram illustrating a configuration example of functions of the converter.

FIG. 42 is a block diagram illustrating a function configuration example of the converter 601 for executing programs. As a result of the converter 601 executing programs, a network interface 641, command obtaining unit 642, converting unit 643, and infrared transmission control unit 644 are realized.

The network interface 641 controls the network communication unit 624 so as to control connection of the network communication unit 624 to the network 12 and also control communication with other device over the network 12. The command obtaining unit 642 obtains input switchover commands, corresponding to infrared input switchover commands, transmitted from the controller 11 via the network 12 via the network interface 641.

The converting unit 643 converts the input switchover commands supplied from the command obtaining unit 642 into infrared input switchover commands. That is to say, the converting unit 643 converts the input switchover commands supplied from the command obtaining unit 642 into signals indicating the on/off pattern of infrared input switchover commands. The converting unit 643 supplies the signals obtained by this conversion to the infrared transmission control unit 644.

The infrared transmission control unit 644 controls the infrared transmission unit 625. That is to say, the infrared transmission control unit 644 controls the infrared transmission unit 625 so as to transmit infrared input switchover commands corresponding to the signals supplied form the converting unit 643 representing the on/off pattern thereof.

For example, in FIG. 40, upon the controller 11 generating a content reproduction instruction which is transmitted to the renderer 13-1, the controller 11 further generates an input switchover command for switching the audio input to the amplifier 501 (e.g., the processing in step S270 in FIG. 36). At this time, the controller 11 generates an input switchover command corresponding to an infrared-medium input switchover command for example, and transmits the generated input switchover command to the converter 601 via the network 12.

Upon the input switchover command corresponding to the infrared input switchover command being transmitted from the controller 11 to the converter 601, the converter 601 receives and converts this into an infrared input switchover command, and performs transmission processing which is processing for transmitting the infrared input switchover command obtained by conversion to the amplifier 501. The transmission processing performed by the converter 601 will now be described with reference to the flowchart shown in FIG. 43.

In step S401, the command obtaining unit 642 controls the network interface 641 so as to receive an input switchover command corresponding to an infrared input switchover command, transmitted from the controller 11 via the network 12. The command obtaining unit 642 obtains the input switchover command received from the network interface 641 the command obtaining unit 642 supplies the obtained input switchover command to the converting unit 643.

In step S402, the converting unit 643 converts the input switchover command supplied from the command obtaining unit 642 into an infrared input switchover command. More specifically, in step S402, the converting unit 643 converts the input switchover command transmitted from the controller 11 into an infrared input switchover command by converting the input switchover command supplied from the command obtaining unit 642 into signals of the on/off pattern of an infrared input switchover command. The converting unit 643 supplies the signals of the on/off pattern of the infrared input switchover command obtained by this conversion to the infrared transmission control unit 644.

In step S403, the infrared transmission control unit 644 controls the infrared transmission unit 625 so as to transmit the infrared input switchover command to the amplifier 501, and the transmission processing ends. That is to say, the infrared transmission control unit 644 controls the infrared transmission unit 625 based on signals supplied from the converting unit 643 representing the on/off pattern of the infrared input switchover command, such that the infrared transmission unit 625 transmits the infrared input switchover command of the on/off pattern represented by the signals. Thus, the infrared transmission unit 625 transmits the infrared-medium input switchover command to the amplifier 501, i.e., emits an infrared beam serving as the input switchover command.

While description has been made regarding an arrangement wherein the controller 11 transmits input switchover commands corresponding to infrared input switchover commands to the converter 601, an arrangement may be made wherein audio-related commands which use infrared as a medium for controlling reproduction of contents are transmitted to the converter 601 via the network 12.

Upon the converter 601 transmitting an input switchover command which uses infrared as a medium to the amplifier 501, the infrared communication unit 551 of the amplifier 501 receives the infrared beam serving as the input switchover command transmitted from the converter 601, and supplies the received input switchover command to the command processing unit 553 via the control command reception unit 552. More specifically, the infrared communication unit 551 extracts the signal pattern of the input switchover command so as to receive the input switchover command.

The command processing unit 553 switches the input of the audio input unit 554 to the renderer 13-1, based on the input switchover command supplied from the infrared communication unit 551. Accordingly, the amplifier 501 selects input from the renderer 13-1 connected via the cable 503, so audio is output from the speakers 502 based on the audio data input to the audio input unit 554.

Figure 43:
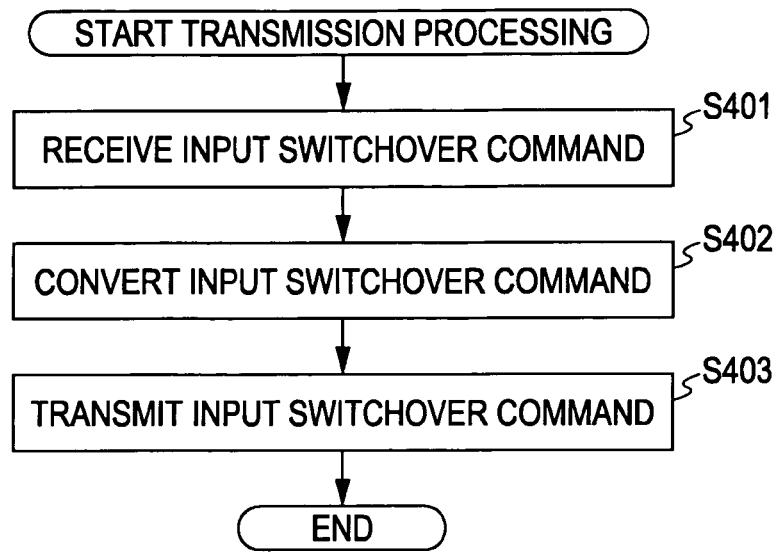
FIG. 43 is a flowchart for describing transmission processing.

As described above, with the transmission processing described with reference to FIG. 43, even in the event that a device for transmitting input switchover commands over the network or commands for controlling reproduction of contents (e.g., audio-related commands) does not have functions for transmitting infrared commands, devices which cannot connected to the network can be controlled.

Even in the event that a device for transmitting commands such as input switchover commands over the network, and a device to be controlled thereby which cannot connect to the network, are physically distant one from another such as being in different rooms or on different floors, the device which cannot connect to the network can be controlled by positioning the device which receives the input switchover commands and converts these into infrared input switchover commands and transmits the infrared input switchover commands nearby the device which cannot connect to the network.

Further, an arrangement may be made wherein input switchover commands corresponding to infrared input switchover commands are transmitted over the network, and a device which has received the input switchover commands emits infrared beams serving as the infrared input switchover commands around a photoreceptor of the device to be controlled for receiving the input switchover commands.

Figure 44:
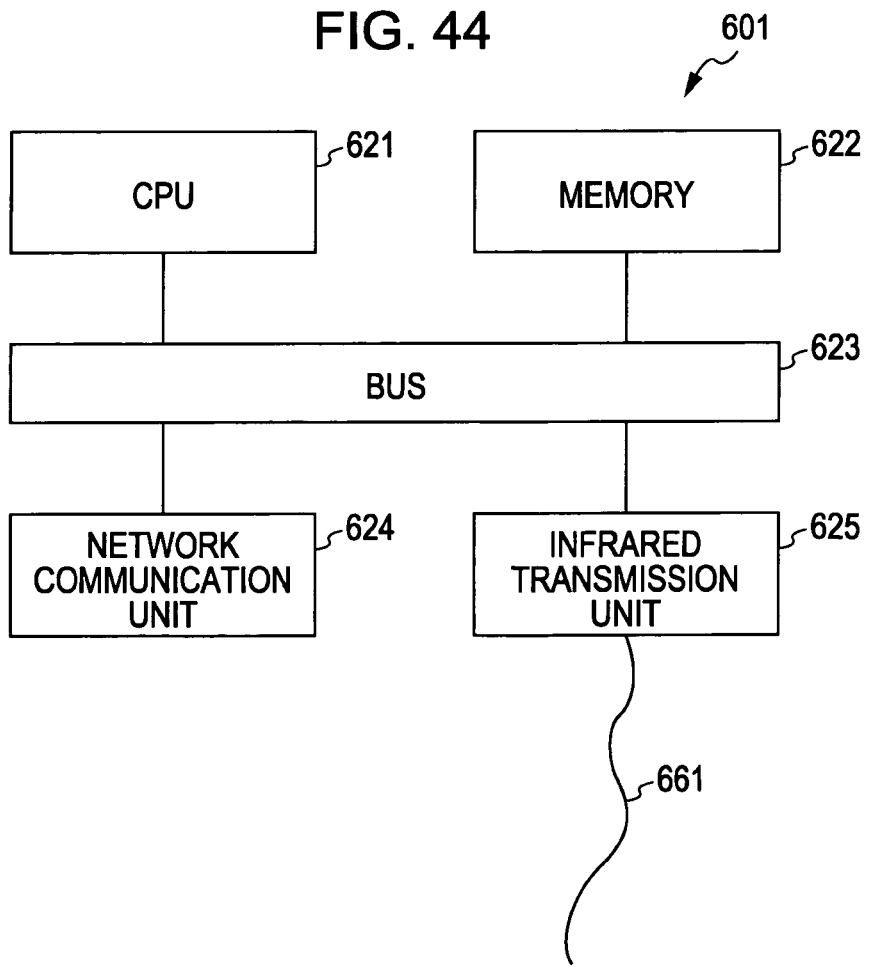
FIG. 44 is a block diagram illustrating another hardware configuration example of the converter.

FIG. 44 is a block diagram illustrating another example of the hardware configuration of the converter 601 which emits infrared beams serving as the infrared input switchover commands around a photoreceptor of the device to be controlled. Portions which are the same as that shown in FIG. 41 are denoted with the same reference numerals, and description thereof will be omitted.

An optical fiber 661 is formed of a photoconductive material such as glass or plastic or the like, and infrared beams cast in from one end are emitted from the other end.

One end of the optical fiber 661 is placed at a position for emitting infrared beams of the infrared transmission unit 625. The other end of the optical fiber 661 is placed near the photoreceptor of the amplifier 501 which is an example of a device to be controlled, for receiving the input switchover commands, such that infrared beams irradiated from the other end are cast into the photoreceptor of the amplifier 501.

The infrared beams serving as the infrared input switchover commands emitted from the infrared transmission unit 625 are cast into the optical fiber 661 from the one side, and emitted from the other end of the optical fiber 661. The infrared beams serving as the infrared input switchover commands emitted from the other end of the optical fiber 661 are cast into the photoreceptor of the amplifier 501.

Thus, the infrared beams serving as the infrared input switchover commands are emitted around the photoreceptor of the device to be controlled, so even in the event that there is a relatively intense obstruction, such as the device to be controlled being placed near a window with strong sunlight coming in, the device to be controlled can be controlled in a more sure manner.

Figure 45:
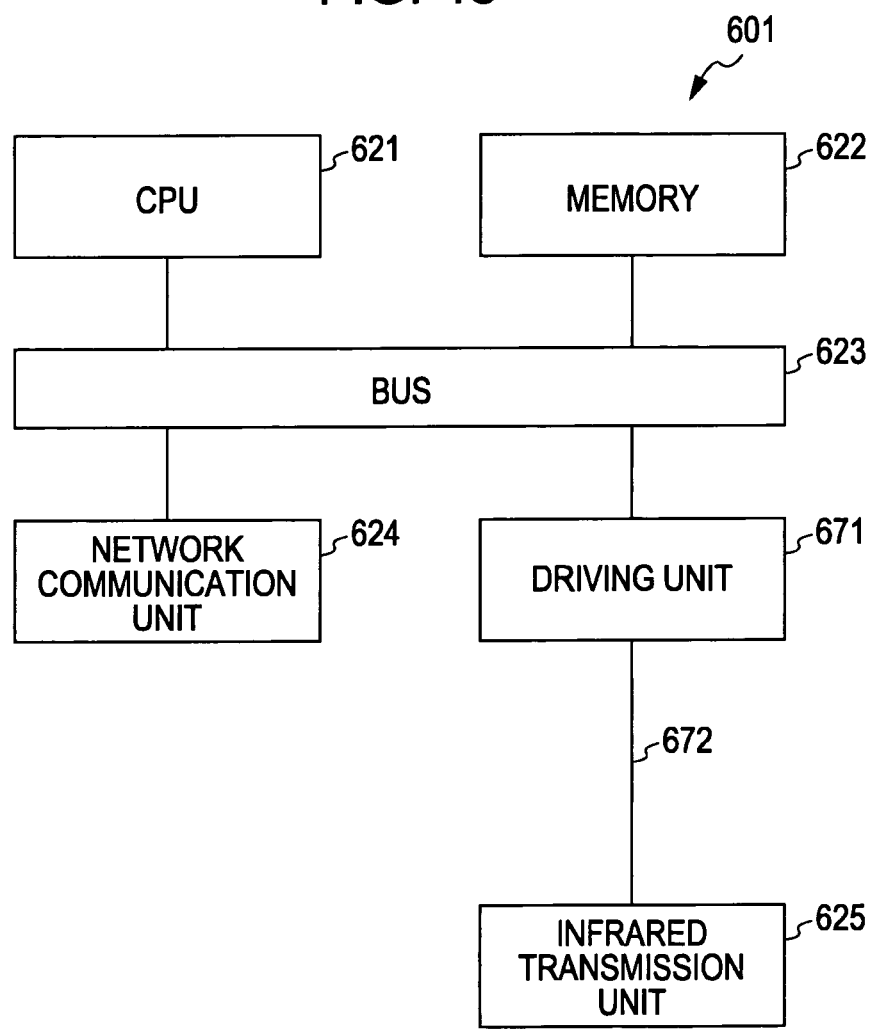
FIG. 45 is a block diagram illustrating yet another hardware configuration example of the converter.

FIG. 45 is a block diagram illustrating a further example of the hardware configuration of the converter 601 for emitting infrared beams serving as the infrared input switchover commands around the infrared photoreceptor of the device to be controlled. Portions which are the same as that shown in FIG. 41 are denoted with the same reference numerals, and description thereof will be omitted.

A driving unit 671 amplifies signals formed of voltage output from the bus 623, or outputs signals formed of a predetermined electric current value corresponding to the signals output from the bus 623. Signals output from the driving unit 671 are supplied to the infrared transmission unit 625 via a conducting cable 672.

Providing the driving unit 671 enables the signals for irradiation of the infrared input switchover commands to be transmitted to the infrared transmission unit 625 in a more sure manner even in the event that the cable 672 is long, so infrared beams serving as the infrared input switchover commands can be emitted in a more sure manner. Note that the driving unit 671 may be omitted in the event that the cable 672 is short.

The infrared transmission unit 625 of the converter 601 shown in FIG. 45 is placed nearby the photoreceptor of the amplifier 501 for receiving the infrared input switchover commands. Thus, the infrared beams serving as the infrared input switchover commands are emitted around the photoreceptor of the device to be controlled, so even in the event that there is a relatively intense obstruction, such as the device to be controlled being placed near a window with strong sunlight coming in, the device to be controlled can be controlled in a more sure manner.

Note that while the converter 601 has been described as transmitting infrared input switchover commands, but this arrangement is not restricted to infrared input switchover commands, and predetermined commands may be transmitted to a device to be controlled either by cable or wireless media which is a different route from the network 12. For example, instead of the infrared transmission unit 625, or in addition to the infrared transmission unit 625, a cable-medium communication interface such as compliant with RS-232C, RS-422-A, USB (Universal Serial Bus), etc., may be provided to the converter 601, such that the converter 601 transmits predetermined commands to the device to be controlled by cable. Further, instead of the infrared transmission unit 625, or in addition to the infrared transmission unit 625, a wireless-medium interface such as compliant with the Bluetooth standard may be provided to the converter 601, such that the converter 601 transmits predetermined commands to the device to be controlled wirelessly.

Further, the arrangement is not restricted to the controller 11 transmitting commands, and an arrangement may be made wherein a device such as a renderer 13 or the like transmits input switchover commands or the like to the converter 601 via the network 12, with the converter 601 converting the commands transmitted from the device such as a renderer 13 or the like into infrared commands, so as to transmit the infrared commands obtained by the conversion.

Now, the above-described series of processing can be executed by hardware, or can be executed by software. In the event of executing the above-described series of processing by software, a program making up the software is installed from a recording medium to a computer built into dedicated hardware or to a general-purpose personal computer or the like which is capable of executing various functions by various types of programs being installed thereto.

The recording medium is not restricted to packaged media wherein a recording device 41 or the like storing the program is distributed in order to provide the programs to the user, as shown in FIG. 2, and may include ROM 33 which is built into the computer beforehand with the program stored therein so as to be provided to the user.

Further, the program for executing the above-described series of processing may be installed to a computer via interfaces such as routers, modems, and so forth, as necessary, and via cable or wireless communication media such as local area networks, the Internet, digital satellite broadcast, and so forth.

It should be understood that the steps described in the program stored in the recording medium include processing carried out in the time-sequence described, as a matter of course, but also include processing carried out in parallel or independently, not necessarily following the time-sequence described.

It should be further understood that in the present specification, the term "system" refers to the collective configuration of multiple devices.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
   circuitry configured to
      set an order of priority for each of a plurality of content display devices, for each of a plurality of compatible image display capabilities, based on user instructions;
      obtain compatible image display capabilities of each of said content display devices;
      obtain image display requirements of content selected by said user;
      determine, automatically, an order of priority for each of said content display devices regarding which compatible image display capabilities have been obtained, based on said set order of priority, obtained compatible image display capabilities of said content display devices, and obtained image display requirements of said content;
      control a display to display an ordered list of said content display devices based on said determined order of priority from which said user selects a content display device to display said content stored at a server remotely connected to each of the content display devices; and
      control a communication interface to transmit, via a network, a command for controlling a reproducing device, connected to said content display device selected based on said order of priority, to reproduce a part of said content.

2. The electronic device according to claim 1, wherein the circuitry is configured to select said content display device for reproducing said content, based on said determined order of priority.

3. The electronic device according to claim 1, wherein the circuitry is configured to control the communication interface to transmit a command instructing reproducing of said content to said content display device selected based on said order of priority.

4. The electronic device according to claim 3, wherein the circuitry is configured to control the communication interface to transmit a command instructing reproducing of said content via a network.

5. The electronic device according to claim 1, wherein the circuitry is configured to control the communication interface to transmit commands for controlling said reproducing device to a device configured to convert commands for controlling said reproducing device which are transmitted via said network into commands carried by an infrared medium.

6. The electronic device according to claim 1, wherein said circuitry is configured to set an order of priority as to an attribute of each of said content display devices in which said attribute is a name of said content display device, for each attribute of said content in which said attribute is a type of said content.

7. The electronic device according to claim 1, wherein said circuitry is configured to set conditions indicating whether usage of each of said content display devices corresponding to a content attribute or a content display device attribute is permissible or not permissible;
   and wherein said circuitry is configured to select said content display devices which can be used, based on said conditions, obtained said compatible image display capabilities, and obtained said image display requirements, and determines an order of priority for said selected content display devices.

8. The electronic device according to claim 1, wherein said circuitry is configured to select said content display devices capable of handling said content, based on obtained said compatible image display capabilities and obtained said image display requirements, and determine an order of priority for said selected content display devices.

9. The electronic device according to claim 8, wherein said image display requirements indicate at least one of a content encoding method, content type, and content resolution.

10. The electronic device according to claim 1, wherein said circuitry is configured to set an order of priority as to an attribute of each of said content display devices in which said attribute is a name of said content display device, for each attribute of said content in which said attribute is an owner identification of said content.

11. The electronic device according to claim 1, wherein said circuitry is configured to set an order of priority as to an attribute of each of said content display devices in which said attribute is an installation location of said reproducing device, for each attribute of said content in which said attribute is a type of said content.

12. The electronic device according to claim 1, wherein the circuitry is configured to control the communication interface to transmit, via the network, a command for controlling the content display device selected based on said order of priority to display another part of said content different from said part of content reproduced by the reproducing device.

13. The electronic device according to claim 12, wherein the content is audio-video content, said content display device is a video reproducing device that reproduces a video part of said content, and said reproducing device is an audio reproducing device that reproduces an audio part of said content.

14. The electronic device according to claim 13, wherein said video reproducing device and said audio reproducing device reproduce said video part of said content and said audio part of said content simultaneously.

15. The electronic device according to claim 1, wherein said compatible image display capabilities of said content display devices indicate codecs that are compatible with each of said content display devices.

16. The electronic device according to claim 1, wherein said circuitry is configured to set an order of priority as to an attribute of each of said content display devices in which said attributes include information indicating whether each of said reproducing devices are permitted to reproduce viewer-restricted content.

17. The electronic device according to claim 1, wherein said circuitry is configured to set an order of priority as to an attribute of each of said content display devices in which said attributes include information indicating at least one content owner for which each of said reproducing devices is permitted to reproduce content.

18. An information processing method comprising:
   setting an order of priority for each of a plurality of content display devices, for each of a plurality of compatible image display capabilities, based on user instructions;
   first obtaining compatible image display capabilities of each of said reproducing devices;
   second obtaining image display requirements of content selected by said user;
   determining, automatically, an order of priority for each of said content display devices regarding which compatible image display capabilities have been obtained in said first obtaining, based on said set order of priority, obtained compatible image display capabilities of said content display devices, and obtained image display requirements of said content;
   displaying an ordered list of said content display devices based on said determined order of priority from which said user selects a content display device to display said content stored at a server remotely connected to each of the content display reproducing devices; and
   transmitting, via a network, a command for controlling a reproducing device, connected to said content display device selected based on said order of priority, to reproduce a part of said content.

19. A non-transitory computer-readable medium including a computer program product having computer readable instructions, which when executed by a processor, cause the processor to perform a method comprising:
   setting an order of priority for each of a plurality of content display devices, for each of a plurality of compatible image display capabilities, based on user instructions;
   first obtaining compatible image display capabilities of each of said reproducing devices;
   second obtaining image display requirements of content selected by said user;
   determining, automatically, an order of priority for each of said content display devices regarding which compatible image display capabilities have been obtained in said first obtaining, based on said set order of priority, obtained compatible image display capabilities of each of said content display devices, and obtained image display requirements of said content;
   displaying an ordered list of said content display devices based on said determined order of priority from which said user selects a content display device to display said content stored at a server remotely connected to each of the content display reproducing devices; and
   transmitting, via a network, a command for controlling a reproducing device, connected to said content display device selected based on said order of priority, to reproduce a part of said content.

20. An electronic device comprising:
   a setting unit configured to set an order of priority for each of a plurality of content display devices, for each of a plurality of compatible image display capabilities, based on user instructions;
   a first obtaining unit configured to obtain compatible image display capabilities of each of said reproducing devices;
   a second obtaining unit configured to obtain image display requirements of said content selected by said user;
   a determining unit configured to determine, automatically, an order of priority for each of said content display devices regarding which compatible image display capabilities have been obtained by said first obtaining unit, based on said set order of priority, obtained compatible image display capabilities of said content display devices, and obtained image display requirements of said content;
   a displaying unit configured to display an ordered list of said content display devices based on said determined order of priority from which said user selects a content display device to display said content stored at a server remotely connected to each of the content display; and
   a transmitter configured to transmit, via a network, a command for controlling another a reproducing device, connected to said content display device selected based on said order of priority, to reproduce a part of said content.

* * * * *